United States Patent
Baker et al.

(10) Patent No.: US 9,919,749 B2
(45) Date of Patent: Mar. 20, 2018

(54) SIDE SKIRT SYSTEM FOR A TRAILER

(71) Applicant: Wabash National, L.P., Lafayette, IN (US)

(72) Inventors: Leonard W. Baker, Lafayette, IN (US); Michael J. Courtney, Dayton, IN (US); Gustavo Lazatin Sumcad, Westfield, IN (US); James Andrew Sweet, Lafayette, IN (US)

(73) Assignee: Wabash National, L.P., Lafayette, IN (US)

( * ) Notice: Subject to any disclaimer, the term of this patent is extended or adjusted under 35 U.S.C. 154(b) by 0 days.

(21) Appl. No.: 15/200,628

(22) Filed: Jul. 1, 2016

(65) Prior Publication Data

US 2016/0311475 A1    Oct. 27, 2016

Related U.S. Application Data

(63) Continuation of application No. 14/644,508, filed on Mar. 11, 2015, now Pat. No. 9,409,610.

(60) Provisional application No. 61/993,692, filed on May 15, 2014, provisional application No. 61/951,338, filed on Mar. 11, 2014.

(51) Int. Cl.
   *B62D 35/00* (2006.01)
   *B62D 35/02* (2006.01)

(52) U.S. Cl.
   CPC ......... *B62D 35/001* (2013.01); *B62D 35/008* (2013.01); *B62D 35/02* (2013.01)

(58) Field of Classification Search
   CPC .. B62D 35/001; B62D 35/002; B62D 35/007; B62D 35/008; B62D 35/02

USPC ................ 296/180.1, 180.4, 180.5
See application file for complete search history.

(56) References Cited

U.S. PATENT DOCUMENTS

| | | |
|---|---|---|
| 357,800 A | 2/1887 | Wescott |
| 495,801 A | 4/1893 | Henthome |
| 564,027 A | 7/1896 | Pratt |
| 824,541 A | 6/1906 | Hager et al. |
| 1,127,241 A | 2/1915 | Hawksworth |
| 2,318,863 A | 5/1943 | Jabelmann |
| 2,737,411 A | 3/1956 | Potter |
| 3,256,655 A | 6/1966 | Teter |
| 3,401,953 A | 9/1968 | Prohl et al. |
| 3,483,939 A | 12/1969 | Maddock et al. |
| 3,608,928 A | 9/1971 | Hooker |
| 3,711,146 A | 1/1973 | Madzsar et al. |
| 3,852,965 A | 12/1974 | Rudd |

(Continued)

FOREIGN PATENT DOCUMENTS

| CA | 2651688 A1 | 7/2009 |
|---|---|---|
| CA | 2715304 A1 | 3/2011 |

(Continued)

OTHER PUBLICATIONS

Office action in U.S. Appl. No. 13/413,998 dated Nov. 2, 2012 (9 pages).

(Continued)

*Primary Examiner* — Jason S Daniels
(74) *Attorney, Agent, or Firm* — Carli E. Stewart

(57) ABSTRACT

A side skirt system for reducing drag on a trailer or other ground vehicle includes plurality of wall panels each configured to be coupled to one side of the trailer to extend generally below a storage container of the trailer at least partially along a length of the trailer. The wall panels are horizontally spaced-apart from each other.

19 Claims, 33 Drawing Sheets

(56) References Cited

U.S. PATENT DOCUMENTS

| | | |
|---|---|---|
| 3,859,797 A | 1/1975 | Ayers |
| 4,006,932 A | 2/1977 | McDonald |
| 4,045,962 A | 9/1977 | Preus |
| 4,060,268 A | 11/1977 | Page, Jr. |
| 4,103,918 A | 8/1978 | Salden |
| 4,104,884 A | 8/1978 | Preus |
| 4,142,755 A | 3/1979 | Keedy |
| 4,190,381 A | 2/1980 | Knaus et al. |
| 4,236,745 A | 12/1980 | Davis |
| 4,262,961 A | 4/1981 | Schmidt |
| 4,282,946 A | 8/1981 | MacGuire |
| 4,352,502 A | 10/1982 | Leonard et al. |
| 4,421,333 A | 12/1983 | Van Dyke |
| 4,611,847 A | 9/1986 | Sullivan |
| 4,688,824 A | 8/1987 | Herring |
| 4,746,160 A | 5/1988 | Wiesemeyer |
| 4,943,204 A | 7/1990 | Ehrlich |
| 5,058,945 A | 10/1991 | Elliott, Sr. et al. |
| 5,094,744 A | 3/1992 | Scovell |
| 5,152,228 A | 10/1992 | Donkin |
| 5,280,990 A | 1/1994 | Rinard |
| D354,726 S | 1/1995 | Fitzgerald et al. |
| 5,489,137 A | 2/1996 | Herrmeyer |
| 5,607,200 A | 3/1997 | Smidler |
| 5,673,953 A | 10/1997 | Spease |
| 5,823,610 A | 10/1998 | Ryan |
| 5,921,617 A | 7/1999 | Loewen et al. |
| 6,079,769 A | 6/2000 | Fannin et al. |
| 6,092,861 A | 7/2000 | Whelan |
| 6,109,675 A | 8/2000 | Sumrall |
| 6,116,667 A | 9/2000 | Torcomian |
| 6,257,654 B1 | 7/2001 | Boivin et al. |
| 6,286,894 B1 | 9/2001 | Kingham |
| 6,309,010 B1 | 10/2001 | Whitten |
| 6,409,252 B1 | 6/2002 | Andrus |
| 6,443,492 B1 | 9/2002 | Barr et al. |
| 6,467,833 B1 | 10/2002 | Travers |
| 6,485,087 B1 | 11/2002 | Roberge et al. |
| 6,595,578 B1 | 7/2003 | Calsoyds et al. |
| 6,626,475 B2 | 9/2003 | Schroeder |
| 6,644,720 B2 | 11/2003 | Long et al. |
| 6,666,498 B1 | 12/2003 | Whitten |
| 6,799,791 B2 | 10/2004 | Reiman et al. |
| 6,837,536 B1 | 1/2005 | Schwartz |
| 6,893,079 B1 | 5/2005 | Johnson et al. |
| 6,915,611 B2 | 7/2005 | Reiman et al. |
| 6,959,958 B2 | 11/2005 | Basford |
| 6,974,166 B2 | 12/2005 | Ledford et al. |
| 6,974,178 B2 | 12/2005 | Ortega et al. |
| 7,059,819 B2 | 6/2006 | Brackmann et al. |
| 7,086,674 B2 | 8/2006 | Goetz |
| 7,093,889 B2 | 8/2006 | Graham |
| 7,134,820 B2 | 11/2006 | Ehrlich |
| 7,147,270 B1 | 12/2006 | Andrus et al. |
| 7,163,258 B2 | 1/2007 | Dyer, II et al. |
| 7,188,875 B2 | 3/2007 | Norelius |
| 7,347,154 B2 | 3/2008 | Evans |
| 7,404,592 B2 | 7/2008 | Reiman et al. |
| 7,407,204 B2 | 8/2008 | Eriksson et al. |
| 7,431,381 B2 | 10/2008 | Wood |
| 7,497,502 B2 | 3/2009 | Wood |
| 7,537,270 B2 | 5/2009 | O'Grady |
| 7,578,541 B2 | 8/2009 | Layfield et al. |
| 7,604,284 B2 | 10/2009 | Reiman et al. |
| 7,665,716 B2 | 2/2010 | Reast |
| 7,686,385 B2 | 3/2010 | Dolan et al. |
| 7,740,303 B2 | 6/2010 | Wood |
| 7,748,772 B2 | 7/2010 | Boivin et al. |
| 7,780,224 B2 | 8/2010 | Roush |
| 7,837,254 B2 | 11/2010 | Reiman et al. |
| 7,877,120 B2 | 2/2011 | Boivin et al. |
| 7,938,475 B2 | 5/2011 | Boivin et al. |
| 7,942,466 B2 | 5/2011 | Reiman et al. |
| 7,942,467 B2 | 5/2011 | Boivin et al. |
| 7,942,468 B2 | 5/2011 | Boivin et al. |
| 7,942,469 B2 | 5/2011 | Boivin et al. |
| 7,942,470 B2 | 5/2011 | Boivin et al. |
| 7,942,471 B2 | 5/2011 | Boivin et al. |
| 7,950,721 B1 | 5/2011 | Peterson |
| 7,967,349 B2 | 6/2011 | Puppini et al. |
| 8,162,384 B2 | 4/2012 | Giromini et al. |
| 8,177,286 B2 | 5/2012 | Brown et al. |
| 8,191,956 B1 | 6/2012 | Dixon et al. |
| 8,210,599 B2 | 7/2012 | Butler |
| 8,303,025 B2 | 11/2012 | Senatro |
| 8,382,194 B2 | 2/2013 | Wood |
| 8,398,150 B2 | 3/2013 | Brown et al. |
| 8,408,570 B2 | 4/2013 | Heppel et al. |
| 8,496,286 B1 | 7/2013 | Katz et al. |
| 8,579,359 B2 | 11/2013 | Brown et al. |
| 8,616,616 B2 | 12/2013 | Van Raemdonck |
| 8,783,758 B2 | 7/2014 | Baker |
| 8,801,078 B2 | 8/2014 | Brown et al. |
| 8,857,893 B2 | 10/2014 | Reiman et al. |
| 8,899,660 B1 | 12/2014 | Praskovskaya et al. |
| 8,973,973 B2 | 3/2015 | Kronemeyer |
| 8,979,172 B2 | 3/2015 | Reiman et al. |
| 8,985,677 B2 | 3/2015 | Wiegel |
| 9,004,575 B2 | 4/2015 | Grandominico et al. |
| 9,045,176 B1 | 6/2015 | Henderson, II |
| 9,139,241 B1 | 9/2015 | Smith |
| 9,199,673 B2 | 12/2015 | Baker |
| 9,199,676 B2 | 12/2015 | Brown et al. |
| 9,211,919 B2 | 12/2015 | Senatro |
| 9,296,433 B2 | 3/2016 | Roush |
| 9,308,949 B1 | 4/2016 | Mihelic et al. |
| 9,567,016 B2 | 2/2017 | Magee |
| 2003/0178611 A1 | 9/2003 | Anderson |
| 2005/0040637 A1 | 2/2005 | Wood |
| 2005/0067204 A1 | 3/2005 | Rijsbergen et al. |
| 2005/0115776 A1 | 6/2005 | Doerflinger et al. |
| 2005/0161976 A1 | 7/2005 | Ortega et al. |
| 2006/0152038 A1 | 7/2006 | Graham |
| 2006/0182580 A1 | 8/2006 | Peterson |
| 2007/0114757 A1 | 5/2007 | Vickroy |
| 2007/0120397 A1 | 5/2007 | Layfield et al. |
| 2007/0176466 A1 | 8/2007 | Dolan et al. |
| 2008/0061597 A1 | 3/2008 | Reiman et al. |
| 2008/0061598 A1 | 3/2008 | Reiman et al. |
| 2008/0093887 A1 | 4/2008 | Wood |
| 2008/0116702 A1 | 5/2008 | Enz et al. |
| 2009/0189414 A1 | 7/2009 | Boivin et al. |
| 2009/0212595 A1 | 8/2009 | Heppel et al. |
| 2009/0212596 A1 | 8/2009 | Reiman et al. |
| 2009/0218848 A1 | 9/2009 | Boivin et al. |
| 2010/0096880 A1 | 4/2010 | Boivin et al. |
| 2010/0096881 A1 | 4/2010 | Boivin et al. |
| 2010/0096882 A1 | 4/2010 | Boivin et al. |
| 2010/0096883 A1 | 4/2010 | Boivin et al. |
| 2010/0098481 A1 | 4/2010 | Boivin et al. |
| 2010/0231000 A1 | 9/2010 | Andrus et al. |
| 2010/0264690 A1 | 10/2010 | Brown et al. |
| 2010/0264691 A1 | 10/2010 | Giromini |
| 2011/0025092 A1 | 2/2011 | Reimen et al. |
| 2011/0062749 A1 | 3/2011 | Graham et al. |
| 2011/0148142 A1 | 6/2011 | Kint |
| 2011/0175396 A1 | 7/2011 | Boivin et al. |
| 2011/0204677 A1 | 8/2011 | Wood et al. |
| 2011/0285167 A1 | 11/2011 | Butler |
| 2012/0091754 A1 | 4/2012 | Lee et al. |
| 2012/0169086 A1 | 5/2012 | Giromini |
| 2012/0200113 A1 | 8/2012 | Brown et al. |
| 2012/0235441 A1 | 9/2012 | Dayton |
| 2012/0319428 A1 | 12/2012 | Wood |
| 2013/0119701 A1 | 5/2013 | Dayton |
| 2013/0181477 A1 | 7/2013 | Reiman et al. |
| 2013/0270857 A1 | 10/2013 | Brown et al. |
| 2013/0285411 A1 | 10/2013 | Layfield et al. |
| 2014/0035318 A1 | 2/2014 | Brown et al. |
| 2014/0252799 A1 | 9/2014 | Smith |
| 2014/0333089 A1 | 11/2014 | Brown et al. |
| 2014/0159419 A1 | 12/2014 | Baker |

(56) References Cited

U.S. PATENT DOCUMENTS

| | | |
|---|---|---|
| 2015/0259014 A1 | 9/2015 | Baker |
| 2016/0121940 A1 | 5/2016 | Courtney et al. |
| 2016/0244108 A1 | 8/2016 | Tsuruta et al. |

FOREIGN PATENT DOCUMENTS

| | | |
|---|---|---|
| CA | 2810007 A1 | 9/2013 |
| CA | 2812316 A1 | 10/2013 |
| CA | 2860351 A1 | 2/2015 |
| CA | 2905596 A1 | 4/2016 |
| EP | 0738621 A1 | 10/1996 |
| EP | 0857620 A1 | 8/1998 |
| JP | 2007223359 A | 9/2007 |
| KR | 20110059021 | 6/2011 |
| NL | 1034363 C2 | 2/2009 |
| WO | 97/48590 A1 | 12/1997 |
| WO | 03/093066 A1 | 11/2003 |

OTHER PUBLICATIONS

AeroFlex Fairing™ product info Page (1 page), Jul. 7, 2010.
AeroFlex Belly Fairing™ product info Page (2 pages), Jul. 7, 2010.
AeroFlex Low Rider Belly Fairing product info Page (1 page), Jul. 7, 2010.
AeroFlex Freight Wing chassis Belly Fairing product info Page (1 page) Jul. 7, 2010.
Trailer Fairings from http://www.laydoncomp.cm/trailer-skirts.php (3 pages), Jul. 7, 2010.
Trailerskirt™ Assembly Instructions, Jun. 12, 2009 Rev. 8.0 supersedes all other version, LCL-ENG-045, (7 pages).
"MFS Skirt, Maximum Flex Skirt", Transtech Composite, (2 pages), undated material.
Side Skirt Fairing: Overview: "Aeroefficient-Aerodynamic Solution for the Trucking Industry", 2010 Aeroefficient (12 pages).
Truck Fuel Savings, Aerodynamic Fairing, Aerodynamic Parts, Truck Industry "WINDYNE", (2 pages) Jul. 7, 2010.
Laydon Composites, LTD website Trailer Skirt Catalog as existed on Feb. 7, 2009, accessed via the internet ArcheiveWayBack Machine on Oct. 3, 2011, found at http://web.srchive.org/web/20090207195226/http:/www.laydoncormp.com/trailer-skirts.php.
2009 Product catalog for Takler Srl (31 pages).
The International Search Report and the Written Opinion of the International Searching Authority for related International Application No. PCT/US2010/031173, dated Jun. 14, 2010 (13 pages).
Strehl Trailer Blade Brochure, Trailer Blade™ Model 715 Advance Aerodynamic Trailer Skirt, 5 pages, 2009-2010.
Utility Brochure, Innovative Side Skirt Designs From Utility, 2 pages 2010.
Office Action in U.S. Appl. No. 12/760,798 dated Oct. 13, 2011 (12 pages).
Office Action in U.S. Appl. No. 13/448,931 dated Jun. 29, 2012 (12 pages).
Office action in U.S. Appl. No. 14/923,610 dated Aug. 31, 2016 (7 pages).
Office action in U.S. Appl. No. 13/413,998 dated Jul. 10, 2012 (9 pages).
Office action in U.S. Appl. No. 13/741,639 dated Apr. 5, 2013 (11 pages).
Office action in U.S. Appl. No. 14/049,851 dated Dec. 31, 2013 (11 pages).
Office action in U.S. Appl. No. 14/100,071 dated Mar. 26, 2015 (21 pages). U.S. Appl. No. 14/100,071 dated Mar. 26, 2015 (21 pages).
Office action in U.S. Appl. No. 14/321,977 dated Apr. 3, 2015 (12 pages).
Office action in U.S. Appl. No. 13/847,111 dated Nov. 5, 2013 (6 pages).
Office action in U.S. Appl. No. 14/644,508 dated Nov. 10, 2015 (16 pages).
Nu-Line® Introducting Nu-Line Aerodynamic Trailer Skirts brochure NLTS-0314 (2 pages).
Office action in U.S. Appl. No. 14/923,610 dated Dec. 13, 2016 (7 pages).

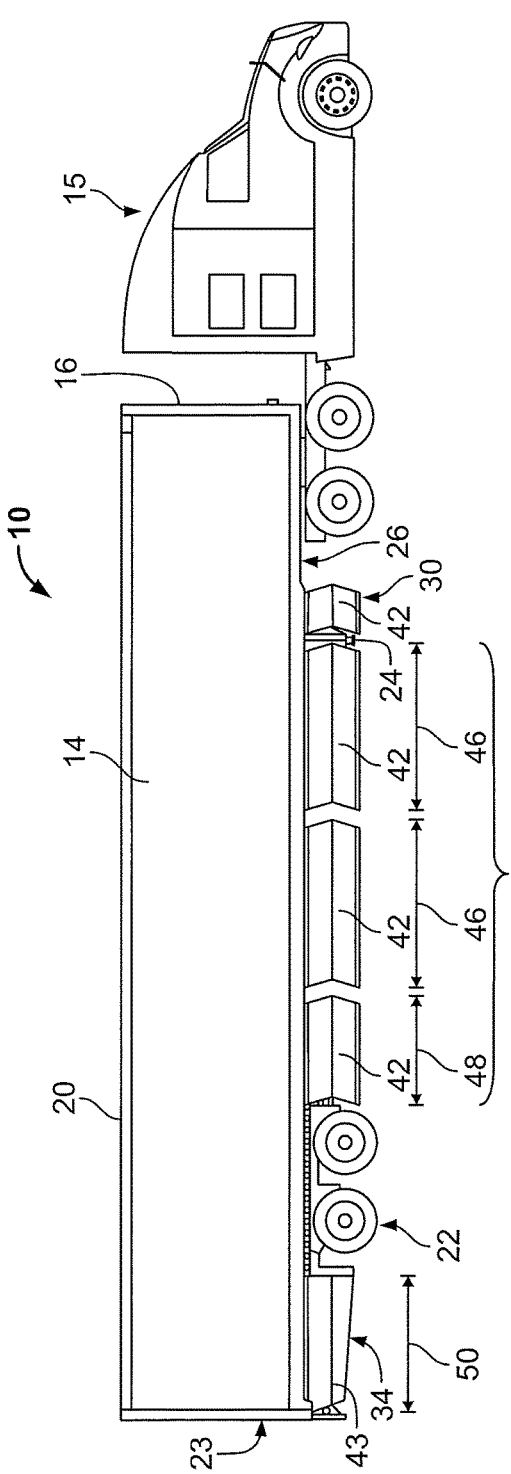
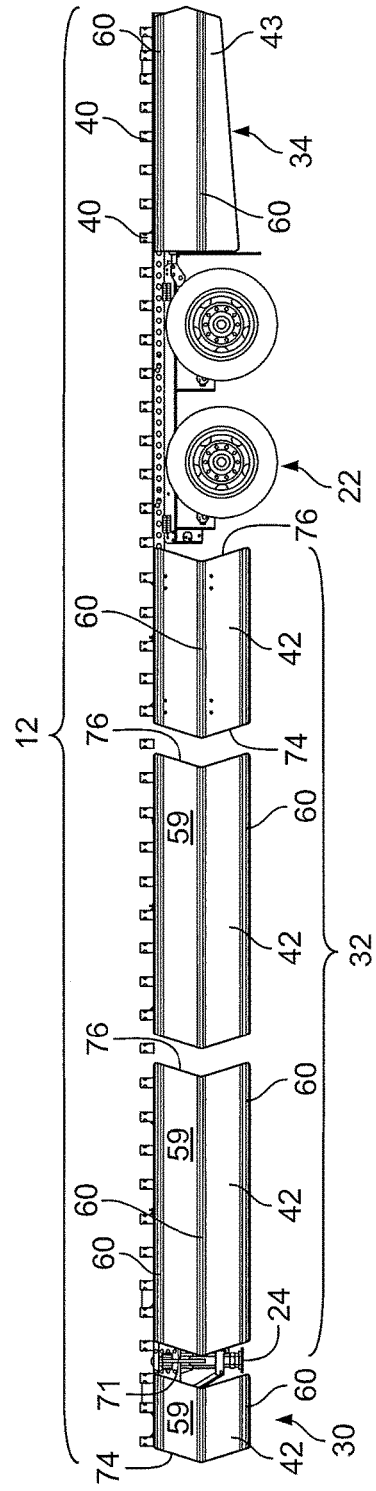

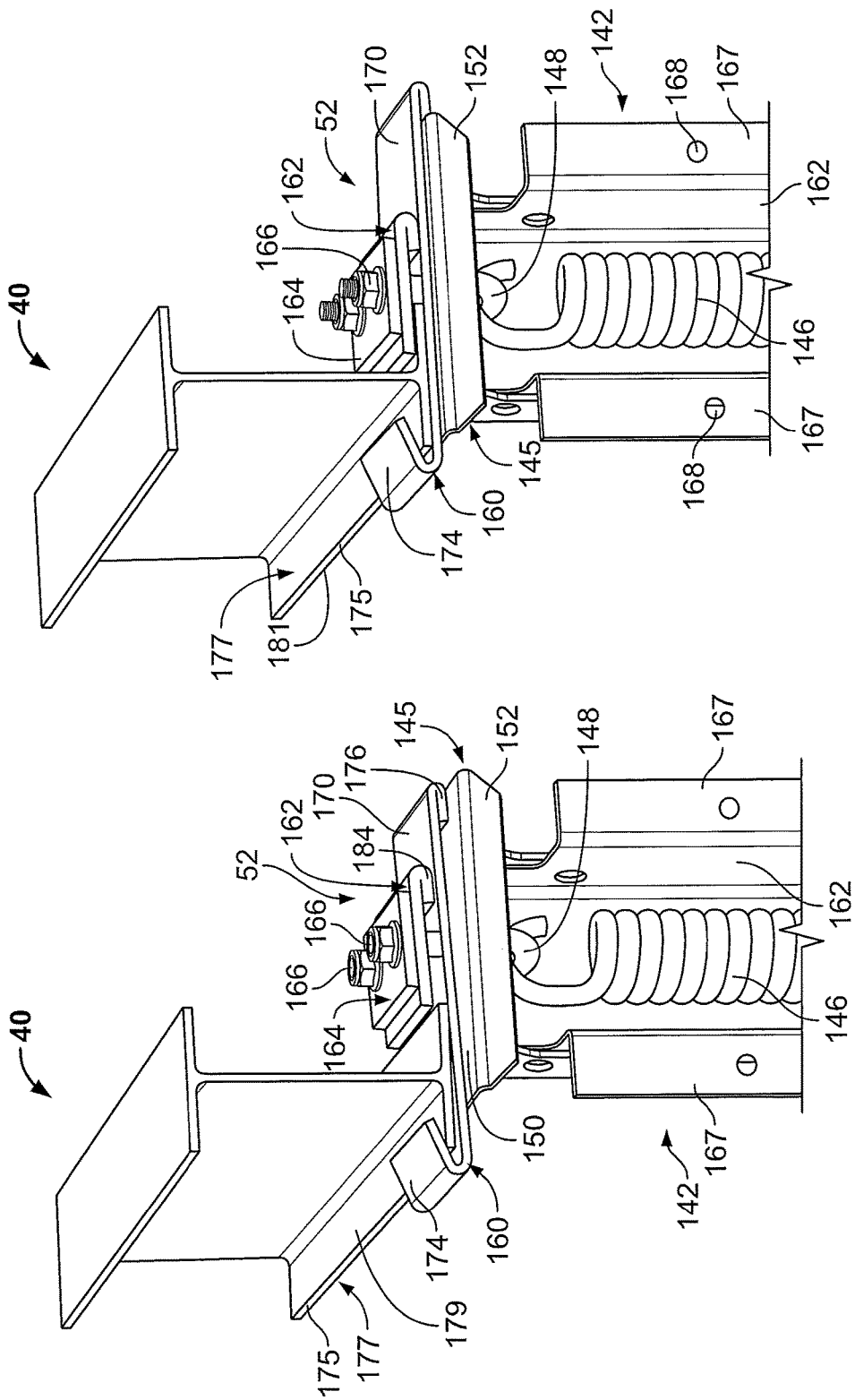

SIDE SKIRT SYSTEM FOR A TRAILER

This application is a Continuation of U.S. application Ser. No. 14/644,508 entitled SIDE SKIRT SYSTEM FOR A TRAILER and filed Mar. 11, 2015 which claims priority under 35 U.S.C. § 119(e) to both U.S. Provisional Patent Application Ser. No. 61/951,338 entitled SIDE SKIRT SYSTEM FOR A TRAILER and filed Mar. 11, 2014, and to U.S. Provisional Patent Application Ser. No. 61/993,692 entitled SIDE SKIRT SYSTEM FOR A TRAILER and filed May 15, 2014, the entirety of each of which is hereby incorporated by reference herein.

INCORPORATION-BY-REFERENCE OF MATERIAL FROM PUBLISHED PATENT APPLICATIONS AND ISSUED PATENTS

The entirety of each of U.S. Patent Application Publication Nos. US2004/0333089 published Nov. 13, 2014 and US2014/0159419 published Jun. 12, 2014 is hereby incorporated by reference herein.

The entirety of each of U.S. Pat. No. 8,177,286 issued May 15, 2012, U.S. Pat. No. 8,398,150 issued Mar. 19, 2013, U.S. Pat. No. 8,579,359 issued Nov. 12, 2013, U.S. Pat. No. 8,801,078 issued Aug. 12, 2014, and U.S. Pat. No. 8,783,758 issued Jul. 22, 2014 is hereby incorporated by reference herein.

FIELD OF THE INVENTION

The present invention relates generally to semi-trailers, such as van-type trailers, for example. In particular, the present invention relates to an aerodynamic side skirt system for reducing drag on such a trailer.

BACKGROUND OF THE INVENTION

To reduce wind flow resistance and drag on a trailer, truck, semitrailer, tank, or other vehicle, side skirts have been used which extend downwardly from a bottom of the trailer and/or chassis toward the roadway to partially enclose the floor assembly and undercarriage.

Air flow passing under a ground vehicle imparts a drag force to the vehicle when it impinges on and flows around the vehicle undercarriage components attached to or part of the underside of a vehicle. Side skirt systems are designed to prevent or control the flow of air from entering the undercarriage region from the side of the ground vehicle, such as a trailer of a tractor-trailer truck system, for example. Such reduction on the drag of the ground vehicle may operate to conserve fossil fuels as well as other sources of vehicle drive power for hybrid vehicles, battery-operated vehicles, and alternative fuel-based vehicles, for example.

SUMMARY

The present invention may comprise one or more of the features recited in the attached claims, and/or one or more of the following features and combinations thereof.

According to one aspect of the present disclosure, a side skirt system for reducing drag on a trailer or other ground vehicle includes a plurality of wall panels configured to be coupled to one side of a floor assembly of the trailer to extend generally below a storage container of the trailer at least partially along a length of the trailer. The wall panels are horizontally spaced-apart from each other. Illustratively, at least one of the wall panels is configured to be tiltably coupled to the floor assembly of the trailer in order to tilt laterally-inwardly and laterally-outwardly relative to the storage container, and at least one of the wall panels is configured to be rigidly coupled to the floor assembly of the trailer.

In one illustrative embodiment, the plurality of wall panels may include (i) a forward-most wall panel configured to be coupled to the floor assembly of the trailer at a location that is forward of a landing gear leg of the trailer, (ii) a plurality of middle wall panels configured to be coupled to the floor assembly of the trailer at a location that is between the landing gear leg and a rear wheel assembly of the trailer, and (iii) a rearward-most wall panel configured to be coupled to the floor assembly of the trailer at a location that is rearward of the rear wheel assembly of the trailer. Illustratively, the side skirt system may include a horizontal gap between the forward-most wall panel and the plurality of middle wall panels that is approximately 12 inches.

Further illustratively, the forward-most wall panel may be configured to be rigidly coupled to the floor assembly, the rearward-most wall panel may be configured to be rigidly coupled to the floor assembly, and the plurality of middle wall panels may each be configured to be tiltably coupled to the floor assembly. The side skirt system may also include (i) a spring-biased mounting bracket assembly coupled to each of the plurality of middle wall panels, and (ii) a rigid mounting bracket assembly coupled to each of the forward-most and the rearward-most wall panels. Illustratively, each of the rigid and spring-biased mounting bracket assemblies may include (i) a channel mount coupled to one of the wall panels of the side skirt system, (ii) a bolt coupled to the channel mount, (iii) a bracket configured to hook onto a side edge of a bottom flange of a cross-member of the floor assembly, and (iv) a toe clamp configured to engage an opposite side edge of the bottom flange of the cross-member of the floor assembly. The bracket may a horizontal lot formed through a planar portion thereof and the toe clamp may include an aperture formed therein. Illustratively, the bolt may be received through the slot of the bracket and the aperture of the toe clamp. Further, the bolt, with the channel mount and toe clamp coupled thereto, may be movable within the slot of the bracket.

Illustratively, each of the spring-biased mounting bracket assemblies may also include a spring having a first end coupled to the bolt and a second end coupled to the channel mount. The channel mount may be tiltable relative to the bolt, the bracket, and the toe clamp.

In another illustrative embodiment, a length of the forward-most wall panel may be less than a length of any of the plurality of middle wall panels, and a length of at least two of the plurality of middle wall panels may be different from one another.

In still another illustrative embodiment, a forward edge and a rearward edge of each of the forward-most wall panel and the plurality of middle wall panels may be generally V-shaped to define a generally V-shaped gap between each adjacent one of the forward-most and plurality of middle wall panels.

In yet another illustrative embodiment, a top edge and a bottom edge of each of the forward-most wall panel and the plurality of middle wall panels may be parallel to each other. Further, a bottom edge of the rearward-most wall panel may be angled relative to a top edge of the rearward-most wall panel.

In still another illustrative embodiment, the wall panels may each be angled from a front edge to a rear edge thereof relative to a plane defined by a sidewall of the trailer.

Illustratively, the forward-most wall panel and the plurality of middle wall panels may each be angled outwardly from a front edge to a rear edge thereof. Further, the rearward-most wall panel may be angled inwardly from a front edge to a rear edge thereof. Illustratively, an angle between the forward-most wall panel and a plane defined by the sidewall of the trailer may be greater than an angle between any one of the plurality of middle wall panels and the plane defined by the sidewall of the trailer.

In yet another illustrative embodiment, at least one of the plurality of wall panels may be generally concave.

According to another aspect of the present disclosure, a side skirt system for reducing drag on a trailer or other ground vehicle includes a first portion including a forward-most wall panel configured to be coupled to one side of a floor assembly of the trailer to extend generally below a storage container of the trailer and at least partially along a length of the trailer. The forward-most wall panel is configured to be positioned forward of a landing gear leg of the trailer. The side skirt system also includes a second portion including a plurality of wall panels configured to be coupled to one side of the floor assembly of the trailer to extend generally below the storage container of the trailer at least partially along the length of the trailer. Each of the plurality of wall panels of the second portion is configured to be positioned between the landing gear leg of the trailer and a rear wheel assembly of the trailer. The side skirt system further includes a third portion including a rearward-most wall panel configured to be coupled to one side of the floor assembly of the trailer to extend generally below the storage container of the trailer and at least partially along the length of the trailer. The rearward-most wall panel is configured to be positioned rearward of the rear wheel assembly of the trailer. Illustratively, the first, second, and third portions of the skirt system are horizontally-spaced-apart from each other. Further illustratively, the wall panels of the first and second portions are angled outwardly away from a longitudinal centerline of the trailer from a front edge to a rear edge thereof with respect to a sidewall of the trailer. Finally, the rearward-most wall panel of the third portion is angled inwardly toward the longitudinal centerline of the trailer from a front edge to a rear edge thereof with respect to the sidewall of the trailer.

In one illustrative embodiment, an angle between the rearward-most wall panel and a plane defined by the sidewall of the trailer may be approximately less than 1 degree.

In another illustrative embodiment, the forward-most wall panel, the plurality of wall panels of the second portion, and the rearward-most wall panel may each be horizontally spaced-apart from each other.

In still another illustrative embodiment, the wall panels of the first and second portions of the side skirt system may each include a horizontally-extending top edge and a horizontally-extending bottom edge parallel to the top edge. Further illustratively, the rearward-most wall panel of the third portion may include a horizontally-extending top edge and an angled bottom edge. The angled bottom edge of the rearward-most wall panel may be angled upwardly from a front edge of the rearward-most wall panel to a rear edge of the rearward-most wall panel. Illustratively, the bottom edge of the rearward-most wall panel may be configured to be generally parallel to an imaginary line extending between a bottom edge of a rear bumper of the trailer and a point where the rearward-most tire of the rear tire assembly of the trailer engages the ground.

In yet another illustrative embodiment, the forward-most wall panel defines a first length, any one of the plurality of wall panels of the second portion of the side skirt assembly defines a second length, and the rearward-most wall panel defines a third length. Illustratively, the first, second, and third lengths may be different from one another.

According to another aspect of the present disclosure, a side skirt system for reducing drag on a trailer or other ground vehicle includes a plurality of wall panels configured to be coupled to one side of a floor assembly of the trailer to extend generally below a storage container of the trailer at least partially along a length of the trailer. The illustratively wall panels are horizontally spaced-apart from each other and are configured to be positioned between a landing gear leg of the trailer and a rear wheel assembly of the trailer. The side skirt system also includes a mounting bracket assembly coupled to each wall panel and configured be coupled to a bottom flange of a cross-member of the floor assembly of the trailer. The mounting bracket assembly is movable between an unlocked position and a locked position while remaining coupled to the bottom flange. A portion of the mounting bracket assembly is horizontally movable relative to the flange when the mounting bracket assembly is in the unlocked position, and the mounting bracket assembly is not horizontally slidable relative to the flange when the mounting bracket assembly is in the locked position. Illustratively, the components of the mounting bracket assembly are coupled to each other when the mounting bracket assembly is in both the locked and unlocked positions.

In one illustrative embodiment, the mounting bracket assembly may include (i) a channel mount coupled to one of the plurality of wall panels of the side skirt system, (ii) a bolt coupled to the channel mount, (iii) a bracket configured to hook onto a side edge of the bottom flange of a cross-member of the floor assembly, and (iv) a toe clamp configured to engage an opposite side edge of the bottom flange of the cross-member of the floor assembly. Illustratively, the bracket may include a horizontal slot formed through a planar portion thereof and the toe clamp may include an aperture formed therein. Further illustratively, the bolt may be received through the slot of the bracket and the aperture of the toe clamp such that the bolt, with the channel mount and toe clamp coupled thereto, may be movable within the slot of the bracket when the mounting bracket assembly is in the unlocked position. The mounting bracket assembly may also include a spring having a first end coupled to the bolt and a second end coupled to the channel mount. The channel mount may be tiltable relative to the bolt, the bracket, and the toe clamp.

BRIEF DESCRIPTION OF THE DRAWINGS

FIG. 2 is a side view of the tractor and trailer of FIG. 1 showing a plurality of wall panels of the side skirt system including a forward-most panel positioned forward of the landing gear of the trailer, a plurality of middle panels positioned between the landing gear and the rear wheel assembly of the trailer, and a rearward-most panel positioned rearward of the rear wheel assembly.

FIG. 3 is a side view of the side skirt system and a portion of the trailer of FIGS. 1 and 2 to which it is coupled.

FIGS. 12 and 13 are perspective views of a cross-member and a portion of the mounting bracket assembly of FIGS. 10 and 11 showing the mounting bracket assembly being installed onto the lower flange of the cross-member of the floor assembly in order to secure a wall panel thereto.

DETAILED DESCRIPTION OF THE ILLUSTRATIVE EMBODIMENTS

For the purposes of promoting an understanding of the principles of the invention, reference will now be made to illustrative embodiments shown in the attached drawings and specific language will be used to describe the same. While the concepts of this disclosure are described in relation to a truck trailer, it will be understood that they are equally applicable to other vehicles generally, and more specifically to conventional flat-bed and/or box or van type trailers, examples of which include, but should not be limited to, straight truck bodies, small personal and/or commercial trailers, tanks, and the like. Accordingly, those skilled in the art will appreciate that the present invention may be implemented in a number of different applications and embodiments and is not specifically limited in its application to the particular embodiments depicted herein.

Figure 1:
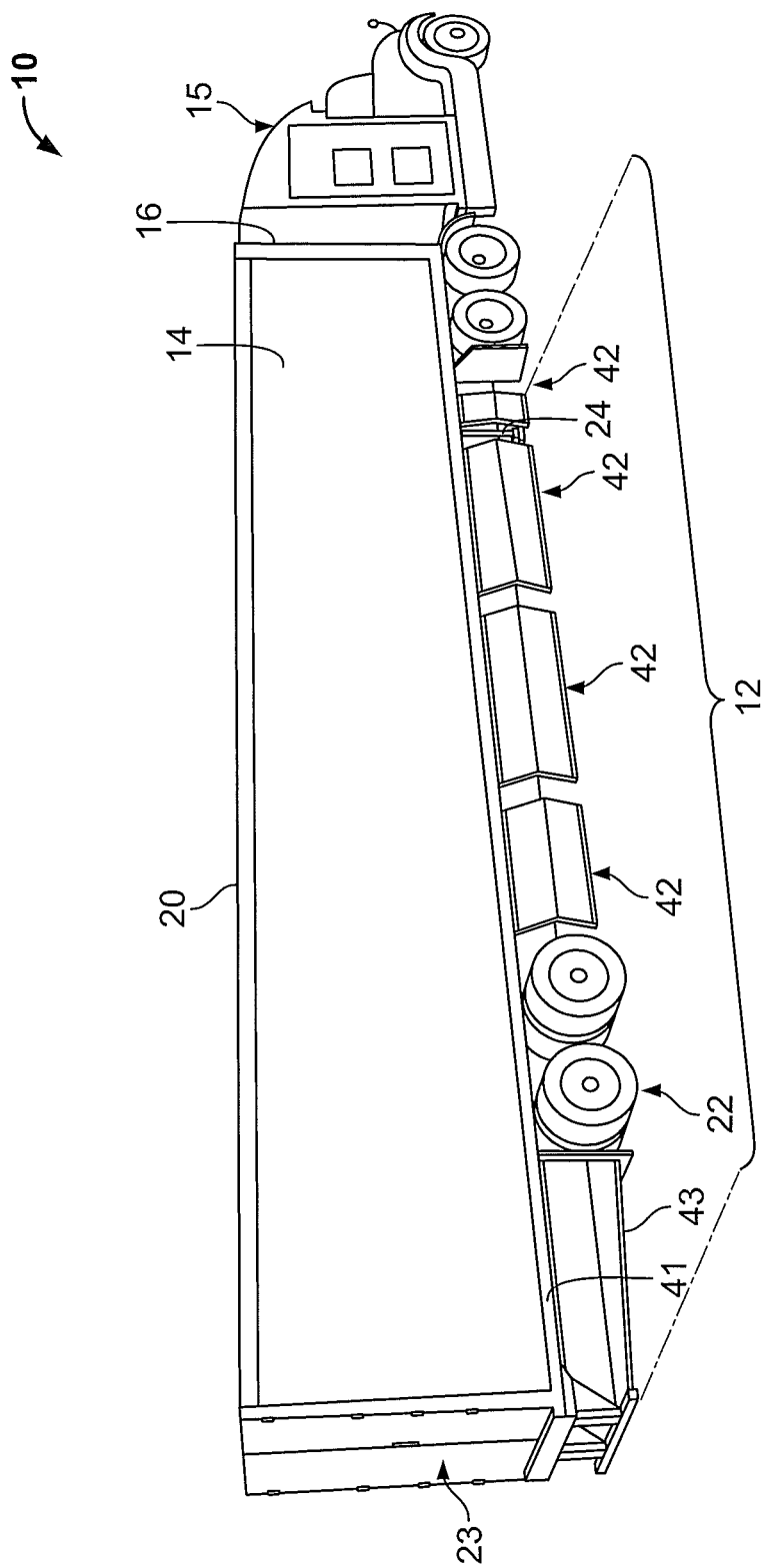
FIG. 1 is a perspective view of a trailer coupled to a tractor and an aerodynamic side skirt system of the present disclosure coupled to the trailer and extending downwardly below a sidewall of the trailer.

Looking first to FIG. 1, a trailer 10 includes an aerodynamic skirt system 12 coupled to and extending downwardly from each sidewall 14 of the trailer 10. Illustratively, the skirt system 12 operates to improve the aerodynamic efficiency of the trailer 10 by reducing drag and wind flow under the trailer 10. In particular, the skirt system 12 generally operates to reduce airflow under the trailer 10 while the trailer 10 is traveling down the road. This reduction of airflow under the trailer 10 may increase the fuel efficiency, or the efficiency of any other such source of vehicle drive power, of the tractor/trailer combination. As is discussed in greater detail below, horizontal spaces, or gaps, in the skirt system 12 also allow air that becomes trapped under the trailer 10 to escape therefrom before acting upon a rear wheel assembly 22 of the trailer 10 to cause additional drag on the trailer 10. Illustratively, the skirt system 12, as well as other skirt systems described herein, extends below a sidewall 14 of the trailer 10 at least partially along a length of the trailer 10. In particular, as is discussed in detail below, a portion of the skirt system 12 is positioned forward of the landing gear leg 24 of the trailer 10, another portion of the skirt system 12 extends generally between the landing gear leg 24 and the rear wheel assembly 22 of the trailer 10, and a final portion extends between the rear wheel assembly 22 and the rear frame assembly 23 of the trailer 10. The landing gear leg 24 and the tires of the rear wheel assembly 22 remain uncovered or unobstructed by the illustrative side skirt system 12. However, the skirt systems described herein may be modified to extend along a greater or a lesser length of the trailer 10 than what is illustratively shown in the figures. In other words, the skirt systems disclosed herein may be modified to extend along only a portion of the entire length, or along the entire, or substantially the entire, length of the trailer 10.

As shown in FIG. 1, the trailer 10 includes sidewalls 14, a front wall assembly 16, the rear frame assembly 23, and a roof assembly 20 defining an inside storage portion (not shown) able to store various articles or goods therein. The trailer 10 further includes the rear wheel assembly 22 and the front support, or landing gear leg, 24 each coupled to a floor assembly 26 of the trailer 10. Illustratively, the floor assembly 26 of the trailer 10 includes various laterally-extending cross-members 40 and right and left base rails 41 coupled to the cross-members 40 and extending along a length of the trailer 10. The front end of the trailer 10 is configured to be coupled to a tractor 15 for towing the trailer 10 thereon thus providing a tractor-trailer assembly. It should be understood that while the aerodynamic side skirt system 12 is shown for use with the trailer 10, the side skirt system 12 may be coupled to any vehicle to reduce the drag thereon.

As shown in FIG. 1, the side skirt system 12 is coupled to the floor assembly 26 of the trailer 10 to extend downwardly below the floor assembly 26 of the trailer 10. Illustratively, a first portion 30 of the side skirt system 12 is positioned forward of the landing gear leg 24, a second portion 32 of the skirt system 12 is positioned between the rear wheel assembly 22 and the landing gear leg 24, and a third portion 34 of the skirt system 12 is positioned rearward of the rear wheel assembly 22. The first, second, and third portions 30, 32, 34 of the skirt system 12 cooperate to prevent air from flowing laterally under the floor assembly 26 of the trailer 10 as the trailer 10 is towed by the tractor 15. As is discussed in greater detail below, each of the first, second, and third portions 30, 32, 34 includes one or more horizontally spaced-apart wall panels 42, 43. The wall panels 42, 43 are sized and positioned to create an air curtain over the spacing, or gaps, between each adjacent wall panel 42, 43 such that air deflected from a first wall panel 42 is deflected over the gap and to the second wall panel 42, and so on. In particular, the forward-most wall panel 42 of the side skirt system 12 operates to deflect or divert airflow from the tractor 15 away from the landing gear leg 24 and the underbody of the trailer 10.

Illustratively, the spacing between each wall panel 42, 43 operates to allow airflow from under the floor assembly 26 of the trailer 10 (which may cause additional drag against the rear wheel assembly 22 of the trailer 10) to escape, or vent, out from under the trailer 10, particularly in situations where a cross-wind across the trailer 10 is present. As noted above, longitudinal airflow along the outer surfaces of the skirt panels 42 operates to allow the air to flow smoothly from one panel to the next panel. This airflow also operates to pull or extract air from beneath the floor assembly 26 of the trailer 10 to prevent such air from impacting the rear wheel assembly 22 of the trailer 10 to cause drag on the trailer 10.

Illustratively, the space between the first and second portions 30, 32 of the skirt system 12 allows access to the landing gear leg 24 in order to allow the user to use a landing gear crank handle (not shown) to raise or lower the landing gear leg 24, for example, without the need to move or manipulate any wall panels 42 of the skirt system 12. In particular, the space, or horizontal gap between the first and second portions 30, 32 of the side skirt assembly 12 (which is generally V-shaped as noted below) is approximately 12 inches; however, it is within the scope of this disclosure for the skirt system 12 to include any suitable horizontal gap between the spaced-apart wall panels 42 that is sufficient enough to allow a user to manipulate the landing gear leg 24 located between the wall panels 42 without having to move or manipulate the wall panels 42.

Figure 4:
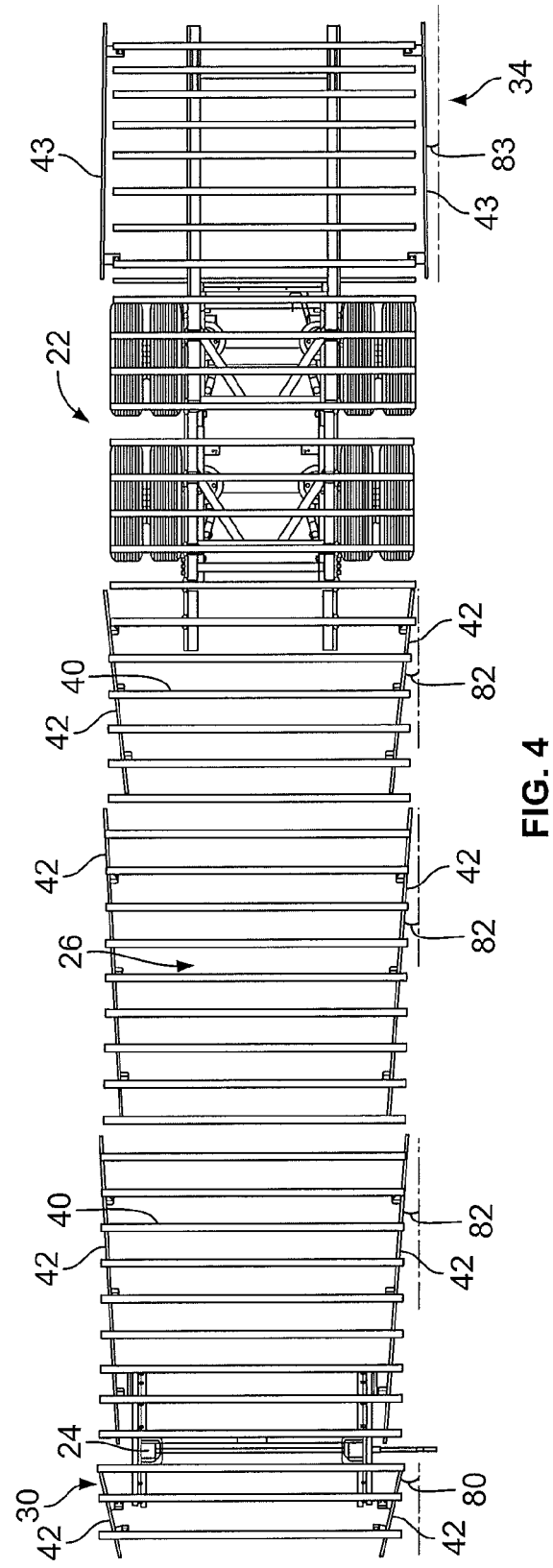
FIG. 4 is a bottom view of the trailer of FIGS. 1-3 showing the angled position of each of the wall panels of the skirt system relative to the cross-members of the floor assembly of the trailer.

Illustratively, the trailer 10 includes two aerodynamic skirt systems 12. In particular, one system 12 is coupled to one side of the floor assembly 26 of the trailer 10 to extend downwardly from the floor assembly 26 along a length of the sidewall 14 of the trailer 10 while the other system 12 is coupled to the other side of the floor assembly 26 to extend downwardly from the floor assembly 26 along a length of the corresponding sidewall 14 of the trailer 10, as shown in FIG. 4, for example. For purposes of the description herein, however, only one skirt system 12 will be described. However, it should be understood that the two skirt systems 12 of the trailer 10 are identical in configuration and function.

As shown in FIG. 1, the skirt system 12 includes a plurality of skirt panels 42, 43 horizontally spaced-apart from each other and coupled to the floor assembly 26 of the trailer 10. In particular, the front, or first, portion 30 of the skirt system 12 includes a single, forward-most panel 42, the middle, or second, portion 32 of the skirt system 12 includes three horizontally spaced-apart middle panels 42, and the rear, or third, portion 34 of the skirt system 12 includes a single, rearward-most panel 43. It should be understood that while the illustrative skirt system 12 shown in FIG. 1 includes the aforementioned number of panels 42, 43 associated with each particular portion 30, 32, 34 of the skirt system 12, it is within the scope of this disclosure for the skirt system 12 to include first, second, and third portions having any number of skirt panels 42, 43. Further, the length of each panel 42, 43 may be any suitable length and may be the same as or different from the length of any other panel 42. As shown in FIG. 2, for example, a length 44 of the panel 42 of the first portion 30 is approximately 26 inches; a length 46 of each of the first and second panels 42 of the second portion 32 is approximately 105 inches; a length 48 of the third panel 42 of the second portion 32 is approximately 69 inches; and a length 50 of the rearward-most panel 43 of the third portion 34 is approximately 86 inches. Illustratively, the spacing between each of the adjacent wall panels 42 of the first and second portions 30, 32 of the side skirt system 12 is generally the same. It is within the scope of this disclosure, however, for the spacing between the wall panels 42 to also be different from the spacing between each other wall panel. Other similarities and differences between the five wall panels 42, 43 are discussed below.

Figure 5:
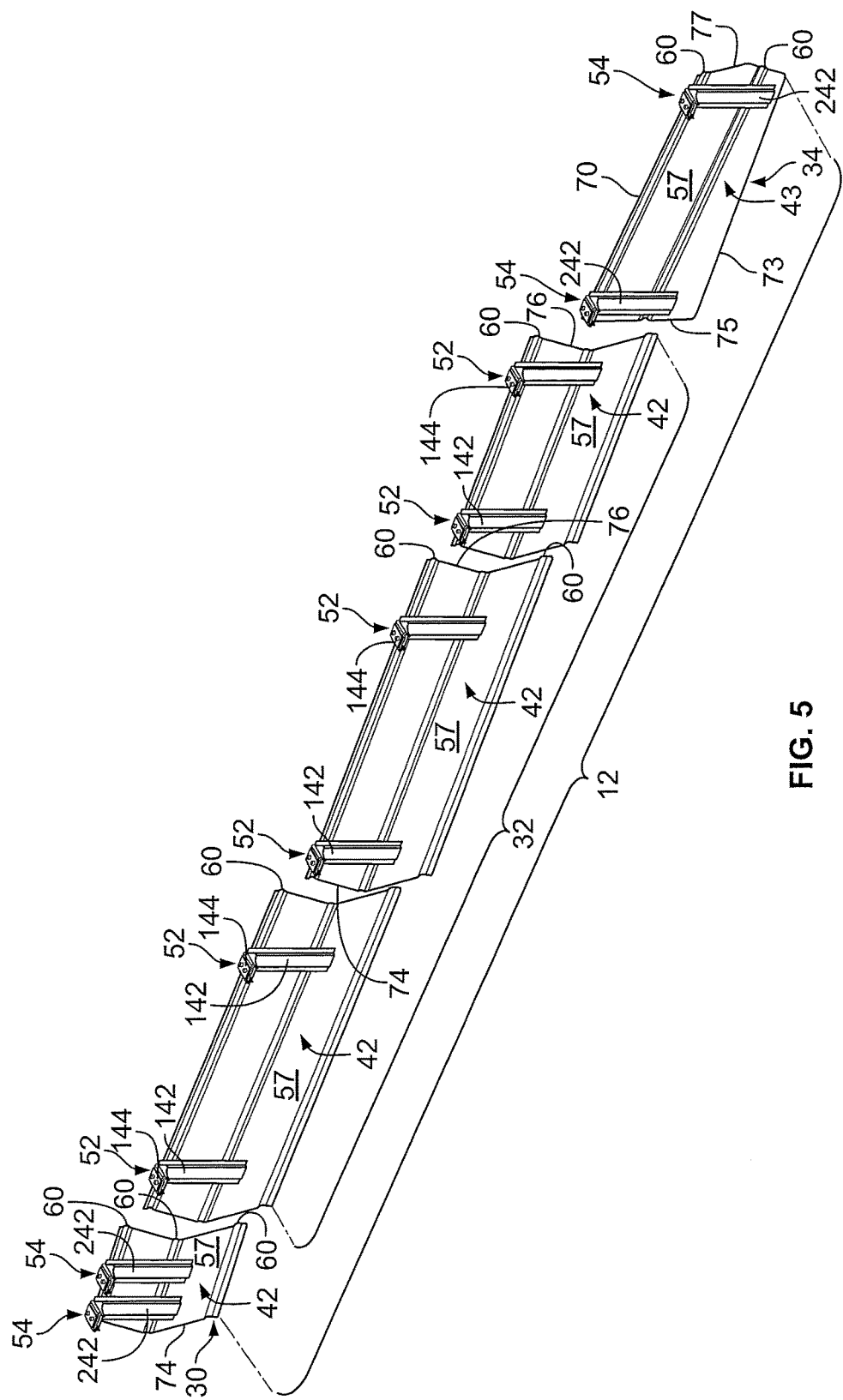
FIG. 5 is a perspective view of the inner side of the skirt system of FIGS. 1-4 showing a plurality of mounting bracket assemblies coupled to the wall panels for coupling the wall panels to the floor assembly of the trailer.
Figure 6:
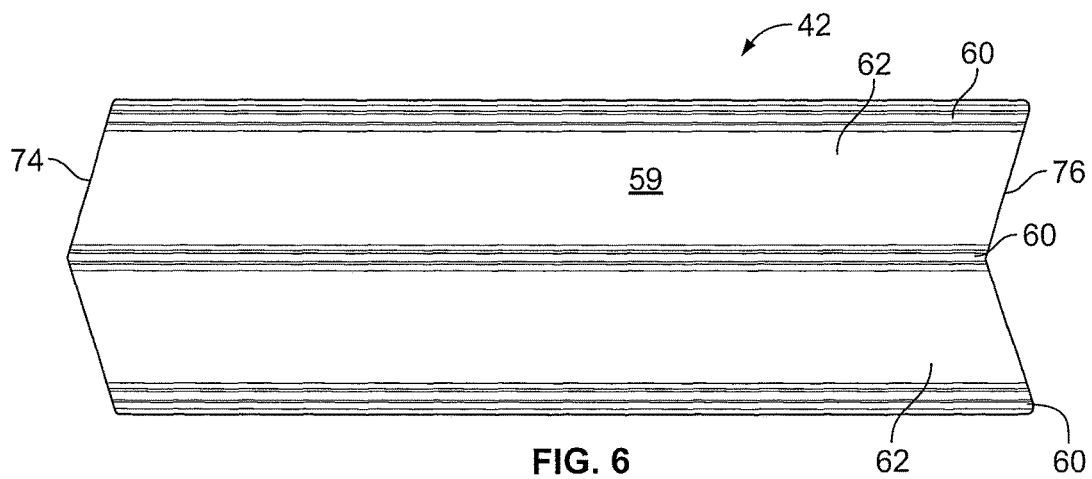
FIG. 6 is a front view of one of the wall panels of the side skirt system shown in FIGS. 1-5.

As shown in FIGS. 1-5, the wall panels 42, 43 are not directly coupled to each other, but are horizontally spaced-apart from each other to create a horizontal space or gap between adjacent wall panels 42, 43 when installed on the trailer 10. The wall panels 42, 43 are each secured to the trailer 10 by various spring-biased or rigid mounting bracket assemblies 52, 54 described in greater detail below. Illustratively, each wall panel 42, 43 is secured to the floor assembly 26 of the trailer 10 by one or more mounting bracket assemblies 52 or 54. As shown in FIG. 5, the illustrative skirt system 12 includes six spring-biased mounting bracket assemblies 52 and four rigid mounting bracket assemblies 54; however, it is within the scope of this disclosure to provide a skirt system having any number of mounting bracket assemblies 52 and/or 54 coupling any number of wall panels 42, 43 to the floor assembly 26 of the trailer 10.

As is discussed in greater detail below, the spring-biased mounting bracket assemblies 52 are provided in order couple the wall panels 42 of the second portion 32 of the skirt system 12 to the floor assembly 26 of the trailer 10 to allow those wall panels 42 of the skirt system 12 to tilt laterally both inwardly and outwardly relative to the floor assembly 26 of the trailer 10. Such tilting action may be the same as or similar to that shown and disclosed in U.S. Pat. No. 8,177,286 titled SIDE SKIRT SYSTEM FOR A TRAILER and issued May 15, 2012 (hereinafter, "the '286 patent"), the entirety of which is expressly incorporated by reference herein, for example. The ability of the second, or middle portion, 32 of the side skirt system 12 to tilt bi-laterally relative to the cross-members 40 (i.e., to tilt both inwardly and outwardly relative to the cross-members 40) allows the skirt panels 42 to potentially avoid damage when the trailer 10 traverses into or over a fixed, immovable obstacle, for example, and thus runs laterally into the obstacle for example. It should also be understood, however, that the wall panels 43 of the second portion 32 of the skirt system 12 be sufficiently rigidly mounted to the floor assembly 26 such that the wall panels 42 are generally prevented from tilting under normal wind and road air forces.

As is discussed in greater detail below, while the wall panels 42 of the second portion 32 of the side skirt assembly 12 are each coupled to the floor assembly 26 of the trailer 10 by the spring-biased mounting bracket assemblies 52, the forward-most panel 42 of the first portion 30 and the rearward-most panel 43 of the third portion 34 of the side skirt system 12 are each coupled to the floor assembly 26 of the trailer 10 by the rigid mounting bracket assemblies 54 in order to generally prevent tilting movement of those forward-most and rearward-most panels 42, 43 relative to the floor assembly 26. It should be understood, however, that the forward and rearward-most panels 42, 43 of the skirt system 12 may be coupled to the floor assembly 26 using the tiltable mounting bracket assemblies 52 as well. The forward-most panel 42 is mounted adjacent to (and forward of) the landing gear leg 24. As such, it may be preferable to restrict tilting movement of the forward-most panel 42 in order to prevent the forward-most panel 42 from impacting components associated the landing gear leg 24.

Further, the rearward-most panel 43 is positioned adjacent to (and generally rearward of) the rear wheel assembly 22 of the trailer 10. The rear wheel assembly 22 is typically configured to be movable forwardly and rearwardly in order to adjust the position of the rear wheel assembly 22 along the length of the trailer 10. As such, it is preferable to restrict tilting movement of the rearward-most panel 43 in order to prevent the rearward-most panel 43 from interfering with the rear wheel assembly 22 when the rear wheel assembly in its forward-most position relative to the floor assembly 26 of the trailer 10. Further, the illustrative rigid mounting bracket assembly 54 is thinner than, and defines a lower profile than, the spring-biased mounting bracket assembly 52. As such, the use of a narrower mounting bracket assembly, such as the rigid assembly 54, in the area adjacent the rear wheel assembly 22 further operates to prevent the mounting bracket assembly 54 from interfering with rear wheel assembly 22. It should be understood, however, that the spring-biased mounting bracket assembly 52 may be used in association with the forward-most and rearward-most wall panels. 42, 43 as well. Further, any suitable flexible and/or tiltlable mounting bracket assembly may be used in association with the forward-most and rearward-most wall panels 42, 43 of the side skirt system 12 as well as with the middle wall panels 42 of the second portion 32 of the side skirt system 12.

Illustratively, each wall panel 42, 43 (as well as all other wall panels disclosed herein) is made of a lightweight, high-strength composite material such as a fiber-reinforced plastic. Any suitable fiber including carbon, glass, aramid, or basal may be used. Further, any natural or manmade reinforcement fiber, or other additive, in continuous, or non-continuous forms may be used as well. The composite material may include any suitable plastic including epoxy, vinylester or polyester thermosetting plastic, and phenol formaldehyde resins. The wall panels described herein may be injection molded or thermoformed glass-reinforced polymer structures such as those made by the company Polystrand, Inc. of Englewood, Colo., for example.

The illustrative composite material is made from six layers combined together to create the final composite material. Three of the illustrative layers are glass-reinforced polypropylene layers that each include three layers of unidirectional tapes including two tapes with fibers extending horizontally separated by one tape with fibers extending vertically. These three layers are each separated by non-woven layers each including non-woven material made from polyester and polypropylene fibers. A sixth, outermost layer is a matte PET film. This outer layer may be provided on the inside surface of each wall panel 42, 43 as well to create a seventh layer. Illustratively, the PET film includes a sacrificial peel ply on it to keep the panels 42, 43 clean and to protect the exterior finish of the panels 42, 43 during processing and installation. The sacrificial film(s) is then discarded upon installation. Such a composite material provides a rigid, but lightweight, flexible, and durable material. It should be understood that while the particular layup of the composite material of the wall panels 42, 43 is described herein, the wall panels may include any suitable layup including nay desired number of layers of various materials. In other words, the particular composition of the layup may be varied in order to achieve a particularly desirable flexibility, resiliency, and/or rigidity.

Providing wall panels 42, 43 which are manufactured from a fiber-reinforced plastic material may allow the wall panels 42, 43 to suitably flex when encountering an object or obstacle on the road and thereafter return to their original, generally vertical orientation. In other words, the illustrative wall panels 42, 43 are generally resilient and may be configured to flex when the trailer 10 is driving over an obstacle in the path of one or more wall panels 42, 43. Once the obstacle has been passed, the panels 42, 43 are able to return to their unflexed position hanging generally vertically downwardly below the sidewall 14 of the trailer 10.

Illustratively, the wall panels disclosed herein may include a varying thickness along a height of the main body of the wall panels. In particular, a thickness at a top end of the wall panel may be greater than a thickness at a bottom end of the wall panel. The thickness may be decreased from top to bottom via distinct steps, or the thickness may be tapered from top to bottom. Illustratively, the thickness at the top end of the wall panel may be approximately 0.5 inches while the thickness at the bottom end of the wall panel may be approximately 0.06 inches. It should also be understood that the thickness of the wall panel may also remain constant along the height of the wall panel.

The varying thickness of the wall panel along the height of the wall panel provides that the upper portion of the wall panel is generally stiffer than the lower portion of the wall panel. That is, the lower portion of the wall panel is more flexible than the upper portion. As such, the flexible lower portion of the wall panel operates to resist airflow and may prevent damage to the wall panel from forces applied vertically such as in situations where the trailer 10 may traverse over a curb or railroad track where the road surface is not flat. In such instances, for example, the lower portion of the wall panel is configured to bend, or flex, to prevent damage to the upper portion of the wall panel to which it is attached.

It should be understood that the wall panels disclosed herein may include any varying wall thickness such that the top portion of the wall panels may be thinner than a bottom portion of the wall panels, or a middle portion of the wall panel may have a thickness different from that of the upper and lower portions of the wall panels. In other words, it is within the scope of this disclosure to vary the thickness of the wall panels along a height of the wall panels, as well as along a width of the wall panels, in order to provide the desired range of flexibility and rigidity to various portions of the wall panel. Illustratively, the wall panels disclosed herein may further include a flexible flap (not shown) coupled to the bottom edge of the skirt portion in the same or similar manner as that which is shown and described in the '286 patent. Illustratively, the flexible flap may be made of plastic or other suitable materials.

Further illustratively, the wall panels may have varied thickness across the width of the wall panel such that the wall panels may be thicker in the vertical region where the mounting bracket assemblies are attached, and thinner in the regions therebetween. The thickness of various regions of the wall panels may be optimized to resist deflection, stress and/or fracture while also reducing the overall weight of the wall panels.

The wall panels may also be manufactured using laminate layers with constant thickness and varying stiffness properties such that the resulting panel is of a constant thickness while yielding varying levels of stiffness from top to bottom or from end to end. This may be achieved by varying the type, content, and/or direction of such reinforcing fibers as well as selective removal of such reinforcing fibers such that the panel thickness remains constant. In particular, the layup of the fiber-reinforced polymer skins may be varied such that the direction of the strands is different at different heights. As such, the cross-section of the wall panel may remain constant for manufacturability, while allowing the stiffness properties to vary similarly to a graded composite, along the height and/or width of the wall panel. Such panels offer enhanced manufacturability while also offering, in one embodiment, enhanced stiffness in the upper section with enhanced flexibility in the lower section such as may be desirable to deal with aerodynamic and impact loads.

While the particular wall panels disclosed herein are made of the aforementioned composite material, each wall panel described herein may alternatively be made of a DURAPLATE® composite panel provided by Wabash National Corporation of Lafayette, Ind. DURAPLATE® composite panels are constructed of a high-density polyethylene plastic core bonded between two high-strength steel skins. Such a composite material provides a rigid, but lightweight and durable material. Further alternatively, the wall panels may be made of other rigid, semi-rigid, metallic or non-metallic materials and may alternatively be made of high density polyethylene as well as one or more other metals, metal alloys, plastics, and/or composite materials. The wall panels may be made from ferrous or nonferrous materials including plastics or composites incorporating a combination of ferrous and/or nonferrous materials thereof. In particular, an alternative panel (not shown) may be made from galvanized steel. Of course, it is within the scope of this disclosure to include non-galvanized steel sheets, or other such non-composite panels, of any suitable thickness as well.

Illustratively, as shown in FIGS. 3, 5, 6, and 7 each of the panels 42 of the front and middle portions 30, 32 of the skirt system 12 includes top, middle, and bottom horizontal ribs 60 which project outwardly away from the trailer 10. Illustratively, it should be understood that the wall panels 42, 43 disclosed herein may also, or alternatively, include ribs which project inwardly. Further, while the illustrative ribs 60 are horizontal, it should be understood that the wall panels disclosed herein may include ribs which are vertical, curved, and/or diagonal, for example. Between the top and middle ribs 60 of these 42 panels is a generally planar portion 62 of the panels 42 and between the middle and bottom ribs 60 of these panels 42 is another generally planar portion 62 of the panel 42. As shown in FIGS. 3 and 4, small planar portions 64 are provided both above and below the top and bottom ribs 60, respectively. The ribs 60 are provided to increase the stiffness of the wall panels 42. Illustratively, while three ribs 60 are provided, it should be understood that each panel 42 may be configured to include any number of suitable ribs, or no ribs at all, in order to modify the stiffness of the wall panel 42 to that of a specifically desired level. The use of additional ribs 60 operates to increase the stiffness of the panels 42 while fewer ribs operates to decrease the stiffness of the panels 42. As such, changing the number of ribs 60 changes the stiffness of the panels 42.

Figure 7:
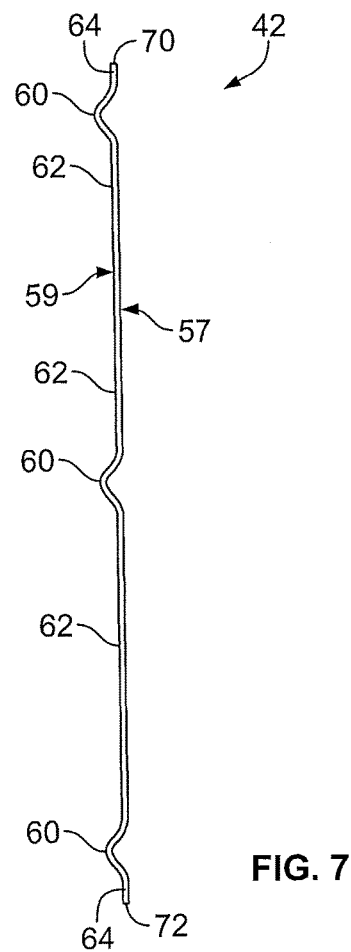
FIG. 7 is a side view of the wall panel of FIG. 6 showing three ribs of the wall panel.

As shown in FIG. 7, the distance between the top and middle ribs 60 is generally equal to the distance between the middle and bottom ribs 60. It should be understood however, that the wall panels 42 of the present disclosure may be configured to include ribs having any suitable spacing therebetween. Illustratively, the ribs 60 of the wall panels disclosed herein provide an integrated stiffening member, or corrugation, of the wall panels that is integrally formed with the main body of the wall panels. However, it should be understood that such stiffening members (such as one or more ribs 60, for example) may be formed separately from the wall panel and subsequently coupled to the inner and/or outer surfaces of the wall panel in order to suitably stiffen the wall panel.

As shown in FIG. 3, each of the wall panels 42 of the front and middle portions 30, 32 of the skirt system 12 includes an inside surface 57 (shown in FIG. 5), an outside surface 59, a top edge 70, a bottom edge 72, a front edge 74, and a rear edge 76. The top and bottom edges 70, 72 are generally parallel to each other and define generally straight, horizontal lines. The front and rear edges 74, 76 of each of the wall panels 42 of the front and middle portions 30, 32 of the skirt system 12 are generally V-shaped. Illustratively, the point of the V-shaped edges 74, 76 is located at the center of the panel 42 aligned with the middle rib 60 of the panel 42. Further, the point of the V-shaped edges 74, 76 is positioned forward of the top and bottom ends of the respective front and rear edges 74, 76. The V-shaped edges 74, 76 of adjacent panels cooperate to define generally V-shaped, horizontally-extending gaps, or spaces, between adjacent wall panels 42, 43. While the particular edges 74, 76 of the wall panels 42 disclosed herein are V-shaped, it should be understood that it is within the scope of this disclosure to include front and rear edges 74, 76 as well as top and bottom edges 70, 72 which are straight, curved, angled, and/or a combinations of each.

The wall panels 42 of each of the front and middle portions 30, 32 of the skirt system 12 are generally the same as or similar in shape and corresponding features except that the length, as noted above, of each of these wall panels may differ from one another. In particular, the length 44 of the forward-most wall panel 42 of the first portion 30 of the skirt system 12 (located forward of the landing gear leg 24 of the trailer) is the smallest of all the wall panels 42 of the skirt system 12. The lengths 46 of each the front and middle wall panels 42 of the second portion 32 of the skirt system 12 (located between the landing gear leg 24 and the rear wheel assembly 22) is equal to one another and are illustratively greater than the length 44 of the forward-most panel 42. The length 48 of the third, or rearward, panel 42 of the second portion 32 of the skirt system 12 is shorter than the first two panels 42 of the second portion 32, but longer than the forward-most panel 42 of the first portion 30.

Illustratively, a height of each of the panels 42 of the first and second portions 30, 32 of the skirt system 12 is equal to one another. While the particular lengths of each of the wall panels 42 of the first and second portions 30, 32 of the skirt system 12 are shown in the figures and described herein, it should be understood that the first and second portions 30, 32 of the skirt system 12 may include any suitable number of panels having any suitable length that is the same as or different from the length of any other panel of the system. It should further be understood that while the spacing between the panels 42 of the first and second portions 30, 32 of the skirt system 12 is generally equal, it is within the scope of this disclosure to space the panels 42 of the first and second portions 30, 32 of the skirt system 12 any suitable distance apart from each other, and that such distance may be the same as or different from the distance between any other two adjacent panels 42.

As shown in FIG. 4, the wall panels 42 of the first and second portions 30, 32 of the skirt system 12 are mounted at a non-perpendicular angle relative to the cross-members 40 of the floor assembly 26 of the trailer 10. As such, these panels 42 are mounted at an angle relative to a plane defined by the sidewall 14 of the trailer 10 and are therefore not parallel to the sidewall 14 of the trailer 10. Illustratively, an acute angle 80 between the forward-most wall panel 42 of the skirt system 12 (i.e., the panel 42 of the first portion 30 positioned forward of the landing gear leg 24) is approximately 13 degrees; an acute angle 82 between the forward-most and middle wall panels 42 of the second portion 32 of the skirt system 12 is approximately 3.5 degrees; and an acute angle 84 between the rearward-most wall panel 42 of the second portion 32 of the skirt system 12 is approximately 5.5 degrees. As noted above, the angled wall panels 42 operate to deflect air from one wall panel over the gaps between adjacent wall panels to the next wall panel in order to create an air curtain over the gaps between each adjacent wall panel, including the gaps between the first and second portions 30, 32 of the skirt assembly 12 as well as between the second and third portions 32, 34 of the skirt assembly 12.

While these wall panels 42 are positioned relative to the sidewall 14 of the trailer 10 and the cross-members 40 to define the particular acute angles, 80, 82, 84 noted above, it should be understood that the wall panels 42 of the first and second portions 30, 32 of the skirt system 12 may be positioned at any suitable angle relative to the sidewall 14 and the cross-members 40 of the trailer 10 and that such angles may be the same as or different from the angles of every other wall panel 42. Of course, one or more of these panels 42 may be positioned to be generally parallel to the sidewall 14 of the trailer 10 as well.

Figure 8:
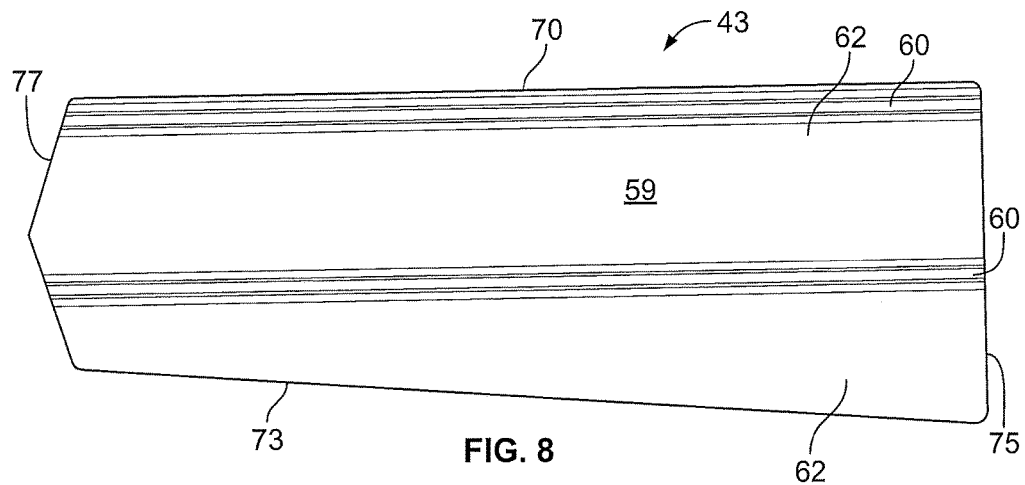
FIG. 8 is a front view of the last, or rearmost, wall panel of the side skirt system shown in FIGS. 1-5.
Figure 9:
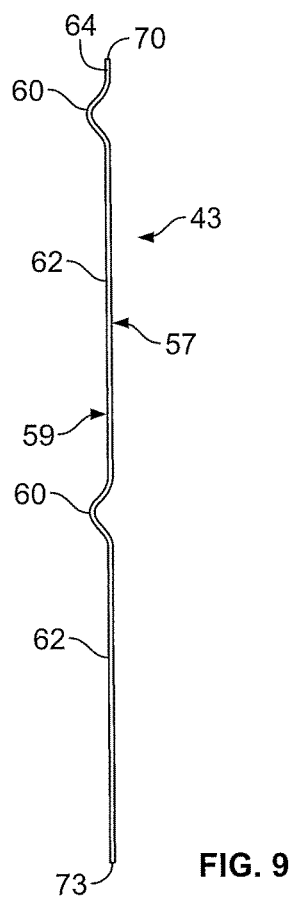
FIG. 9 is a side view of the rearward-most wall panel of FIG. 8 showing two ribs of the wall panel.

Looking now to FIGS. 8 and 9, the rearward-most wall panel 43 is provided to direct air over a rear bumper of the trailer in order to reduce turbulence behind the rear wheel assembly 22 of the trailer 10 as the trailer 10 is traveling down the highway, for example. The rearward-most wall panel 43 of the third portion 34 of the skirt system 12 includes an inside surface 57, an outside surface, and a top edge 70 that is the same as or similar to the top edges 70 of the wall panels 42 discussed above. That is, the top edge 70 is extends generally horizontally. The rearmost wall panel 43 further includes a rear edge 77 the same as or similar to the V-shaped front edges 74 of the wall panels 42 discussed above. As shown in FIG. 3, the V-shaped rear edge 77 extends rearwardly in the opposite direction as the V-shaped front edges 74 of the wall panels 42 of the first and second portions 30, 32 of the skirt system 12.

The rearmost wall panel 43 also includes a front edge 75 that extends generally vertically at approximately a 90 degree angle to the top edge 70, and a bottom edge 73 that is angled upwardly from the front edge 75 to the rear edge 77, as shown in FIGS. 3 and 8. The illustrative bottom edge 73 of the rearward-most wall panel 43 is angled upwardly in order to provide sufficient ground clearance for the wall panel 43. Oftentimes, trailers may scrape the bottom of the rear bumper of the trailer while the trailer travels up steep inclines, for example. As such, the rear edge 77 of the wall panel 43 does not generally extend below a bottom surface of the rear bumper of the trailer 10 in order to prevent the rearward-most panel 43 from also potentially scraping the road as the trailer travels up a steep incline. Illustratively, the bottom edge 73 of the panel 43 is generally parallel to an imaginary line extending between a bottom edge of the bumper of the trailer and the point where the rear-most tire of the rear tire assembly 22 meets the ground upon which, the trailer 10 rests. Of course, it should be understood that the wall panel 43 may include a bottom edge 73 having any suitable shape or angle relative to the other edges of the wall panel 73.

Illustratively, as shown in FIGS. 8 and 9, the rearmost wall panel 43 includes two horizontally-extending ribs 60. The upper rib 60 is positioned in general alignment with the top ribs 60 of the wall panels 42 of the skirt system 12, while the lower rib 60 is in general alignment with the middle ribs 60 of the wall panels 42 of the skirt system 12, as shown best in FIG. 3. The ribs 60 of the wall panel 43 similarly project outwardly away from the trailer 10 such that channels are formed on the inside surface 57 of the wall panels 42, 43. Similar to the wall panels 42, a planar portion 62 of the wall panel 43 is located between the upper and lower ribs 60 and below the lower rib 60. A smaller planar portion 64 is provided above the upper rib 60 of the wall panel 43. As with the ribs 60 of the wall panels 42, the ribs 60 of the wall panel 43 are provided to increase the stiffness of the wall panel 43. Illustratively, while two ribs 60 are provided in the wall panel 43, it should be understood that the panel 43 may be configured to include any number of suitable ribs, or no ribs at all, in order to modify the stiffness of the wall panel 43 to that of a specifically desired level. Further, the rearmost panel 43 may be provided with ribs having any suitable distance, or spacing, between any two or more adjacent ribs 60 that is the same as or different from the spacing between the ribs 60 of the wall panels 42.

Illustratively, a height of the front edge 75 of the rearmost wall panel 43 is generally the same as or similar to the height of each of the panels 42 of the first and second portions 30, 32 of the skirt system 12. However, a height of the rear end portion of the panel 43 is less than the height of the front edge 75. Illustratively, while the particular height and length of the wall panel 43 is shown in the figures and described herein, it should be understood that rearmost panel 43 may include any suitable height and may also define any suitable length that is the same as or different from the length of any other panel of the system. It should further be understood that while the third portion 34 of the illustrative skirt system 12 includes only the single panel 43, it is within the scope of this disclosure for the third portion 34 of the skirt system 12 positioned rearward of the rear wheel assembly 22 to include any suitable number of panels 43. Further, it is within the scope of this disclosure to provide a skirt system 12 without any wall panels positioned rearward of the rear wheel assembly 22.

As shown in FIG. 4, the wall panel 43 of the third portion 34 of the skirt system 12 is also mounted at a non-perpendicular angle to the cross-members 40, as shown in FIG. 4. Illustratively, however, while the panels 42 of the side skirt assembly 12 are angled outwardly from a front edge 74 to a rear edge 76 thereof, the rearward-most wall panel 43 is angled inwardly from a front edge 75 to a rear edge 77 thereof to define an angle 83 that is less than approximately 1 degree. Particularly, the illustrative angle 83 may be approximately 0.7 degrees. Illustratively, the front edge 75 of the rearward-most panel 43 is positioned outside the base rail 41 of the trailer 10. The rearward-most panel 43 is angled inwardly in order to direct the air that has been directed around the rear wheel assembly 22 from the rear panel 42 of the second portion 32 of the side skirt system 12 and gently turn the air back inwardly behind the rear end of the trailer 10 in order to further reduce drag on the trailer 10. It should be understood that while the wall panels 42 of the side skirt system 12 are each angled outwardly (from the front edge to the rear edge thereof) relative the sidewall 14 of the trailer 10, any one or more of the wall panels 42 may alternatively be angled inwardly at any suitable angle and/or may be mounted generally perpendicular to the cross-members 40 of the floor assembly 40 and thus may be parallel to the sidewall 14 as well. Similarly, while the wall panel 43 of the side skirt system 12 is angled inwardly from the front edge to the rear edge thereof relative to the sidewall 14 of the trailer 10, the panel 43 may alternatively be angled outwardly at any suitable angle and/or may be mounted generally perpendicular to the cross-members 40 of the floor assembly and thus may also be parallel to the sidewall 14 of the trailer 10 as well.

As noted above, the wall panels 42, 43 are coupled to the floor assembly 26 of the trailer 10 using the spring-biased mounting bracket assemblies 52 and the rigid mounting bracket assemblies 54. In particular, the forward-most panel 42 of the skirt system 12 (i.e., the first portion 30) and the rearward-most panel 43 of the skirt system 12 (i.e., the third portion 34) are each coupled to the floor assembly 26 of the trailer 10 using the rigid mounting bracket assemblies 54, while the three wall panels 42 of the second portion 32 of the skirt system 12 are each coupled to the floor assembly 26 of the trailer 10 by the spring-biased mounting bracket assemblies 52, as shown in FIG. 5. Illustratively each of the panels 42, 43 are coupled to the trailer 10 using two respective spring-biased or rigid mounting bracket assemblies 52, 54; however, it is within the scope of this disclosure to provide a skirt assembly wherein any suitable number of spring-biased and/or rigid mounting bracket assemblies 52, 54 are used to couple the skirt panels 42, 43 to the floor assembly 26 of the trailer 10.

Figure 10:
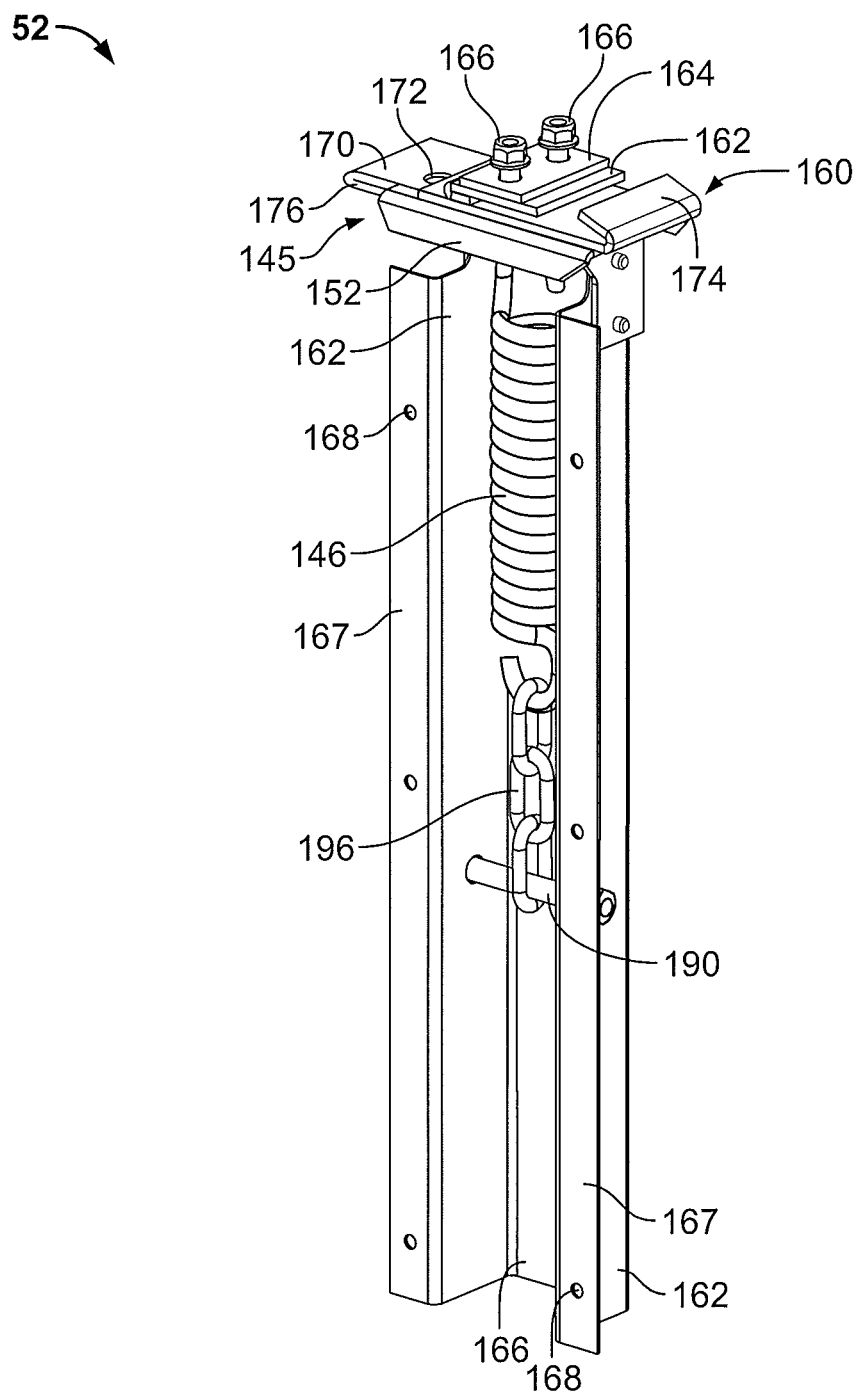
FIG. 10 is a perspective view of one of the mounting bracket assemblies of the side skirt system shown in FIGS. 1-5.
Figure 11:
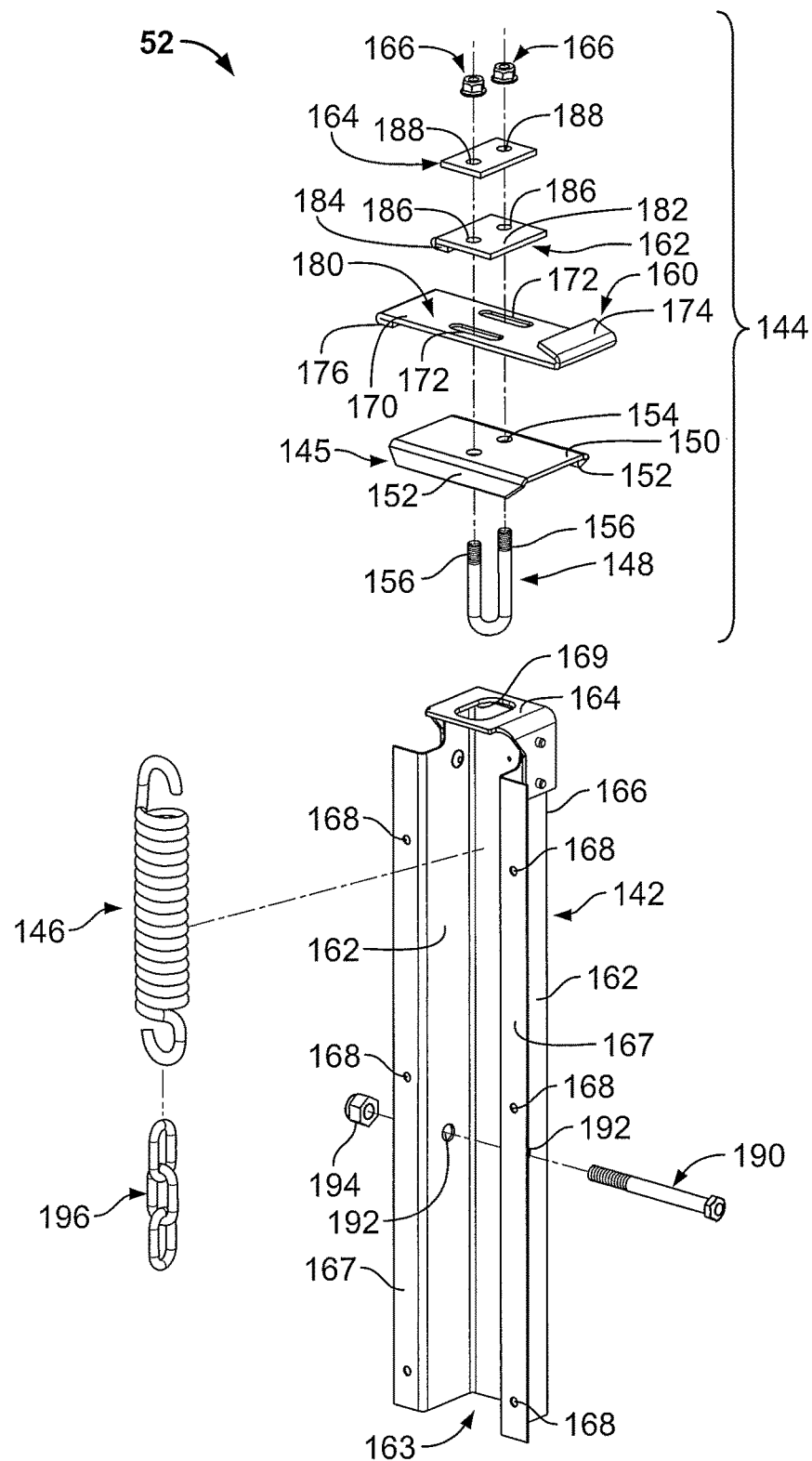
FIG. 11 is an exploded perspective view of the mounting bracket assembly of FIG. 10.

Illustratively, each spring-biased mounting bracket assembly 52 is coupled to a cross-member 40 of the floor assembly 26 of the trailer 10. As shown in FIGS. 10 and 11 each spring-biased mounting bracket assembly 52 includes a channel mount 142 configured to be coupled to one of the wall panels 42, an attachment assembly 144 configured to couple the mounting bracket assembly 52 to the cross-member 40, and an extension spring 146 to allow the channel mount 142 to tilt relative to the attachment assembly 144. The channel mount 142 includes space-apart side walls 162, a top wall 164 coupled to each side wall 162, an inside wall 166, and side flanges 167 extending outwardly from an outside end of each side wall 162. Illustratively, the sidewalls 162 and inside wall 166 cooperate to define a passageway 163 therebetween. Illustratively, each side flange 167 includes a plurality of apertures 168 formed therein. Each aperture 168 is configured to receive a fastener (not shown) such as a bolt, rivet, or screw, for example, in order to couple the channel mount 142 to a wall panel 42. As is discussed below, the top wall 164 of the channel mount 142 includes an aperture 169 configured to receive a portion of the attachment assembly 144 therethrough.

The attachment assembly 144 includes a mounting plate 145 having a base wall 150 and two side flanges 152 coupled to and angled downwardly from each side of the base wall 150. The attachment assembly 144 further includes a U-bolt 148 received through two apertures 154 formed in the base wall 150 of the mounting plate 145. The attachment assembly 144 includes a bracket 160, a toe clamp 162, an upper plate 164, and two nuts 165 configured to be received onto the threaded ends 156 of the U-bolt 148. As shown in FIG. 11, the bracket 160 includes a planar portion 170 having two elongated slots 172 formed therein. The elongated slots 172 are configured to receive the ends of the U-bolt 148 therethrough and are provided, as is discussed below, to allow a user to slide the mounting plate 145, U-bolt 148, and channel mount 142 relative to the bracket 160 when attaching the mounting bracket assembly 52 to a lower flange of the cross-member 40. The bracket 160 further includes an upwardly-turned hooked portion 174 at one end of the planar portion 170 and a downwardly-extending flange 176 at the other end of the planar portion 170. As shown in FIGS. 12 and 13, the hooked portion 174 is configured to hook onto a side edge 175 of the bottom, horizontal flange 177 of the cross-member 40 such that an upper surface 180 of the planar portion 170 is engaged with a lower surface 181 of the flange 177.

The toe clamp 162 of the attachment assembly 144 includes a planar portion 182 and a spacer 184 coupled to the planar portion 182. Two apertures 186 are formed through the planar portion 182 of the toe clamp 162 to receive the two threaded ends 156 of the U-bolt 148 therethrough. The upper plate 164 also includes two apertures 188 configured to receive the two threaded ends 156 of the U-bolt 148 therethrough. The nuts 165 are provided to be received on the threaded ends 156 of the U-bolt 148 in order to secure the U-bolt 148 to the mounting plate 145, bracket 160, toe clamp 162, and upper plate 164.

The aperture 169 of the top wall 164 of the channel mount 142 is configured to receive the U-shaped portion of the U-bolt 148 therein. A bolt 190 is received through an aperture 194 formed through each side wall 162 of the channel mount 142. The bolt 190 is secured to the channel mount 142 by a nut 194 such that the bolt 190 extends horizontally across the passageway 163 of the channel mount 142. As shown in FIGS. 10 and 11, the bolt 190 is positioned below and spaced-apart from the top wall 164 of the channel mount 142. Illustratively, the bolt 190 operates as a bridge or an arm extending between and coupled to each of the side walls 162 of the channel mount 142. However, it should be understood that any suitable structure may be positioned between and coupled to one or more of the side walls 162 in order to provide an anchor for the extension spring 146, as discussed below.

The extension spring 146 is positioned within the channel 163 of the channel mount 142 and is coupled at a first, upper end to the U-shaped portion of the U-bolt 148 while a second, lower end of the extension spring 146 is coupled to the upper end of a chain 196 of the mounting bracket assembly 52. Illustratively, while a U-bolt is shown and described herein, it is also within the scope of this disclosure to use any eye bolt or other such fastener onto which the spring 146 may be coupled as well. A lower end of the chain 196 is coupled to the bolt 190. Illustratively, while the chain 196 is provided between the spring 146 and the bolt 190, it is within the scope of this disclosure for the lower end of the spring 146 to be coupled directly to the bolt 190 as well.

In use, the spring-biased mounting bracket assembly 52 is tiltable relative to the cross-member 40 of the trailer 10. In particular, the channel mount 142, including the spring 146 and the bolt 190 is laterally tiltable relative to the cross-member 40 while the U-bolt 48 and the attachment assembly 144 remain generally stationary with the cross-member 40. In particular, the channel mount 142 and the sidewall 42 are laterally tiltable outwardly in a direction away from the trailer 10 and inwardly in a direction toward the floor assembly 26 of the trailer 10. Illustratively, the flanges 152 of the mounting plate 145 operate as a stop to prevent further tilting movement of the channel mount 142 relative to the mounting plate 145 in both the outward and the inward directions. Further illustratively, the channel mount 142 is configured to tilt approximately 30 degrees outwardly and 30 degrees inwardly relative to its vertical position. However, it is within the scope of this disclosure to provide a channel mount 142 configured to tilt relative to the cross-member of the trailer 10 any suitable degree.

Looking now to FIGS. 12 and 13, the spring-biased mounting bracket assembly 52 is coupled to the lower flange 177 of a cross-member 40 of the floor assembly 26 of the trailer 10. As noted above, the hook portion 174 of the bracket 160 of the attachment assembly 144 is hooked onto one end, or side edge 175, of the lower flange 177 while the toe clamp 162, upper plate 164, U-bolt 148 and channel mount 142 are positioned near the far end of the slots 172 within the bracket 160 away from the hook portion 174 (i.e., to the right as shown in FIG. 12). Once the hook portion 174 is properly placed on the edge 175 of the lower flange 177, the toe clamp 162, upper plate 164, U-bolt 148, and channel mount 142 are slid to the left in the direction of the arrow shown in FIG. 12 to the position shown in FIG. 13. The toe clamp 162, upper plate 164, U-bolt 148, and channel mount 142 are slid to the left within the slots 172 toward the hook portion 174 of the bracket 160 so that the planar portion 182 of the toe clamp 162 is engaged with an upper surface of the other side of the bottom flange 177 (as shown in FIG. 13). The nuts 165 are then tightened in order to secure the mounting bracket assembly 52 to the cross-member 40.

The ability of the channel mount 142 and U-bolt 148 as well as the toe clamp 162 and upper plate 164 to be able to slide within the slots 172 of the bracket 160 allows the bracket assembly 52 to be slid onto the bottom illustrative flange 177 during installation. The slots 172 also allow the same bracket 52 to be used with cross-members 40 having bottom flanges of various widths. Further, the slots 172 allow the same bracket 52 to be positioned at various angles relative to the cross-member 40. In other words, the same bracket 52 may be oriented in a number of angled positions relative to the cross-member and may be used with a number of different flanges 177 having different widths. Further, this slotted design allows the mounting bracket assembly 52 to be installed onto and removed from the bottom flange 177 of the cross-member 40 without requiring the user to remove the fasteners, or nuts, 166 from the ends of the U-bolt 148. Therefore, the mounting bracket assembly 52 does not need to be disassembled when adjusting, moving, or removing the assembly 52 from the cross-member 40, thus providing a mounting bracket assembly 52 which is more easily and quickly able to be installed, adjusted, removed, and reinstalled.

In particular, the mounting bracket assembly 52 is movable between an unlocked position and a locked position while remaining coupled to the bottom flange 177 of the cross-member. In the unlocked position, a portion of the mounting bracket assembly 52 (including the channel mount 142, the U-bolt 148, the toe clamp 162, and the upper plate 164) is horizontally movable relative to the bracket 160 and the flange 177 of the cross-member 40 to which the bracket 160 is attached, as shown in FIG. 12. Once the nuts on the U-bolt 148 have been sufficiently tightened, the mounting bracket assembly 52 is in the locked position and the U-bolt 148, toe clamp 162, and upper plate 164, are not horizontally movable, or slidable, relative to either the flange 177 of the cross-member 40 or to the bracket 160. In the locked position, however, the channel mount 142 remains tiltable relative to the attachment assembly 144 of the mounting bracket assembly 52. It should be understood that the components of the mounting bracket assembly 52 remain coupled to each other when the mounting bracket assembly in both the locked and unlocked positions. Only the nuts on the ends of the U-bolt 148 need be loosened or tightened in order to slide, move, install, remove, or otherwise manipulate the mounting bracket assembly 52 with respect to the cross-member 40.

Figure 14:
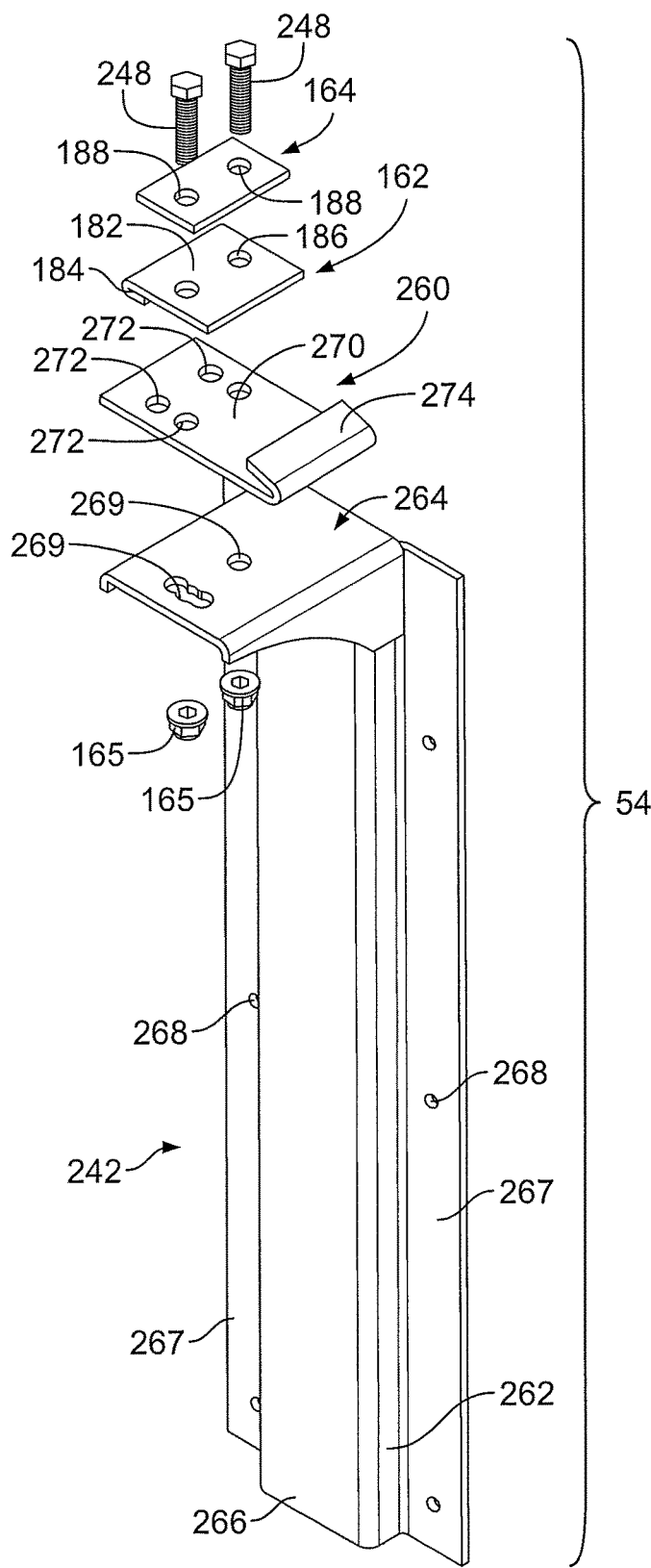
FIG. 14 is an exploded, perspective view of another mounting bracket assembly of the side skirt system shown in FIGS. 1-5.

As noted above, the forward-most wall panel 42 of the first portion 30 of the skirt system 12 and the rearward-most wall panel 43 of the third portion 34 of the skirt system 12 are coupled to the floor assembly 26 using the rigid mounting bracket assemblies 54. As shown in FIG. 14, the rigid mounting bracket assembly 54 includes a channel mount 242 similar to the channel mount 142 of the spring-biased mounting bracket assembly 52, a mounting bracket 260 similar to the mounting bracket 160 of the attachment assembly 144, the same or similar toe clamp 162 of the attachment assembly 144, and the same or similar upper plate 164 of the attachment assembly 144. As shown in FIG. 14, the channel mount 242 includes space-apart side walls 262, a top wall 264 coupled to each side wall 262, an inside wall 266, and side flanges 267 extending outwardly from an outside end of each side walls 262. Illustratively, the sidewalls 262 and inside wall 266 cooperate to define a passageway (not shown) therebetween. Illustratively, each side flange 267 includes a plurality of apertures 268 formed therein. Each aperture 268 is configured to receive a fastener (not shown) such as a bolt, rivet, or screw, for example, in order to couple the channel mount 242 to one of the forward-most or rearward-most wall panels 42, 43. The top wall 264 of the channel mount 242 includes two apertures 269 each configured to receive a threaded bolt 248 therethrough. As shown in FIG. 14, one of the apertures 269 in the top wall 264 of the channel mount 262 forms a slot that defines three locations for one of the bolts 248 to be positioned therethrough in order to allow the rigid mounting bracket assembly 54 to be coupled to a cross-member 40 of the floor assembly 26 at three different angles relative to the cross-member 40.

The mounting bracket 260 includes a planar portion 270 and a hook-shaped portion 274 at one end of the planar portion 270. The hook-shaped portion 274 is configured to engage an outer edge 175 of a bottom flange 177 of a cross-member in the same manner as that described above regarding the bracket 160. Four apertures 272 are formed through the planar portion 270 to receive the two bolts 248 therethrough. Illustratively, while the mounting bracket 260 includes the four apertures 272, it should be understood that the mounting bracket 260 may instead include two parallel and horizontal slots such as the slots 170 of the mounting bracket 160 in order to allow portions of the mounting bracket assembly 54 to slide relative thereto as is described above in regard to the mounting bracket assembly 52. The bolts 248 may be received within any two of the apertures 272 in order to use the mounting bracket assembly 54 with cross-members having bottom flanges 177 of varying widths and to position the mounting bracket assembly 54 at various angles relative to such bottom flanges 177 of the cross-member 40. The toe clamp 162 includes the two apertures 186 configured to receive the bolts 248 therethrough and the upper plate 164 includes the two apertures 188 also configured to receive the bolts 248 therethrough. A pair of nuts 165 is provided to secure the bolts 248 and other components of the rigid mounting bracket assembly 54 to a cross-member 40.

The rigid mounting bracket assembly 54 does not allow the channel mount 242, or the respective wall panels 42, 43 mounted thereto, to tilt laterally inwardly and laterally outwardly as with the spring-biased mounting bracket assembly 52. Rather, the forward-most wall panel 42 and the rearward-most wall panel 43 are generally rigidly mounted to the floor assembly 26 of the trailer 10. The rigid mounting bracket assemblies 54 are not configured to move relative to the floor assembly 26 of the trailer 10 once mounted to the floor assembly 26. As noted above, however, while the forward-most and rearward-most panels 42, 43 are rigidly mounted to the floor assembly 26, these panels 42, 43 (as with the remaining three panels 42 of the second portion 32 of the skirt system 12) are made of a fiber reinforced plastic material which allows the wall panels 42, 43 to flex and bend when impacted by, or traveling over, an object in the path of the wall panels 42, 43 while allowing the wall panels 42, 43 to resiliently return to their generally vertical orientation after passing over such and object.

Figure 15:
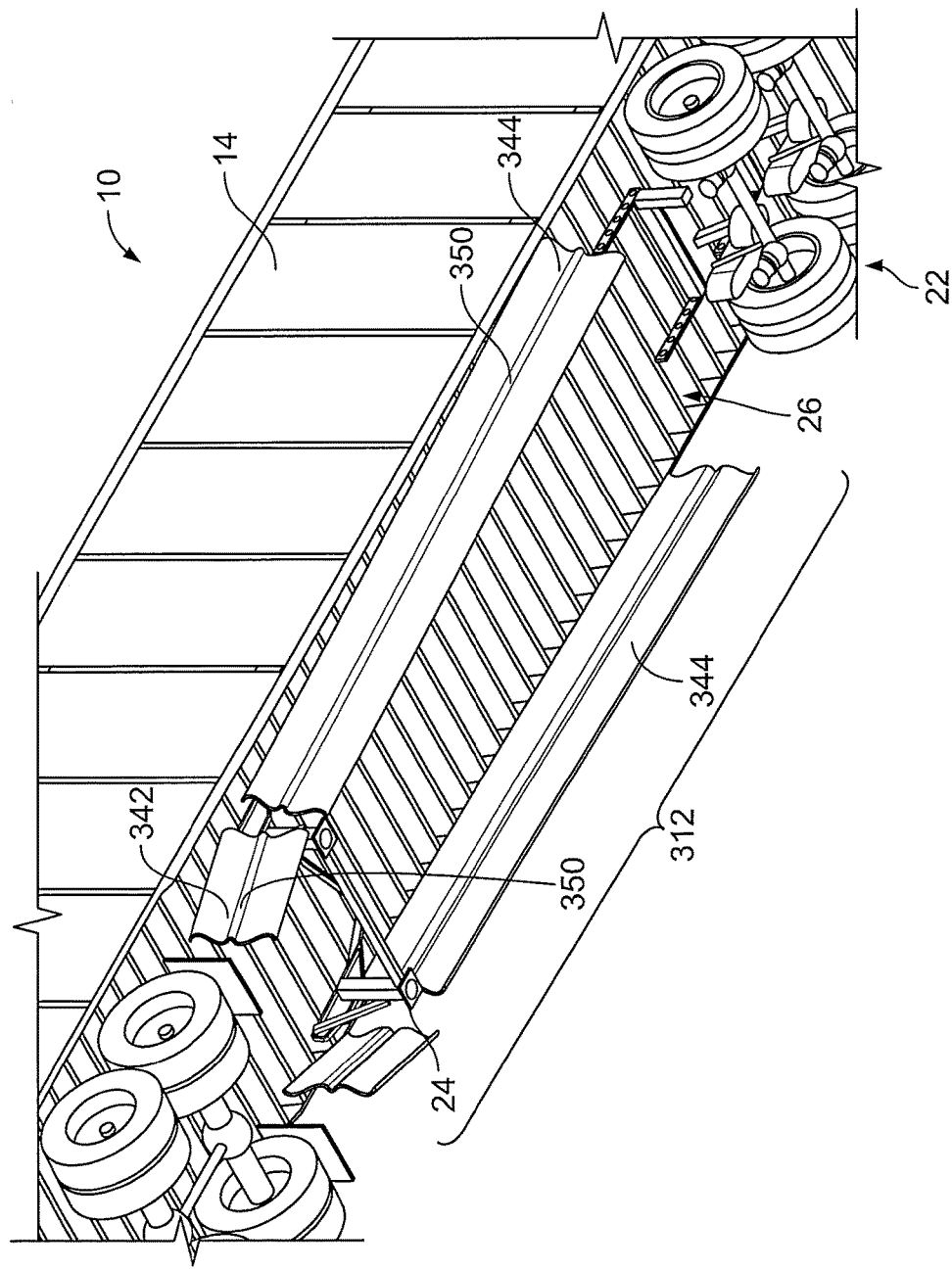
FIG. 15 is a bottom perspective view of an alternative side skirt system of the present disclosure including a single wall panel positioned forward of the landing gear of the trailer and another, elongated wall panel positioned between the landing gear and the rear wheel assembly of the trailer.
Figure 16:
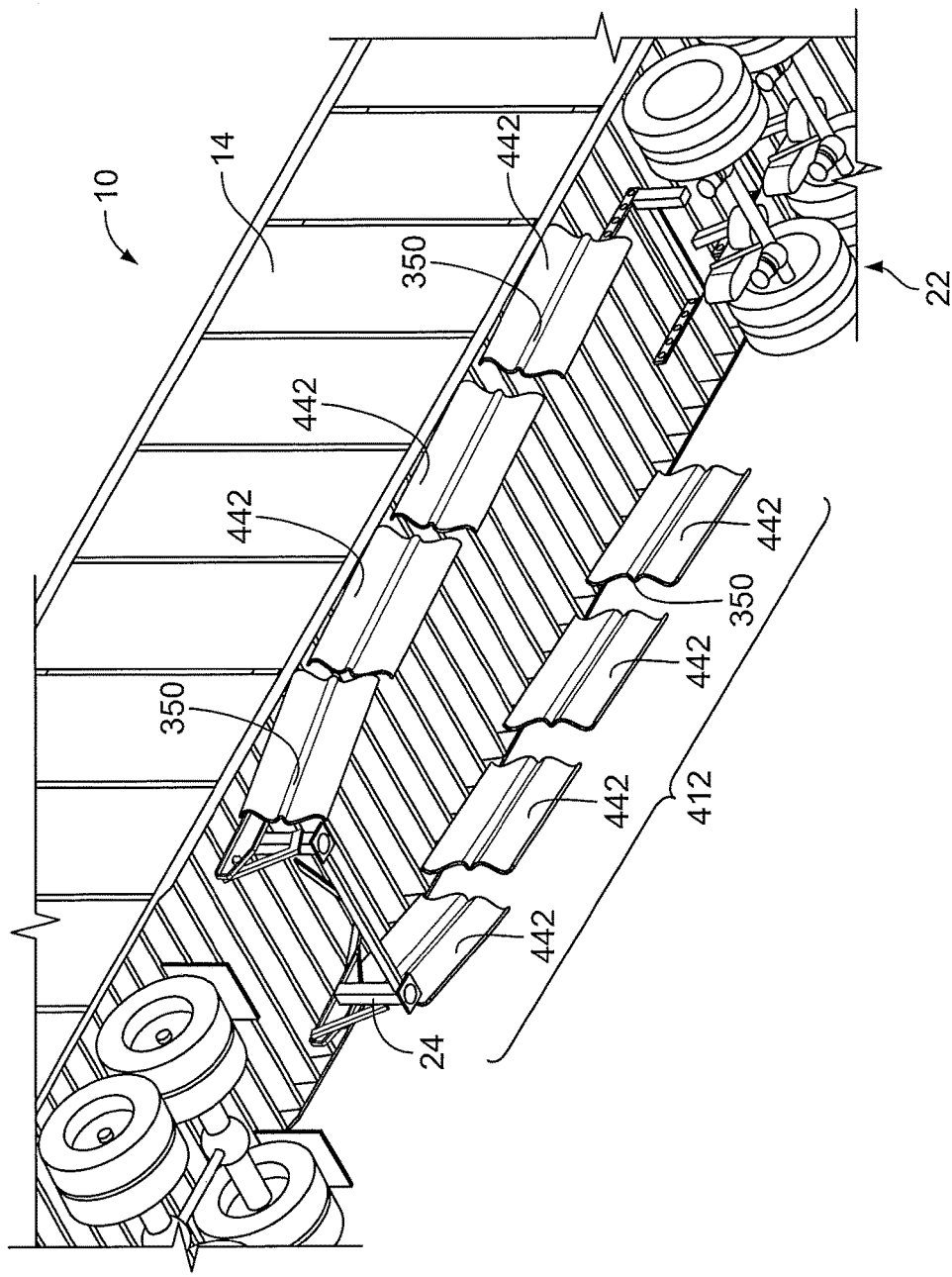
FIG. 16 is a bottom perspective view of yet another alternative side skirt system of the present disclosure including four skirt segments of generally equal size positioned between the landing gear and the rear wheel assembly of the trailer.
Figure 17:
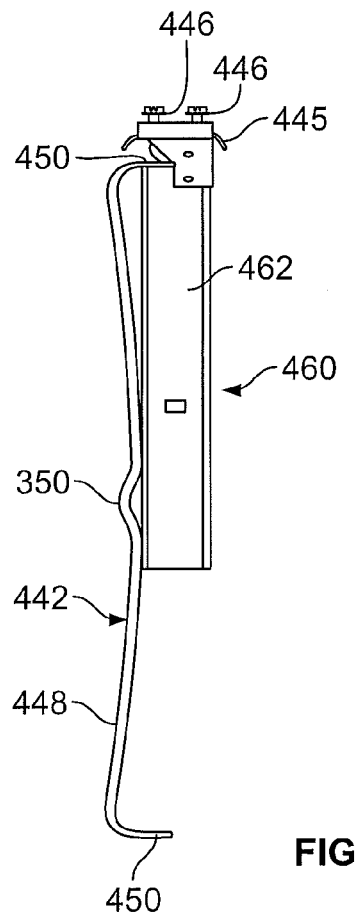
FIG. 17 is a sectional view of one of the wall panels of the alternative side skirt system of FIG. 16.

Illustratively, the wall panels 42, 43 of the side skirt system 12 are generally planar. That is, the planar portions 62, 64 of the wall panels 42, 43 define generally flat inner and outer surfaces 57, 59 of the panels 42, 43 such that the panels 42, 43 are not curved from the top edge 70 to the bottom edge 72 or 73. However, it should be understood that the wall panels 42, 43 may be concave or convex as well. In particular, as shown in FIGS. 15-17, alternative, curved wall panels are provided. In particular, the illustrative wall panels shown in FIGS. 15-17 are concave, though it is within the scope of this disclosure for some or all of these wall panels to be convex as well. The concave profile of the wall panels may operate to deflect airflow outwardly as the air flowing along the side skirt system is urged to move downwardly to the ground. Deflecting this airflow outwardly may help to prevent the airflow from moving under the skirt system and under the trailer to cause additional drag when such air impacts the rear wheel assembly of the trailer.

Looking first to FIG. 15, an alternative skirt system 312 is provided. The alternative skirt system 312 includes a first wall panel 342 positioned forward of the landing gear leg 24 and a single, elongated wall panel 344 positioned between the landing gear leg 24 and the rear wheel assembly 22 of the trailer 10. As shown the wall panels 342, 344 are each positioned at a different angle relative to the sidewalls 14 of the trailer 10. Looking now to FIG. 16, another alternative skirt system 412 is provided. The alternative skirt system 412 includes four wall panels 442 positioned between the landing gear leg 24 and the rear wheel assembly 22 of the trailer 10. Each of the illustrative wall panels 442 are generally the same shape and size and are each positioned at an angle relative to the sidewalls 14 of the trailer 10.

Illustratively, the panels 342, 344, 442 are concave in shape and include a single rib 350 extending horizontally across a middle of the panels 342, 344, 442 as shown on the side view of the panel 442 shown in FIG. 17. It should be understood that the side view of the panel 442 shown in FIG. 17 is the same as or similar to the side view of the other panels 342 and 344 shown in FIG. 15. The panel 442 also includes top and bottom flanges 450 coupled to respective top and bottom ends of the concave body 448 of the panel 350. As shown in FIG. 17, the flanges 450 extend inwardly toward a longitudinal centerline of the trailer 10. The skirt portion, or body, 448 and the mounting flange 450 may be formed of a single, unitary component, or may be two separate components coupled together. The mounting flange 450 is configured to be coupled to the floor assembly 26 of the trailer 10 and specifically to the cross-members 40 of the trailer 10. Various assemblies used to mount the mounting flange 450 to the cross-members 40 are shown in the figures and described herein. Further, the mounting flange 450 may be coupled directly to the cross-members of the trailer 10.

The top, or mounting, flange 450 is coupled to an illustrative mounting bracket assembly 460 configured to couple the panel 442 to the floor assembly 26 of the trailer 10. Illustratively, the mounting bracket assembly 460 includes a channel mount 462, a mounting bracket 445, a U-bolt 446, and an elongated spring (not shown). The upper flange 450 of the wall panel 442 is coupled to the channel mount 426 by the U-bolt. The mounting bracket assembly 460 is illustratively tiltable relative to the cross-member 40 of the floor assembly 26 to which it is configured to be attached. As such, the wall panel 442 coupled thereto is able to tilt laterally inwardly and laterally outwardly with the mounting bracket assembly 460 to which it is attached. It is also within the scope of this disclosure for the side skirt systems 312, 412 shown in FIGS. 15 and 16 to include the same or similar mounting bracket assemblies 52, 54 shown in FIGS. 11 and 14, for example, as well as those mounting bracket assemblies disclosed in the '286 patent which is incorporated by reference herein.

Figure 18:
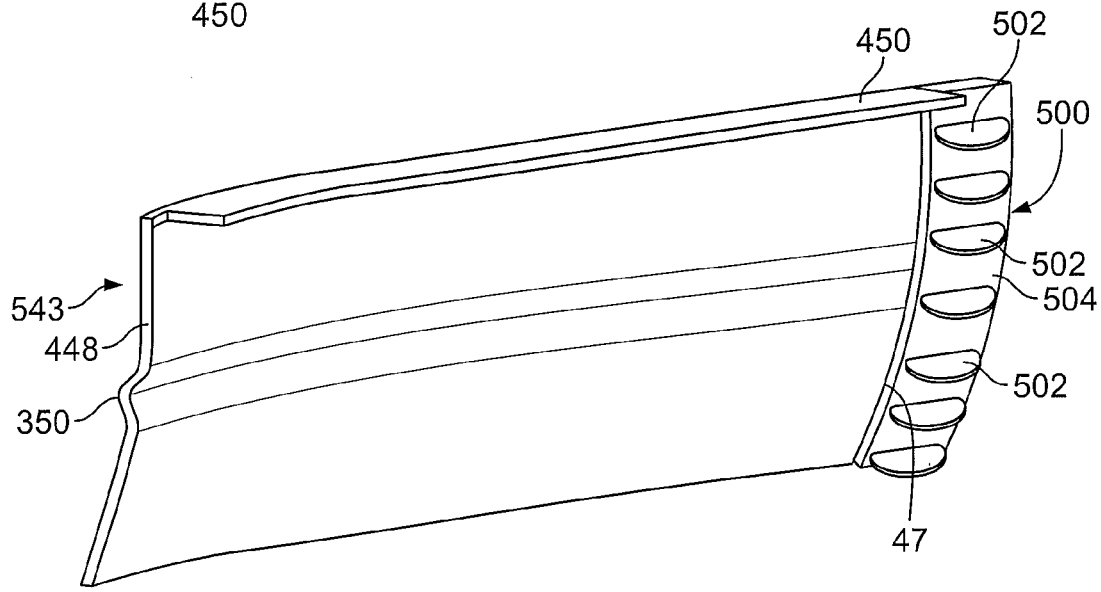
FIG. 18 is a perspective view of an alternative wall panel including a rear tail flange coupled thereto.

Referring now to FIGS. 18, 19A, 19B, and 21, the rearward-most wall panels of any skirt system disclosed herein may also include a rear fin, or rear tail flange, at the distal end of the wall panel near the rear wheel assembly 22 of the trailer 10, such as those shown in the aforementioned figures. Illustratively, the rear fins disclosed herein may be used with any wall panel of the skirt system and not only with the rearward-most panel of the skirt system. In other words, the wall panels of the first and second portions 30, 32 of the skirt system 21 may include the rear fins disclosed herein as well. As shown in FIG. 18, a rear fin 500 is coupled to an alternative rearmost wall panel 543. The panel 543 is the same as or similar to the panels 342, 344, 442 shown in FIGS. 15-17; however, the panel 543 only includes an upper mounting flange 450 and no lower flange. It should be understood that the upper flange 450 may define a single, continuous flange extending substantially along the entire length of the wall panel 543, or may be segmented into a plurality of spaced-apart upper flanges 452, as shown in FIG. 20, for example. The rear fin 500 is coupled to a rearmost, or end, edge 47 of the wall panel 543 and projects rearwardly therefrom. The rear fin 500 includes horizontally-extending flanges 502 coupled to an inside surface 504 of the rear fin 500. The flanges 502 project inwardly away from the inside surface 504 toward the longitudinal centerline of the trailer 10. It is within the scope of this disclosure for the rear fin 500 to include any suitable number of flanges 502 coupled to the inside surface 504 of the rear fin 500.

Figure 19A:
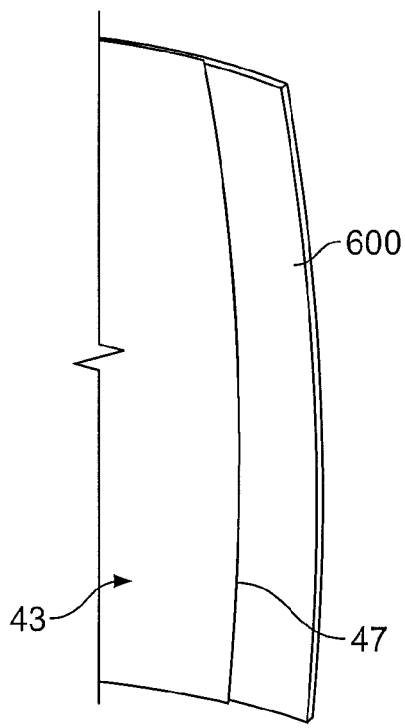
FIG. 19A is a perspective view of another alternative rear tail flange coupled to the rearward-most wall panel of the skirt system shown in FIGS. 1-5.
Figure 19B:
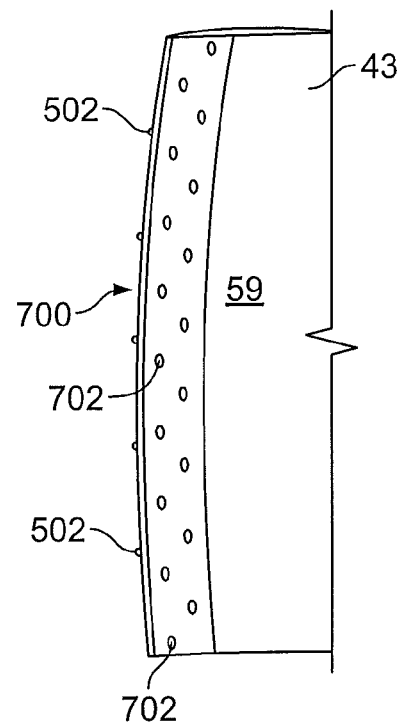
FIG. 19B is a perspective view of another alternative rear tail flange including a plurality of apertures formed therethrough.
Figure 20:
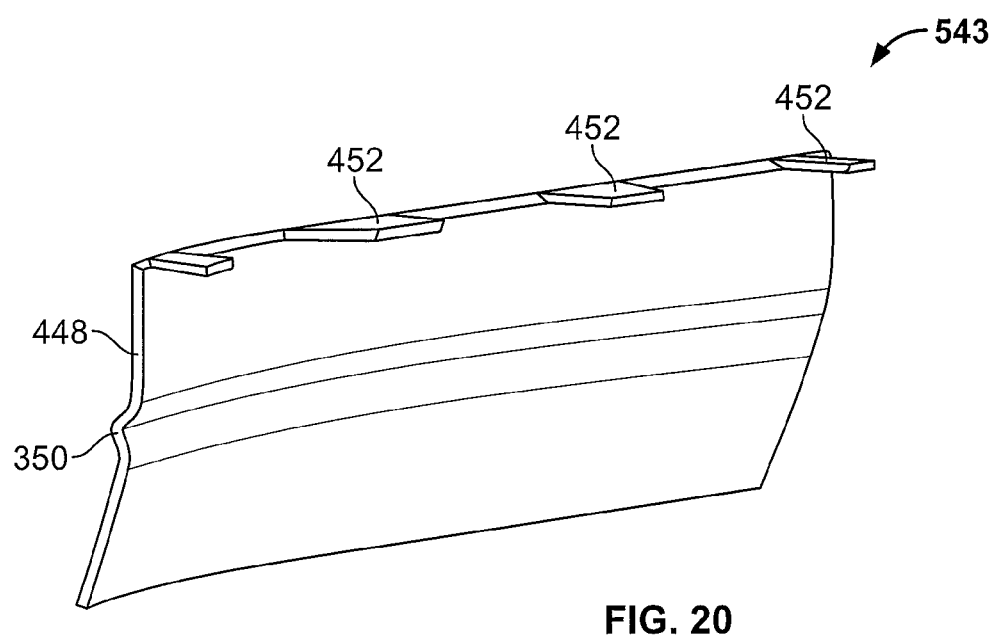
FIG. 20 is a perspective view of yet another alternative wall panel including a plurality of spaced-apart mounting flanges.

Looking now to FIG. 19A, another rear fin 600 is coupled to a rearmost wall panel 43. The illustrative rear fin 600 is also coupled to the rearmost edge 47 of the panel 43 to extend rearwardly therefrom. The rear fin 600 is angled relative to the wall panel 43 and has a greater flexibility than the wall panel 43. The rear fin 600 may be made of the same or similar materials as the wall panel 43, or may be made of other materials such as rubber, for example. As shown in FIG. 19B, yet another rear fin 700 is provided. The rear fin 700 is similar to the rear fin 600 and includes a plurality of apertures 702 formed therein. The rear fin 700 also includes a plurality of flanges 502 extending inwardly therefrom. While the flanges are illustratively shown to be coupled to an inward surface of the fin to extend inwardly, it should be understood that the various rear tail flanges disclosed herein may instead be coupled to the outer surface of the fin to extend outwardly away from the trailer 10 as well.

Figure 21:
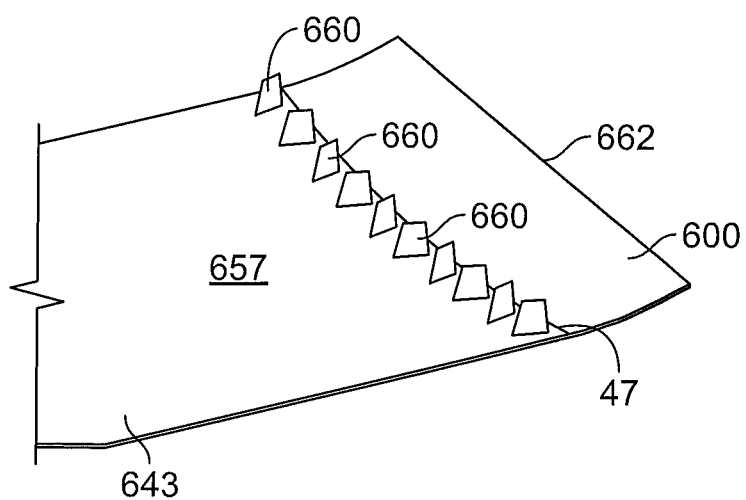
FIG. 21 is a perspective view of an inner surface of still another alternative wall panel including the rear tail flange shown in FIG. 19A and further including a plurality of vortex generating tabs, or flanges, coupled to the inner surface of the rearward-most wall panel coupled to the rear tail flange.

Looking now to FIG. 21, an alternative rearmost wall panel 643 is provided. The rear fin 600 is coupled to the rearmost edge 47 of the wall panel 643. Illustratively, a plurality of flanges 660 are coupled to an outside surface 657 of the panel 643. The flanges 660 project horizontally and outwardly away from a longitudinal centerline of the trailer 10. As shown in FIG. 21, the flanges 660 may be angled relative to the panel 643 in any suitable combination of ways.

The flanges 660 operate as vortex generators and each extends generally perpendicularly to the outer surface 657 of the wall panel 643. As shown in FIG. 21, the vortex generators, or flanges 660, are generally aligned along a vertical axis forward of the rearward edge 662 of the wall panel 643. Each flange 660 is generally trapezoidal in shape and is angled relative to each adjacent flange 660 to create front and rear gaps between adjacent flanges 660 along a length of the flanges 660 that either begins wide and narrows as the airflow moves rearwardly between adjacent flanges 660, or that begins narrow and widens as the airflow moves rearwardly between adjacent flanges 660.

The vortex generators 660 operate to pull the airflow inwardly toward them, and certain shapes such as those shown, for example, operate to accelerate, control, and shape airflow over the wall panel 634. In an exemplary embodiment, the panel 643 may be positioned as the rearmost wall panel of the second portion 32 of the skirt assembly 12 just forward and adjacent the rear wheel assembly 22 of the trailer. In this position, the flanges 660 are provided to shape the airflow over and around the rear wheel assembly 22 to create an air curtain between the rear wheel assembly 22 and the rearward-most wall panel 43 positioned rearward of the rear wheel assembly 22. In other words, the use of the flanges 660 on the rearward panel 42 just forward of the rear wheel assembly 22 may assist in bridging the gap, and creating an air curtain, between the wall panel 42 ahead of the rear wheel assembly 22 and the rearward-most panel 43 behind the rear wheel assembly 22.

Figure 27:
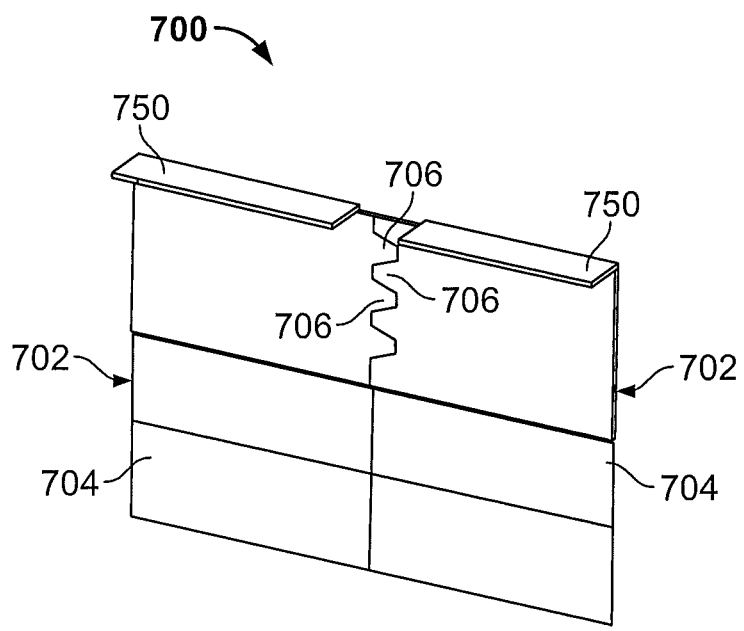
FIG. 27 is a perspective view of an alternative wall panel of the present disclosure showing adjacent wall panel portions connected together via side tabs.
Figure 28:
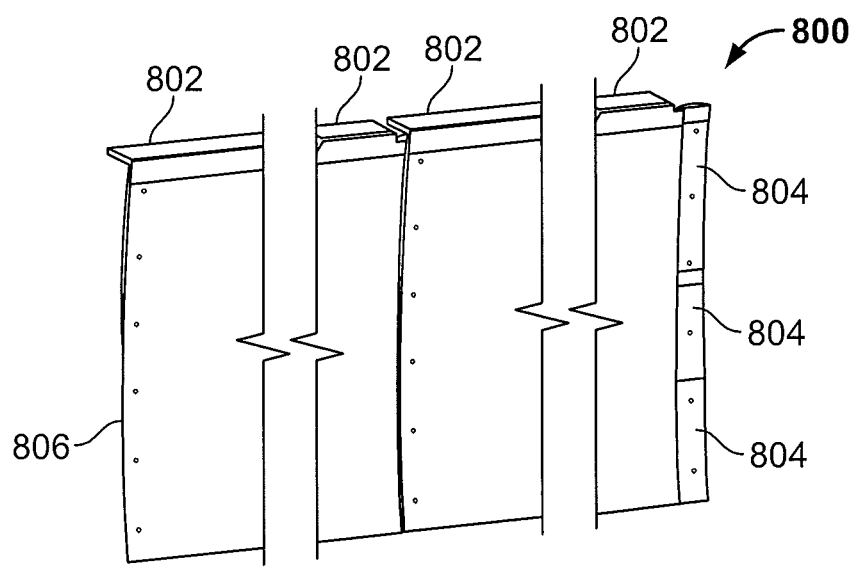
FIG. 28 is a perspective view of another alternative wall panel of the present disclosure showing adjacent wall panel portions connected together via side flanges.
Figure 29:
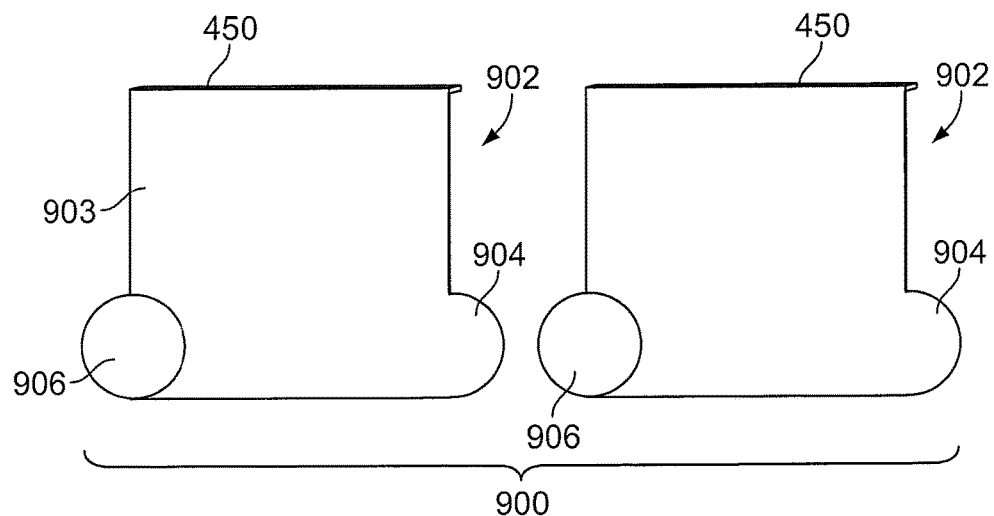
FIG. 29 is a perspective view of another alternative wall panel of the present disclosure showing adjacent wall panel portions configured to be connected together via alternative rounded flanges.

Looking now to FIGS. 27-29, perspective views of additional alternative wall panels 700, 800, 900 are provided. The alternative wall panel 700 includes multiple wall panel portions 702 each having a main body, or skirt portion, 704 and a mounting flange 750. Illustratively, a top portion of each skirt portion 704 includes fingers, or side tabs, 706 which are configured to interlock with the fingers 706 of an adjacent wall panel portion 702. Further illustratively, the top portion of the skirt portion 704 is illustratively thicker than a bottom portion of the skirt portion 704. It should be understood, therefore, that the thickness of the skirt portion 704 is variable from the top of the skirt portion 704 to the bottom of the skirt portion 704. Illustratively, two different thicknesses are provided in a stepped configuration along a height of the skirt portion 704. Alternatively, the thickness of the skirt portion 704 may gradually be reduced from a top portion of the skirt portion 704 toward a bottom portion of the skirt portion 704. It should be understood that such any wall portions disclosed herein may include such a variable-width skirt portions, as is described in greater detail above.

As shown in FIG. 28, yet another alternative wall panel 800 is provided including multiple wall panel portions 802. Each wall panel portion 802 includes one or more offset side flanges 804 that are each coupled to an inside surface 806 of an adjacent wall panel portion 802 in order couple the wall panel portions 317 together. Rivets, screws, adhesives, and/or other suitable fasteners may be used to couple adjacent wall panel portions 802 together.

Looking now to FIG. 29, another alternative wall panel 900 is provided including multiple wall panels portions 902. The main body 903 of each wall panel portion 902 includes a rounded leading flange 904 and a rounded trailing flange 906. The leading flange 904 of one wall panel portion 902 is configured to overlap and be coupled to the trailing flange 906 of an adjacent wall panel portion 902 in order to couple the wall panel portions 902 to each other. The rounded edge of the flanges 904, 906 operates to resist snagging of the wall panel 900 on debris or an obstacle while the trailer 10 is traveling down the road.

Figure 22A:
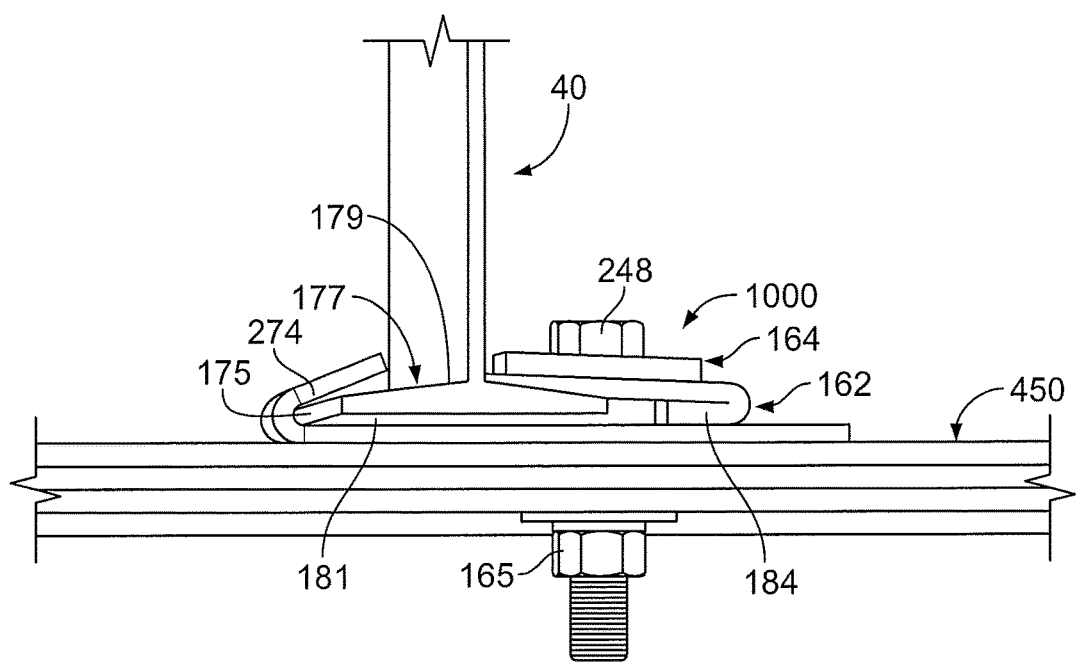
FIG. 22A is a perspective view of an alternative mounting bracket assembly configured to couple wall panels having a mounting flange such as those wall panels shown in FIGS. 15-18 and 20 to the floor assembly of the trailer.
Figure 22B:
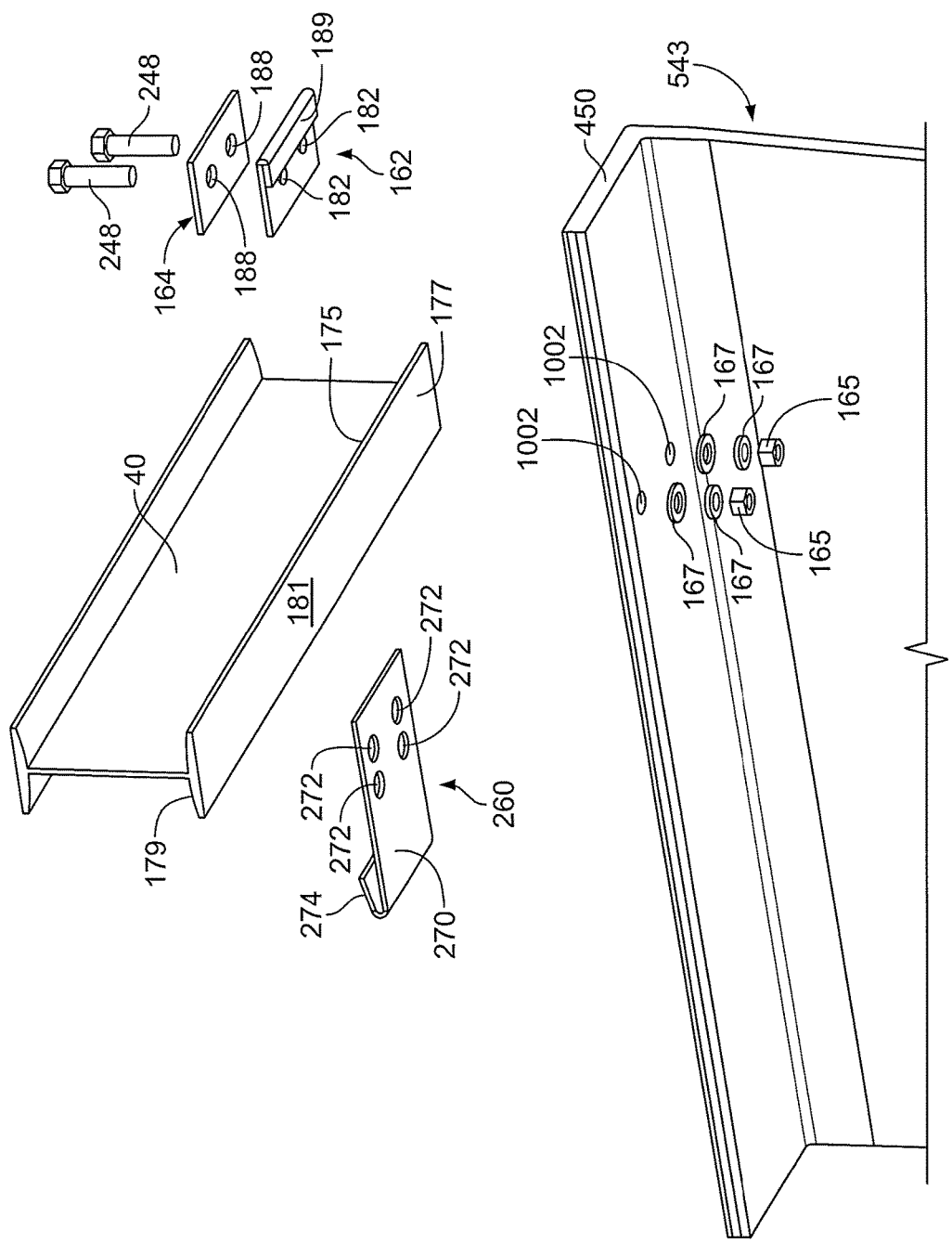
FIG. 22B is an exploded, perspective view of the alternative mounting bracket assembly of FIG. 22A.

While the mounting bracket assemblies 52, 54, and 460 are described above, it should be understood that any suitable mounting bracket assemblies may be used in order to couple the various wall panels disclosed herein to the floor assembly 26 of the trailer 10. Looking first to FIGS. 22A-22B, one illustrative mounting bracket assembly 1000 is provided. As shown in FIG. 22B, the mounting bracket assembly 1000 is provided for use with a wall panel, such as the wall panel 543, including the upper mounting flange 450. Illustratively, the upper flange 450 includes two apertures 1002. The mounting bracket assembly 1000 includes the mounting bracket 260 having the two pairs of slots 272 formed in a main plate, or body 270, of the mounting bracket 260. The hooked portion 274 of the bracket 260 is coupled to one end of the body 270 and is configured to be engaged with the outer edge 175 of the bottom flange 177 of a cross-member 40 of the floor assembly 26 of the trailer 10 in order to secure the mounting bracket 260 thereto. The assembly 1000 further includes the toe clamp 162 and the upper plate 164 described above. Two threaded bolts 248 of the mounting bracket assembly 1000 are received through the apertures 182, 188 of the toe clamp 162 and upper plate 164 as well as one pair of apertures 272 of the mounting bracket 260 and the apertures 1002 of the upper flange 450 of the wall panel 543. Washers 167 and nuts 165 are threaded on the bolts 248 in order to rigidly secure the wall panel 543 to the cross-member 40 of the floor assembly 26.

Figure 23A:
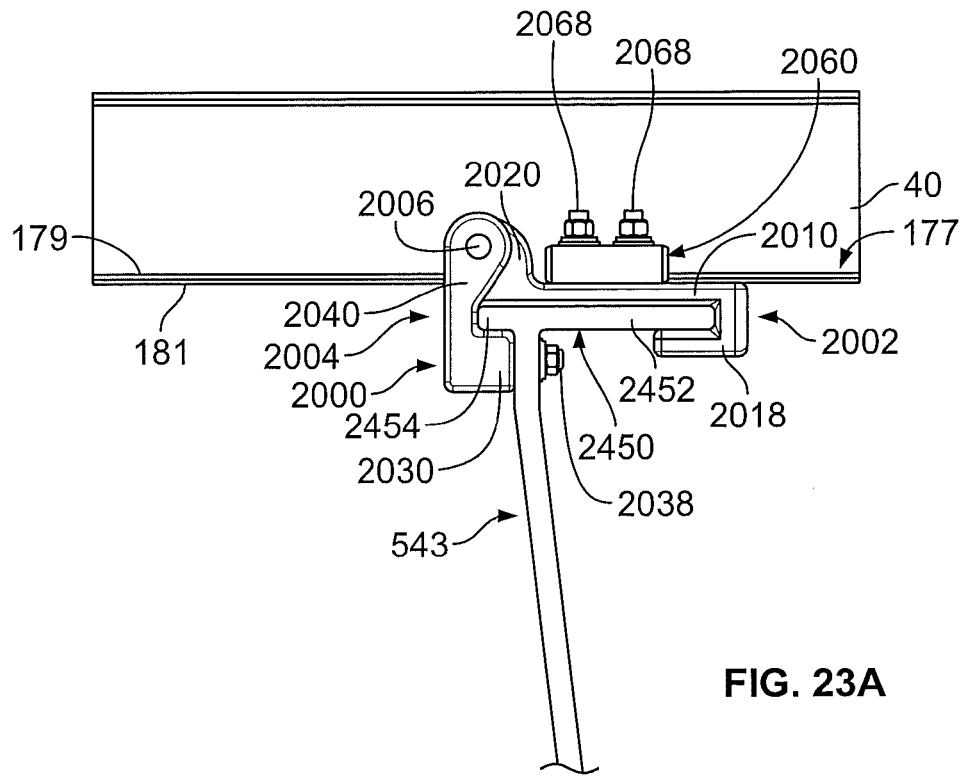
FIG. 23A is a side view of another alternative mounting bracket assembly configured to couple an alternative wall panel to the floor assembly of the trailer.
Figure 23B:
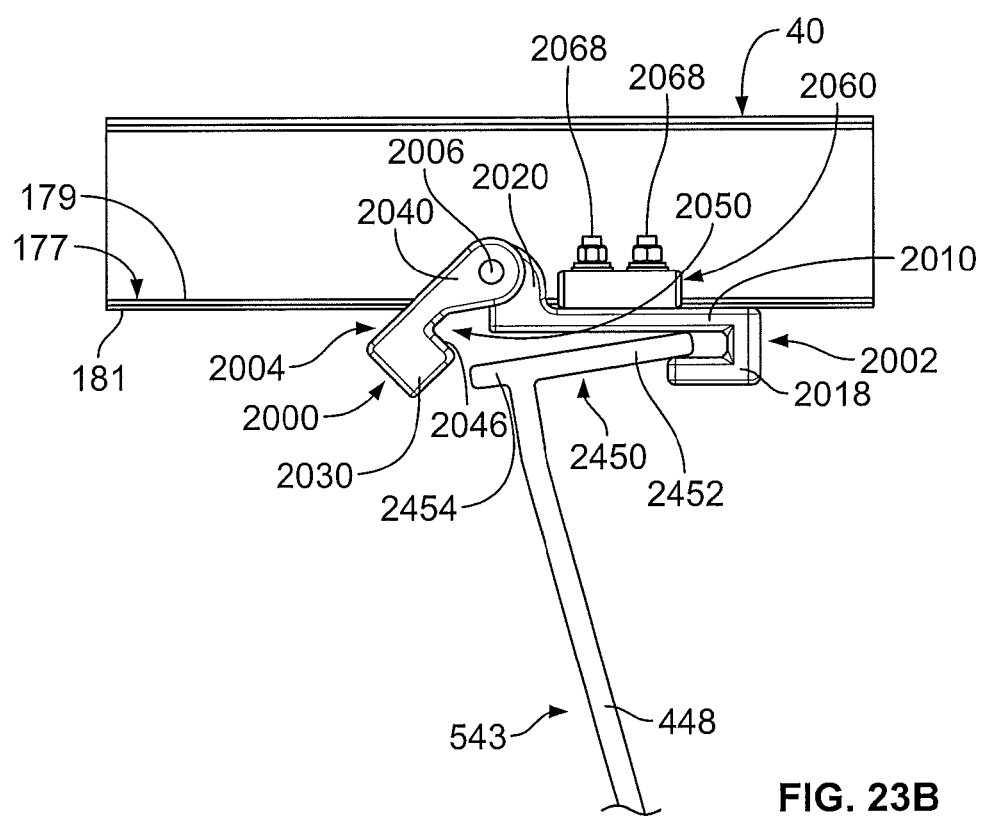
FIG. 23B is a side view of the mounting bracket assembly and wall panel of FIG. 23A showing the mounting bracket assembly in an opened position to allow the wall panel to be removed therefrom.
Figure 23C:
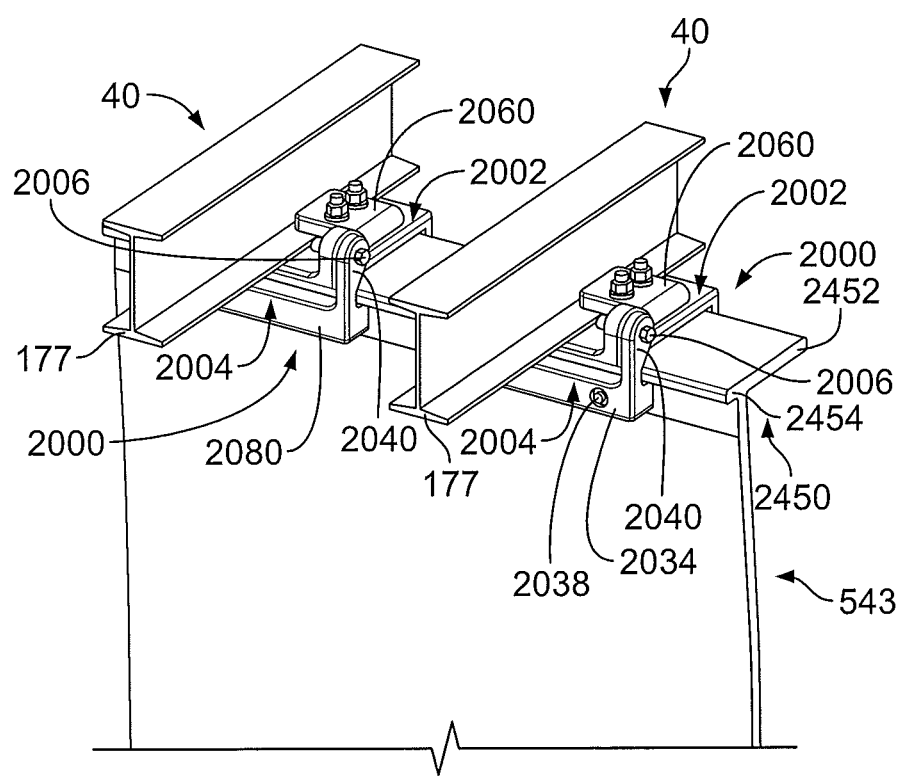
FIG. 23C is a perspective view of the mounting bracket assembly and wall panel of FIGS. 23A and 23B.
Figure 23D:
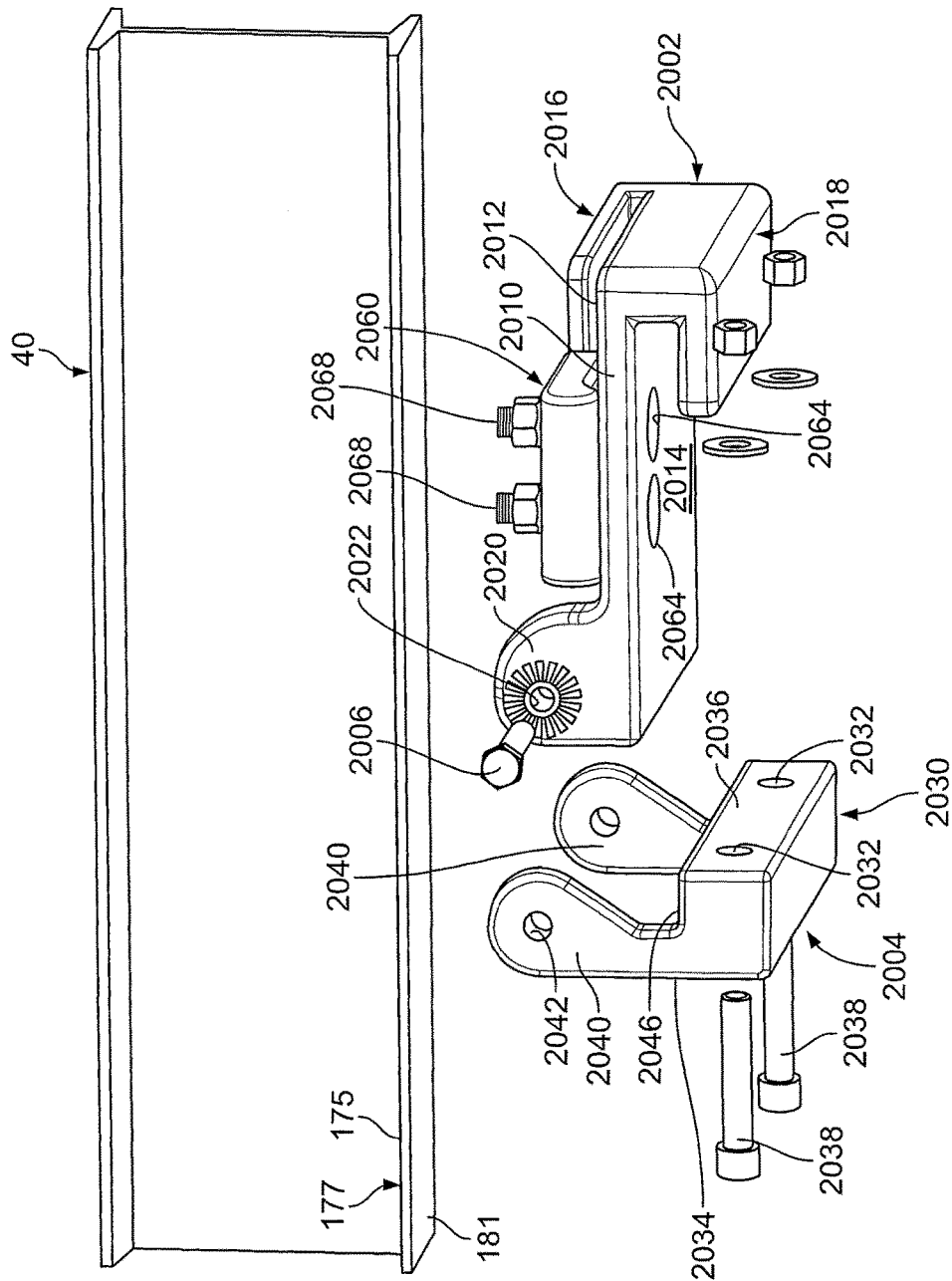
FIG. 23D is an exploded, perspective view of the mounting bracket assembly and wall panel of FIGS. 23A-23C.

Looking now to FIGS. 23A-23D, another alternative mounting bracket assembly 2000 is provided for use with the wall panel 543 including an alternative upper flange 2450. Illustratively, the upper flange 2450 includes an inwardly-extending flange portion 2452 coupled to a top edge of the main body 448 of the wall panel 543 as well as an outwardly-extending flange portion 2454 coupled to the top edge of the main body 448 of the wall panel 543. The mounting bracket assembly 2000 includes a first, stationary bracket 2002 and a second, pivotable bracket 2004 pivotably coupled to the stationary bracket 2002 about a pivot pin 2006. The stationary bracket 2002 includes a planar body 2010 having an upper surface 2012 configured to engage the lower surface 181 of the entire width of the flange 177 of the cross-member 40 and a lower surface 2014. The stationary bracket 2002 further includes an L-shaped flange 2016 coupled to the upper surface 2012 of the planar body 2010 and located along a side edge of the planar body 2010 in order to grab, or hook, onto one side of the bottom flange 177 of the cross-member. The stationary bracket 2002 further includes another L-shaped flange 2018 coupled to the bottom surface 2014 of the planar body 2010 and configured to extend along an inside edge of the planar body 2010. The lower flange 2018 is configured to hook onto or grab the inwardly-extending flange portion 2452, as shown in FIGS. 23A and 23B such that the flange portion 2452 of the wall panel 543 is received within the channel created by the L-shaped flange 2018 and the bottom surface 2014 of the planar body 2010. The stationary bracket 2002 further includes pivot mounts 2020 on opposite sides of the planar body 2010 each defining an aperture 2022 configured to receive a pivot pin 2006 therethrough.

As noted above, the mounting bracket assembly 2000 also includes the pivotable bracket 2004 pivotably coupled to the stationary bracket 2002. The pivotable bracket 2004 includes a main body 2030 that is generally shaped as a rectangular prism. The main body 2030 includes apertures 2032 extending horizontally from an inward surface 2036 to an outward surface 2034. The apertures 2032 are provided to receive fasteners, such as bolt 2038, therethrough to engage the main body 448 of the wall panel 543 and secure the wall panel 543 to the pivotable bracket 2004 once the wall panel 543 is properly positioned relative to the mounting bracket assembly 2000. The pivotable bracket 2004 further includes pivot mounts 2040 coupled to either side of the main body 2030 and extending upwardly therefrom. Each pivot mount 2040 includes an aperture 2042 configured to receive the pivot pin 2006 therethrough. Illustratively, the pivotable bracket 2004 is spring-biased to the closed position shown in FIGS. 23A and 23C.

In use, the pivot mounts 2040 of the pivotable bracket 2004 are aligned with the pivot mounts 2020 of the stationary bracket 2002 such that the pivot mounts 2020 of the stationary bracket 2002 are positioned within the space between the pivot mounts 2040 of the pivotable bracket 2040. The apertures 2022, 2042 of the respective mounts 2020, 2040 are aligned with each other in order to receive the pivot pins 2006 therethrough. The pivot mounts 2040 and the top surface 2046 of the main body 2030 of the pivotable bracket 2004 cooperate to define a notch 2050 configured to receive the inwardly-extending flange portion 2454 therein, as shown in FIG. 23A. A toe clamp 2060 of the mounting bracket assembly 2000 includes two apertures 2062 and is configured to be positioned over a top surface 179 of the opposite side of the lower flange 177 that is received within the channel formed by the L-shaped upper flange 2016 and the upper surface 2012 of the planar body 2010 of the stationary bracket 2002. The apertures 2062 of the toe clamp 2060 are configured to be aligned with apertures 2064 formed through the planar body 2010 of the stationary bracket 2002. The apertures 2062 and the apertures 2064 are configured to receive fasteners, such as bolts 2066, therethrough in order to secure the stationary bracket 2002 to the lower flange 177 of the cross-member 40.

In use, the pivotable bracket 2004 is pivoted away from the stationary bracket 2002 in order to allow a user to position the flange 2450 of the wall panel 543 within the mounting bracket assembly 2000. In particular, once the bracket 2004 is pivoted to an opened position, as shown in FIG. 23B, the inwardly-extending flange portion 2452 is positioned within the channel defined by the downwardly-extending flange 2018 and the main body 2010 of the stationary bracket 2002. Once the flange portion 2452 is properly positioned, the pivotable bracket 2004 may be moved to the closed position such that the outwardly-extending flange portion 2454 is received within the channel 2050 of the pivotable bracket 2004. As noted above, bolts 2038 are then received through the main body 2030 of the pivotable bracket 2004 and through apertures (not shown) provided in the main body 448 of the wall panel 543 in order to secure the bracket assembly 2000 to the wall panel 543. In order to remove the wall panel 543 from the bracket assembly 2000, the bolts 2038 may be removed and the pivotable bracket 2004 moved to its opened position in order to allow a user to remove inwardly-extending flange portion 2452 from the lower L-shaped flange 2018 of the stationary bracket 2018. As shown in FIG. 24C, an alternative main body 2080 may also be provided. The illustrative main body 2080 does not include horizontal apertures therethrough in order to further secure the main body 2080 to the wall panel 543 with fasteners such as the bolts 2038.

Figure 24A:
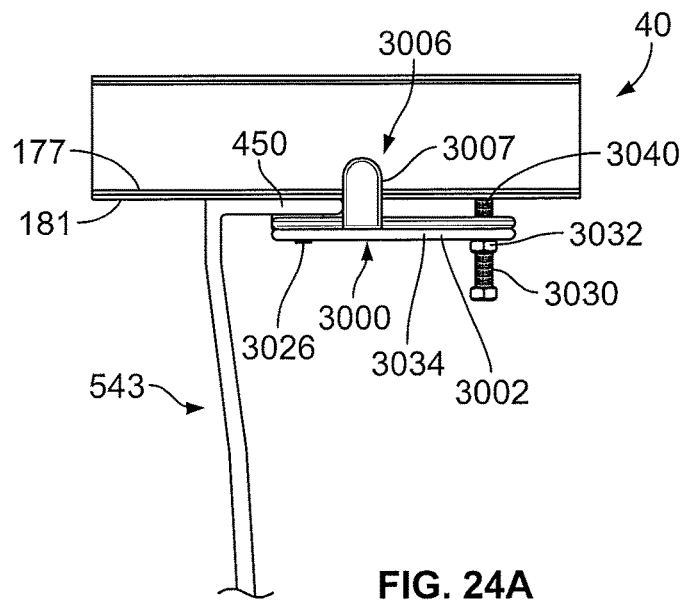
FIG. 24A is a side view of another alternative mounting bracket assembly configured to couple wall panels having a mounting flange such as those shown in FIGS. 15-18 and 20 to the floor assembly of the trailer.
Figure 24B:
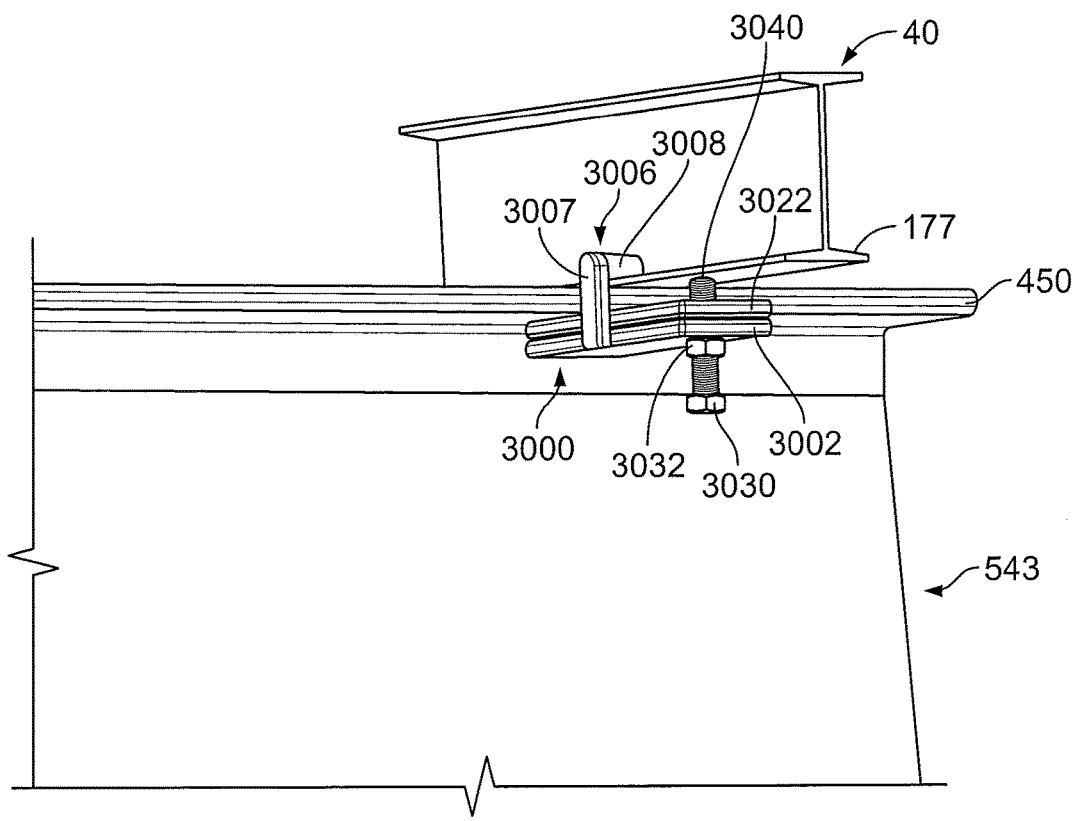
FIG. 24B is a perspective view of the mounting bracket assembly and wall panel of FIG. 24A.
Figure 24C:
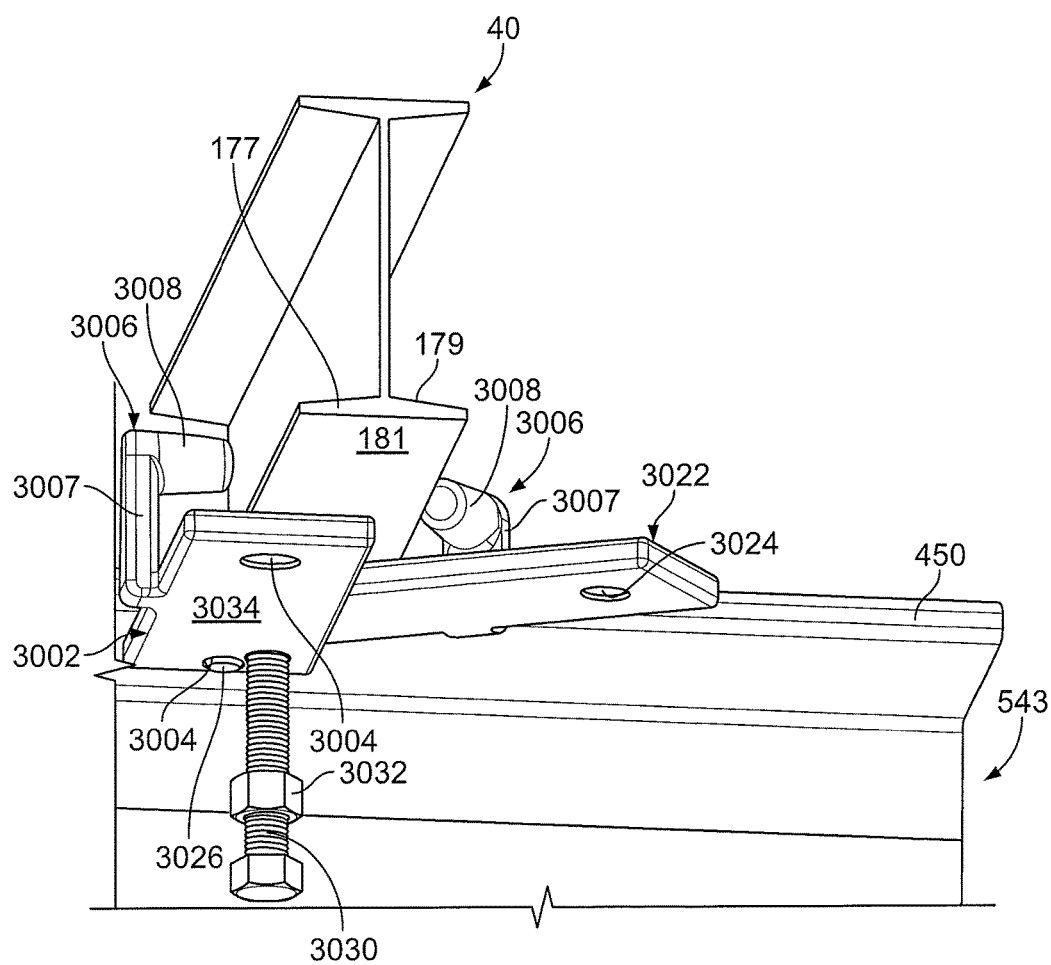
FIG. 24C is a perspective view of the mounting bracket assembly of FIGS. 24A and 24B in an opened position to allow the wall panel to be removed therefrom.

Looking now to FIGS. 24A-24C, another alternative mounting bracket assembly 3000 is provided for use with the wall panel 543 including the upper mounting flange 450. As shown in FIG. 24C, the mounting bracket assembly 3000 is a pivoting jacking bolt clamp assembly and includes a bottom plate 3002 having two apertures 3004 provided therein. An L-shaped arm 3006 is coupled to one side of the bottom plate 3002 and extends upwardly therefrom. The L-shaped arm 3006 includes a vertical portion 3007 and a horizontal portion 3008 configured to engage a top surface 179 of the flange 177. The mounting bracket assembly 3000 further includes an upper plate 3022 and two apertures 3024 provided therein. The outward-most apertures 3004 and 3024 of the upper and lower plates 3002, 3022 are aligned with each other and a fastener 3026 is received therethrough in order to allow the upper and lower plates 3002, 3022 to pivot relative to each other about the fastener 3026 between an opened position shown generally at FIG. 24C and a closed position shown in FIGS. 24A and 24B. Another L-shaped arm 3006 is coupled to one side of the upper plate 3022 and extends upwardly therefrom. The L-shaped arm 3006 of the upper plate 3022 similarly includes a vertical portion 3007 and a horizontal portion 3008 configured to engage the top surface 179 of the flange 177. The two L-shaped arms 3006 of the lower and upper plates 3002, 3022 are configured to engage the upper surfaces 179 of opposite right and left flange portions of the flange 177.

In use, the mounting bracket assembly 3000 is coupled to the flange 450 of the wall panel 543 via the fastener 3026. Illustratively, the fastener 3026 is received through an aperture (not shown) of the flange 450 of the wall panel 543. When the mounting bracket assembly 3000 is in the opened position, wall panel 543 is positioned below the cross-member 40, as shown in FIGS. 24A and 24B. Illustratively, the lower and upper plates 3002, 3022 are then pivoted about the fastener 3026 to the closed position such that the horizontal portions 3007 of the L-shaped arms 3006 of each of the lower and upper plates 3002, 3022 are engaged with the upper surface 179 of opposite sides of the lower flange 177 as shown in FIGS. 24A and 24B. Once the plates 3002, 3022 are pivoted to the closed position, the inward apertures 3004, 3024 of each plate 3002, 3022 are aligned with each other and configured to receive a fastener, such as the bolt 3030 therethrough. A nut 3032 already threaded onto the bolt 3030 is tightened against the bottom surface 3034 of the lower plate 3002 so that the end 3040 of the bolt 3030 is forced into engagement with the bottom surface 181 of the lower flange 177 in order to secure the mounting bracket assembly 3000 to the cross-member 40 of the floor assembly 26 of the trailer 10.

Figure 25A:
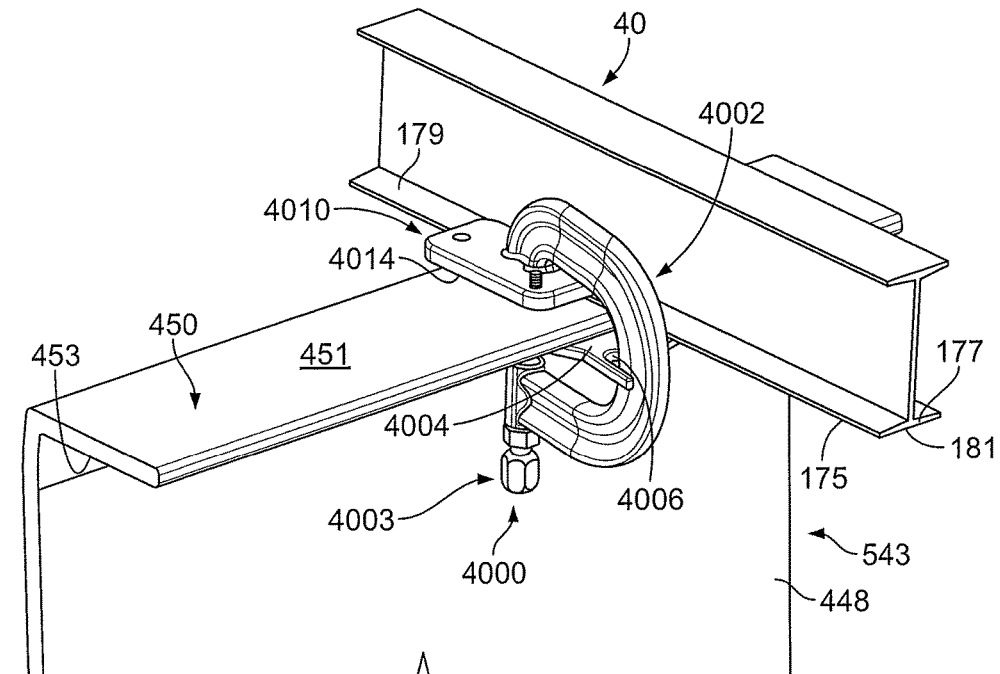
FIG. 25A is a perspective view of another alternative mounting bracket assembly configured to couple wall panels having a mounting flange such as those shown in FIGS. 15-18 and 20 to the floor assembly of the trailer.
Figure 25B:
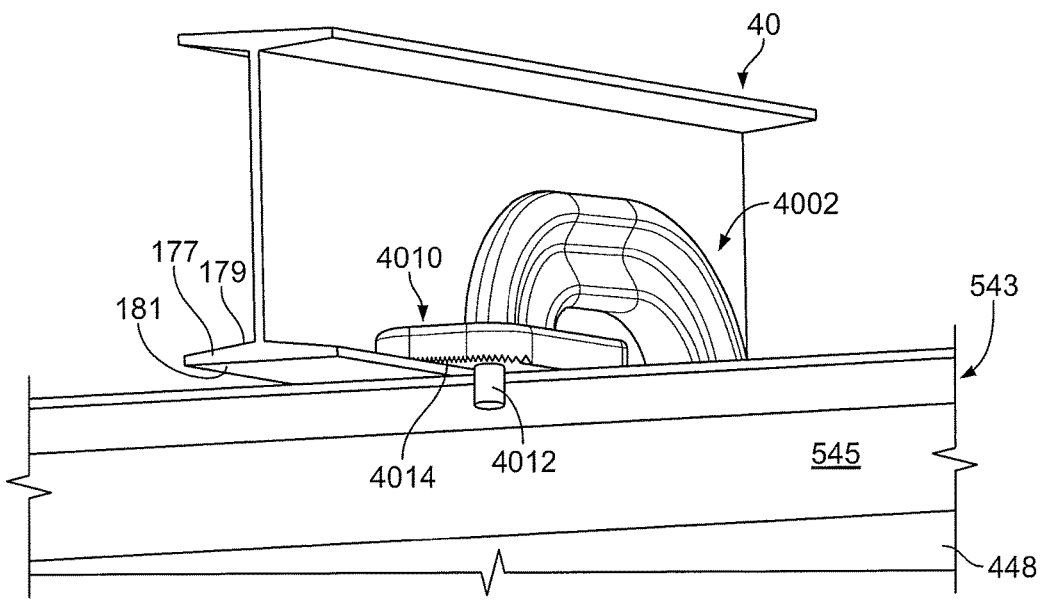
FIG. 25B is another perspective view of the mounting bracket assembly of FIG. 25A showing a pin of the assembly engaged with an outer surface of the wall panel to secure the wall panel thereto.
Figure 25C:
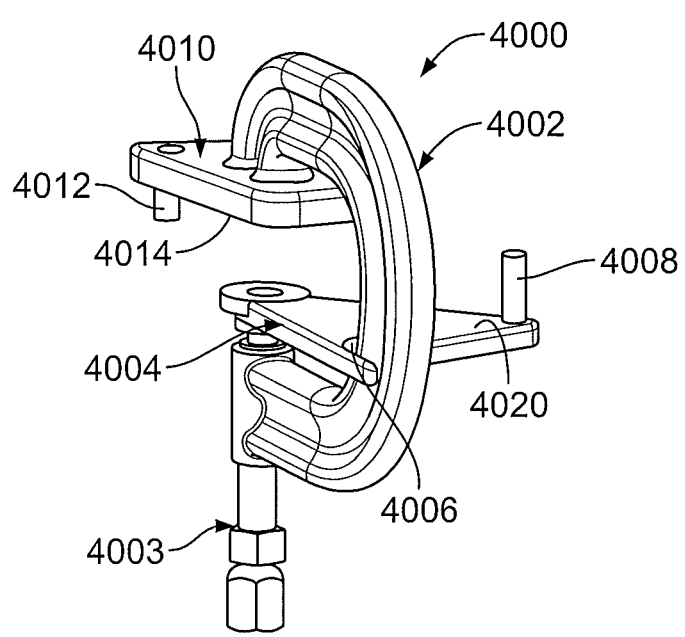
FIG. 25c is a perspective view of the mounting bracket assembly of FIGS. 25A and 25B.

Looking now to FIGS. 25A-25c, yet another mounting bracket assembly 4000 is provided for use with the wall panel 543 including the upper mounting flange 450 and main body 448. Illustratively, the mounting bracket assembly 4000 includes a C-shaped clamp body 4002 and a threaded bolt 4003 received through a vertical channel in the bottom portion of the clamp body 4002 and movable upwardly and downwardly within the vertical channel. A lower horizontal plate 4004 is coupled to the top of the bolt 4003 and movable upwardly and downwardly with the bolt 4003. The illustrative plate 4004 is generally triangular in shape and is coupled to the bolt 4003 at a first corner of the plate 4004. A second corner of plate 4004 includes a notch 4006 configured to receive a portion of the C-shaped clamp body therein 4002 while a third corner of the plate 4004 includes an upwardly-extending rod 4008. The mounting bracket assembly 4000 further includes an upper horizontal plate 4010 rigidly coupled to the upper portion of the C-shaped clamp body 4002.

The illustrative upper and lower plates 4010, 4004 are spaced-apart from each other and are generally parallel to each other. A downwardly-extending rod 4012 is coupled to a lower surface 4014 of the upper plate 4010. In use the lower plate 4004 is moved downwardly relative to the clamp body 4002 to a fully-opened position. The wall panel 543 is positioned so that the upper surface of the flange 450 is adjacent the lower surface 181 of the flange 177 of the cross-member 40. The mounting bracket assembly 4000 is then positioned so that the lower surface 4014 of the upper plate 4010 is adjacent both an upper surface 451 of the flange 450 of the wall panel 543 and the upper surface 179 of one side of the lower flange 177 of the cross-member 40, as shown in FIG. 25B. Illustratively, the lower surface 4014 of the upper plate 4010 is ridged in order to help prevent slippage between the plate 4010 and the flange 177 of the cross-member 40 as well as between the plate 4010 and the mounting flange 450 of the skirt panel 543. The downwardly-extending rod 4012 coupled to the upper plate 4010 is configured to engage an outer, vertical surface 545 of the main body 448 of the wall panel 543, as is also shown in FIG. 25B. The lower plate 4004 is located below the lower surface 453 of the flange 450 of the wall panel 543 and is moved upwardly relative to the main clamp body 4002 of the mounting bracket assembly 4000 until an upper surface 4020 of the lower plate 4004 is brought into engagement with the lower surface 453 of the flange 450 of the wall panel 543 and the lower surface 181 of the flange 177 of the cross-member 40. The upwardly-extending rod 4008 coupled to the lower plate 4004 is configured to engage the outer edge 175 of the other side of the flange 177 of the cross-member 40 in order to secure the mounting bracket 4000 to the wall panel 543 and the cross-member 40.

Figure 26A:
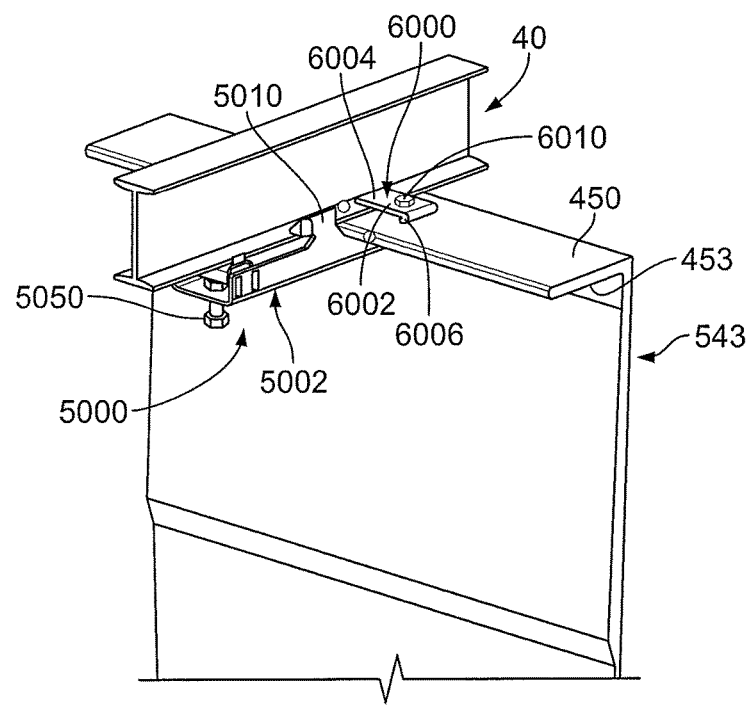
FIG. 26A is a perspective view of still another alternative mounting bracket assembly coupling a wall panel, such as those wall panels shown in FIGS. 15-18 and 20, to the floor assembly of the trailer.
Figure 26B:
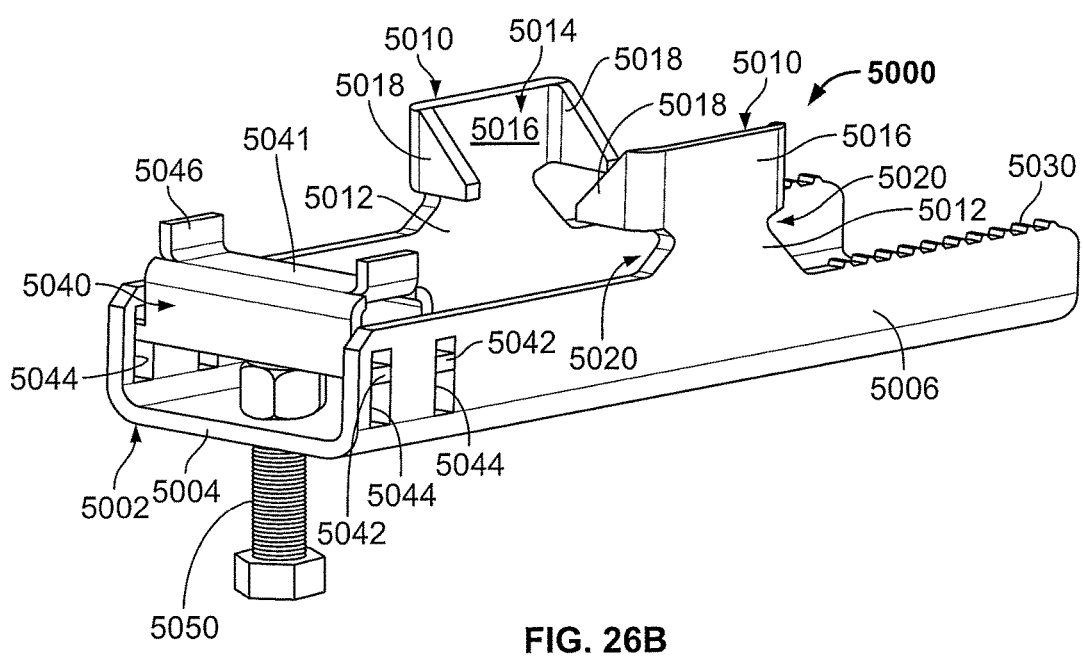
FIG. 26B is a perspective view of the mounting bracket assembly of FIG. 26A.

Looking now to FIGS. 26A and 26B, still another mounting bracket assembly 5000 is provided for use with the wall panel 543 including the upper mounting flange 450. The illustrative mounting bracket assembly 5000 is a rocker clamp assembly and includes a U-shaped main body 5002 having a bottom, horizontal plate 5004 and a vertical arm 5006 extending upwardly from each side of the plate 5004. The assembly 5000 further includes first and second clamping arms 5010 coupled to and extending upwardly from each vertical arm 5006, as shown in FIG. 26B. Each clamping arm 5010 includes a base 5012 directly coupled to the vertical arm 5006 and a C-shaped clamp 5014 coupled to the base 5012 and including a middle portion 5016 and two inwardly-extending arms 5018 coupled to each side of the middle portion 5016. Illustratively, the arms 5018 are each triangular in shape. As shown in FIG. 26B, a notch 5020 is formed on each side of the base 5012 between the upper edge of the vertical arm 5006 and the lower edge of the inwardly-extending arms 5018 of the C-shaped clamp 5014.

As is discussed below, the two notches 5020 associated with each C-shaped clamp 5014 are each configured to receive one side of the bottom flange 177 of the cross-member 40 therein. Further, as shown in FIG. 26B, an upper edge 5030 of a portion of each vertical arm 5006 is ridged or toothed in order to allow the upper edges 5030 to grip the lower surface 453 of the flange 450 of the wall panel 543.

The mounting bracket assembly 5000 further includes a bracket 5040 movable relative to the base 5002. The bracket 5040 is generally U-shaped and oriented to face downwardly. Each side of the bracket 5040 (at the bottom of each arm of the U-shape) includes two flanges 5042 extending outwardly therefrom. Each flange is received within a corresponding vertical slot 5044 formed in each vertical arm 5006 of the main body 5002. In other words, each vertical arm 5006 includes two parallel and spaced-apart vertical slots 5044 which are each configured to receive one flange 5042 of the bracket 5040 therein. The bracket 5040 is vertically movable upwardly and downwardly within the slots 5044. The bracket 5040 further includes an upwardly-extending flange 5046 coupled to each side of base portion of the U-shape, as shown in FIG. 26B. A tightening bolt 5050 is received through an aperture in the plate 5004 of the main body 5002 and may be rotated in order to move the bracket 5040 upwardly and downwardly relative to the main body 5002.

In use, the mounting bracket assembly 5000 is positioned such that the upper edges 5030 of the main body 5002 are positioned below and engaged with the bottom surface 453 of the flange 450 of the wall panel 543 while each side of the lower flange 177 is received within the notches 5020 formed between the vertical walls 5006 and the C-shaped clamps 5014 coupled to and extending upwardly therefrom. The bolt 5050 may then be tightened in order to press an upper surface 5041 of the bracket 5040 into engagement with the lower surface 181 of the lower flange 177 of the cross-member in order to secure the mounting bracket assembly 5000 to the cross-member 40. The flanges 5046 of the bracket 5040 flank and engage the outer edges 175 of the lower flange 177 to aide in aligning the mounting bracket assembly 5000 with the cross-member 40 and prevent pivoting movement of the mounting bracket assembly 5000 relative thereto in order to maintain the jack bolt 5050 generally centered on the bottom surface 181 of the lower flange 177 of the cross-member 40.

Looking still to FIG. 26A, a tether assembly 6000 of the present disclosure is provided. The tether assembly 6000 includes a toe clamp 6002, similar to the toe clamp 162 described above, including a planar portion 6004 and a spacer 6006 coupled to the planar portion 6004. A single aperture (not shown) is formed through the planar portion 6004 of the toe clamp 6002 to receive a fastener such as the bolt 6010 therethrough. The bolt 6010 is also received through a coordinating aperture (not shown) formed through the flange 450 of the wall panel 543. The tether assembly 6000 operates to further secure the wall panel 543 to the cross-member 40. Illustratively, it should be understood that the tether assembly 6000 may be used with any of the mounting bracket assemblies disclosed herein as a secondary means of securing the wall panel 543 with the cross-member 40. Further, the tether assembly 6000 may be used without any the mounting bracket assemblies disclosed herein and may be provided as the primary means of coupling the wall panels disclosed herein to the cross-members of the floor assembly 26 of the trailer 10.

Figure 30:
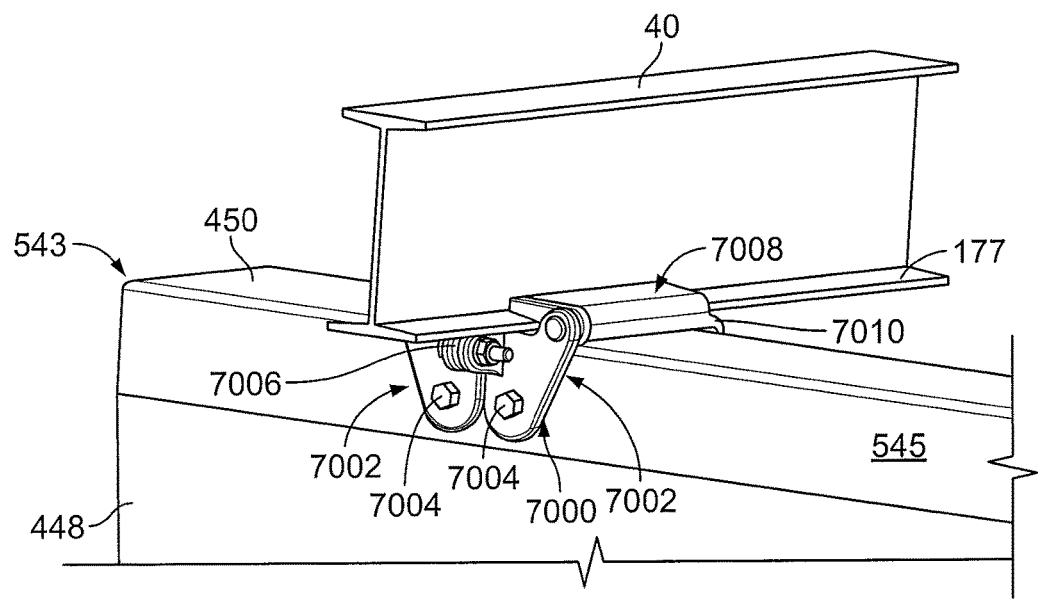
FIG. 30 is a perspective view of another alternative mounting bracket assembly of the present disclosure coupling a wall panel, such as those wall panels shown in FIGS. 15-18 and 20, to the floor assembly of the trailer.

Looking now to FIG. 30, still another mounting bracket assembly 7000 is provided for use with the wall panel 543 including the upper mounting flange 450. The mounting bracket assembly 7000 is spring-mounted and configured to pivot between opened and closed positions. Illustratively, the mounting bracket assembly 7000 includes first and second pivot arms 7002 which are each pivotably coupled to an outside surface 545 of the main body 448 of the wall panel 543 by a pivot pin 7004. A coil spring 7006 of the assembly 7000 is configured to bias the first and second pivot arms 7002 toward each other to the closed position. A clamping arm 7008 is coupled to a top end of each pivot arm 7002 and is configured to engage a top surface 179 of the flange 177 of the cross-member 40, as shown in FIG. 30. A hook 7010 is coupled to an inward end of each clamping arm 7008 in order to receive an inward edge of the mounting flange 450 of the wall panel 543 therein.

Figure 31:
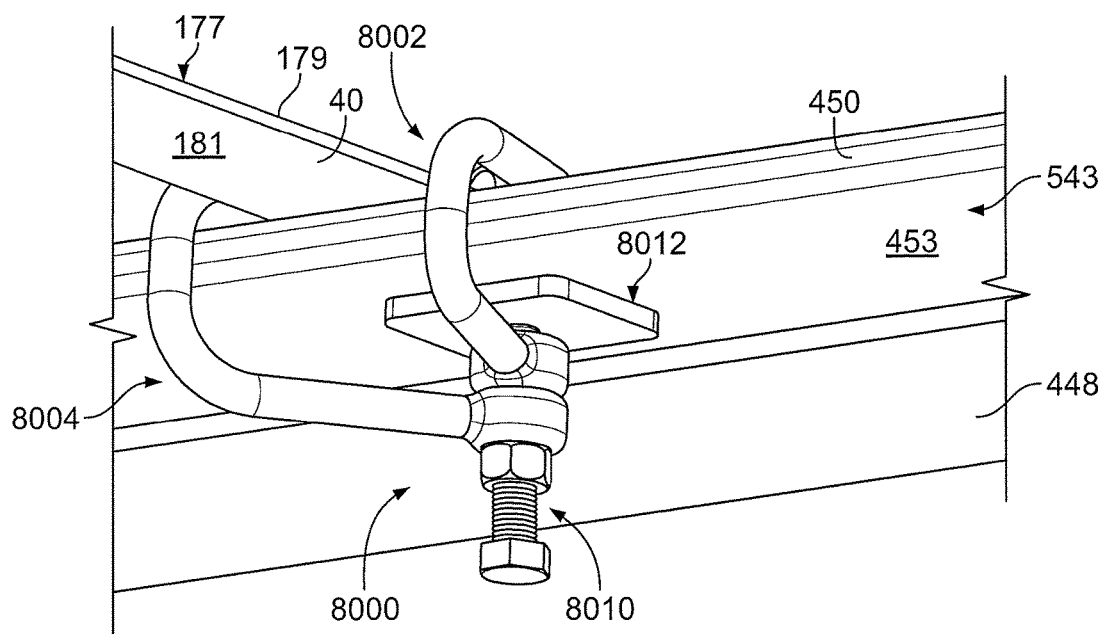
FIG. 31 is a perspective view of yet another alternative mounting bracket assembly of the present disclosure coupling a wall panel, such as those wall panels shown in FIGS. 15-18 and 20, to the floor assembly of the trailer.

Looking now to FIG. 31, still another mounting bracket assembly 8000 is provided for use with the wall panel 543 including the upper mounting flange 450. The assembly 8000 includes two C-clamp arms 8002 and 8004. Each arm 8002, 8004 has an upper end that is positioned on either side of the cross-member 40 in order to flank the bottom flange 177 of the cross-member 40 and provide a balanced clamping load on the mounting flange 450. In particular, the upper end of each arm 8002, 8004 is configured to engage the upper surface 179 of the bottom flange 177 of the cross-member 40 in order to secure the assembly 8000 to the cross-member 40. The opposite, or bottom, end of each arm 8002, 8004 includes a vertical passageway configured to receive the threaded bolt 8010 therethrough. The passageways of each arm 8002, 8004 are aligned with each other, as shown in FIG. 31, such that the bottom end of the arm 8002 is stacked onto the bottom end of the arm 8004. A plate 8012 of the bracket assembly 8000 is engaged by the bolt 8010 and forced upwardly into engagement with the bottom surface 453 of the mounting flange 450 of the wall panel 543 by threading the bolt 8010 upwardly through the passageways in order to clamp the mounting flange 450 and the bottom flange 177 of the cross-member 450 between the top and bottom ends of each arm 8002, 8004 of the assembly 8000.

Figure 32:
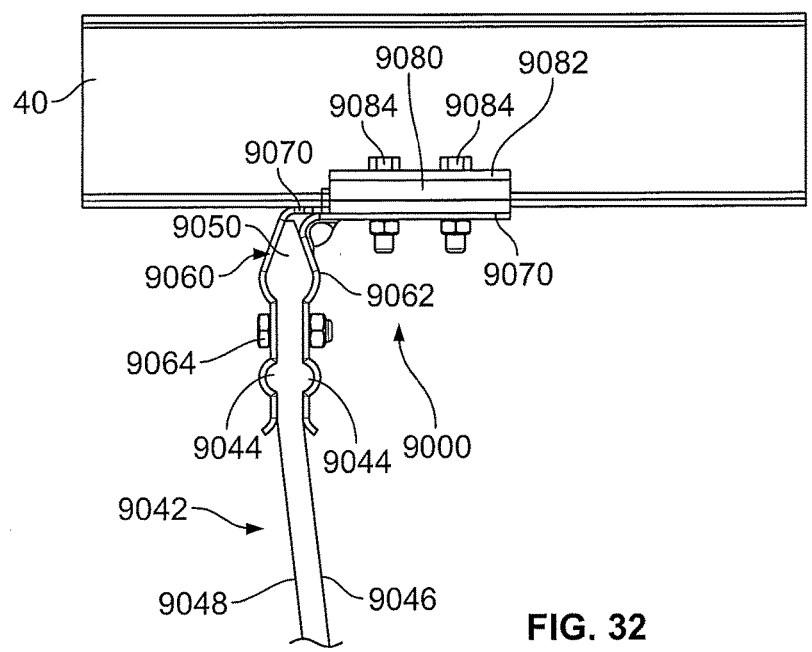
FIG. 32 is a side view of yet another alternative mounting bracket assembly coupling an alternative wall panel to the floor assembly of the trailer.

Looking now to FIG. 32, yet another alternative mounting bracket assembly 9000 is provided for use with an alternative wall panel 9042. Illustratively, the wall panel 9042 does not include a mounting flange extending outwardly therefrom. Rather, an upper portion of the wall panel 9042 includes a rib 9044 projecting outwardly from both the inner and outer surfaces 9046, 9048 of the wall panel 9042. Further, a top-most portion of the wall panel 9042 defines a tapered top end 9050. Illustratively, the mounting bracket assembly 9000 includes a front bracket 9060 and a rear bracket 9062 which sandwich the upper portion of the wall panel 9042 therebetween. The front and rear brackets 9060, 9062 are shaped and configured to cooperate with the ribs 9044 and the tapered top end 9050 of the wall panel 9042 in order to securely hold the wall panel 9042 therebetween. A fastener, such as the bolt 9064, further secures the front and rear brackets 9060, 9062 to the wall panel 9042. A mount portion 9070 of the bracket assembly 9000 is coupled to both of the front and rear brackets 9060, 9062. The mount portion 9070 extends generally at a right angle rearwardly from a top edge of the respective front and rear brackets 9060, 9062. A mounting bracket 9080, similar to the mounting plates described above, is coupled to the mount portions 9070 and positioned below the bottom flange 177 of the cross-member 40 to engage the bottom surface 181 of the bottom flange 177. A toe clamp 9082, similar to the toe clamps described above, is positioned adjacent the top surface 179 of the bottom flange 177 and is secured to the mounting bracket 9080 by the illustrative bolts 9084 in order to secure the mounting bracket assembly 9000 to the cross-member 40. The bolts 9084 also operate to couple the mount portions 9070 to the mounting bracket 9080 and the toe clamp 9082.

Figure 33:
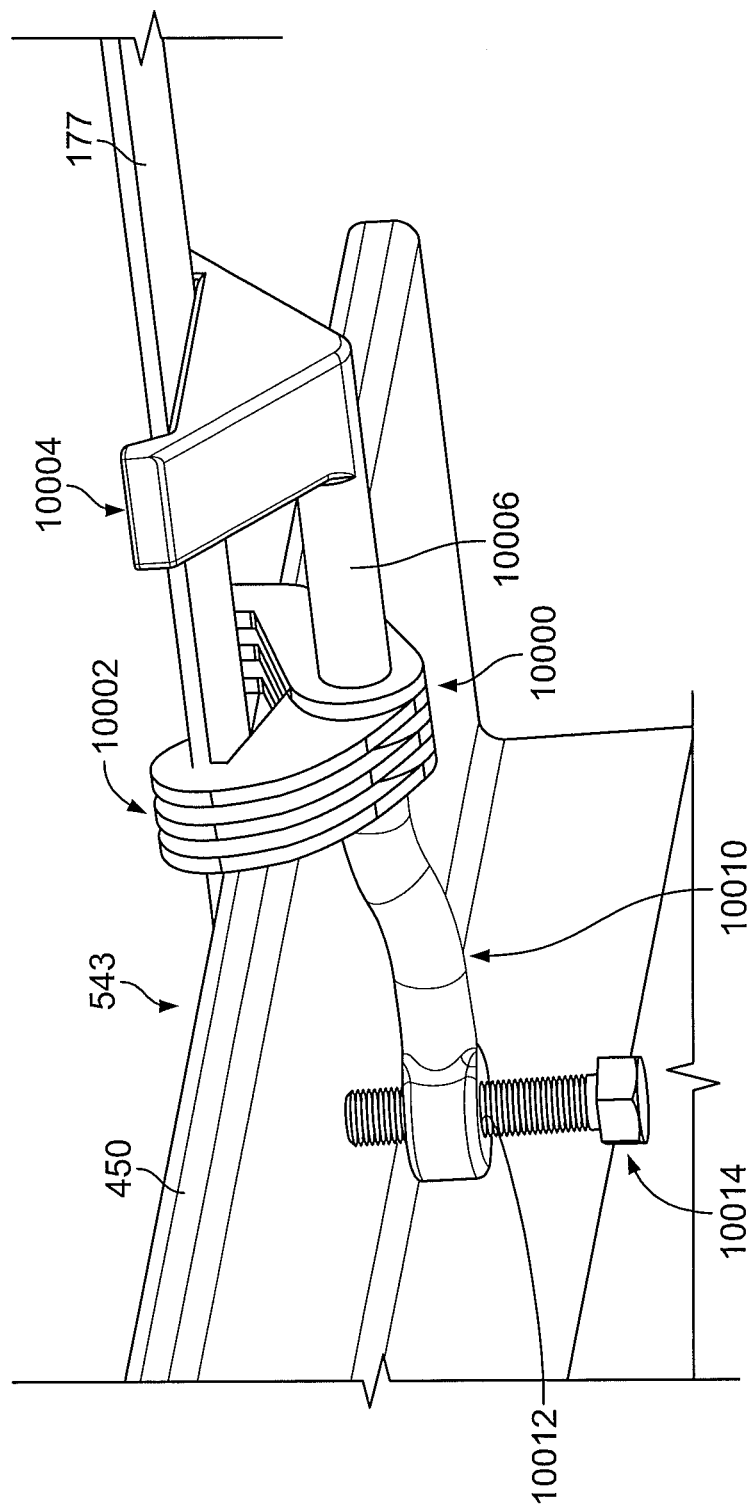
FIG. 33 is a perspective view of still another alternative mounting bracket assembly of the present disclosure coupling a wall panel, such as those wall panels shown in FIGS. 15-18 and 20, to the floor assembly of the trailer.

Looking now to FIG. 33, still another mounting bracket assembly 10000 is provided for use with the wall panel 543 including the upper mounting flange 450. The mounting bracket assembly 10000 includes a spring-biased clamp 10002 configured to grasp each edge 175 of the bottom flange 177 of the cross-member 40. Another clamp 10004 is further positioned around each edge 175 of the bottom flange 177. The clamp 10004 is spaced apart from the spring-biased claim 10002 by a rod 10006. Another arm 10010 of the mounting bracket assembly 10000 includes a threaded aperture 10012 configured to receive a bolt 10014 therein. The bolt 10014 is able to be moved upwardly through the apertures 10012 in order to engage, and be tightened against, a bottom surface of the flange 450 in order to secure the wall panel 543 to the cross-member 40.

Figure 34:
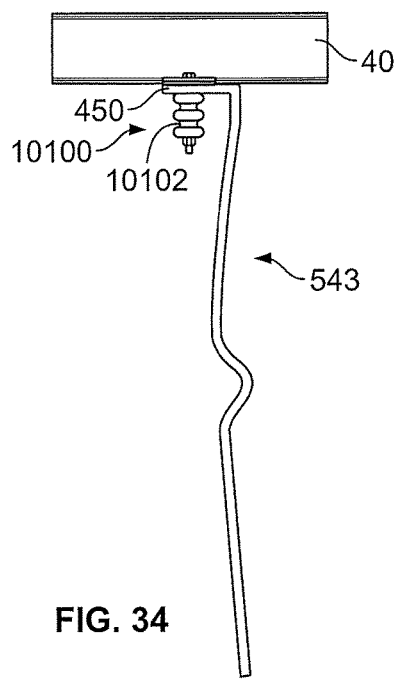
FIG. 34 is a perspective view of another alternative mounting bracket assembly coupling an alternative wall panel to the floor assembly of the trailer.

Looking now to FIG. 34, yet another mounting bracket assembly 10100 is provided for use with the wall panel 543 including the upper mounting flange 450. The mounting bracket assembly 10100 includes a spring or resilient structure 10102 to allow the wall panel 543 to tilt laterally inwardly and laterally outwardly when impacted by an object, for example. A bolt 10104 is received through an aperture in the mounting flange 450 of the wall panel 543 and through an aperture in the flange 177 in order to secure the wall panel 543 to the cross-member 40. Illustratively, the resilient structure 10102 may be made of rubber, or plastic, or other suitable flexible and/or resilient materials in order to allow the wall panel 543 to tilt laterally inwardly and laterally outwardly relative to the cross-member 40.

Figure 35:
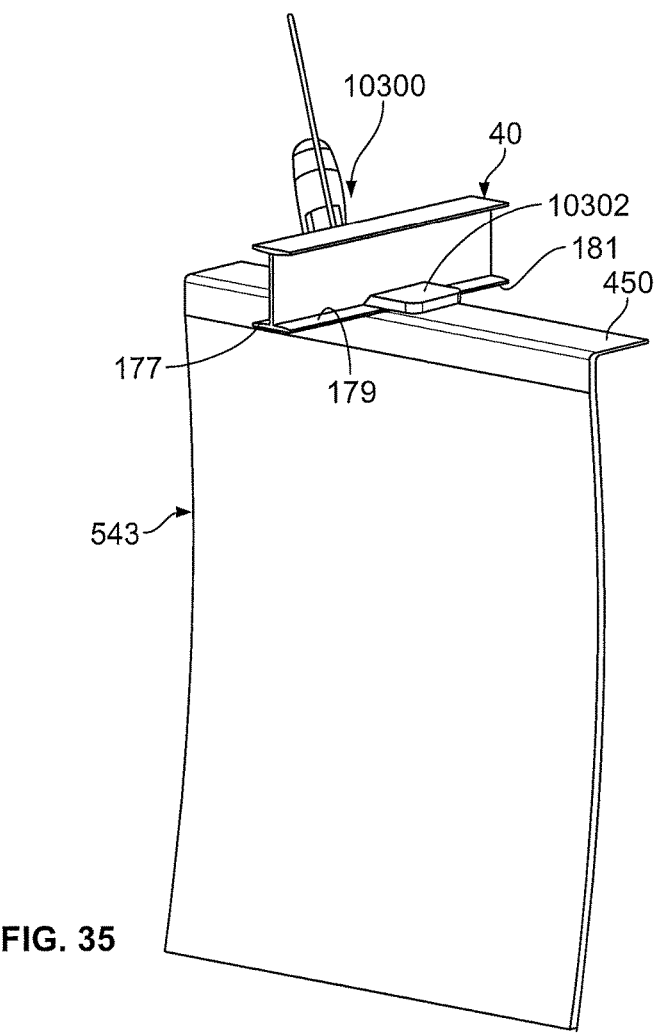
FIG. 35 is a perspective view of another alternative mounting bracket assembly coupling the wall panel of FIGS. 34 and 35 to the floor assembly of the trailer.

Looking now to FIG. 35, a plastic welder 10300 is provided in order to weld portions of the flange 450 of the wall panel 543 to a mounting bracket 10302. The mounting bracket assembly 10302 is made of the same or similar plastic material as the flange 450 in order to allow the two components to be welded together. The mounting bracket 10302 may also include a clamp (not shown) the same as or similar to the other mounting bracket assemblies disclosed herein in order to couple the mounting bracket 10302 to the bottom flange 177 of the cross-member 40 of the trailer. Illustratively, a first portion of the mounting bracket 10302 is welded to the top surface 179 of the bottom flange 177 of the cross-member 40 while a second portion of the mounting bracket 10302 is coupled to the top surface of the flange 450 in order to couple the wall panel 543 to the cross-member 40.

Figure 36:
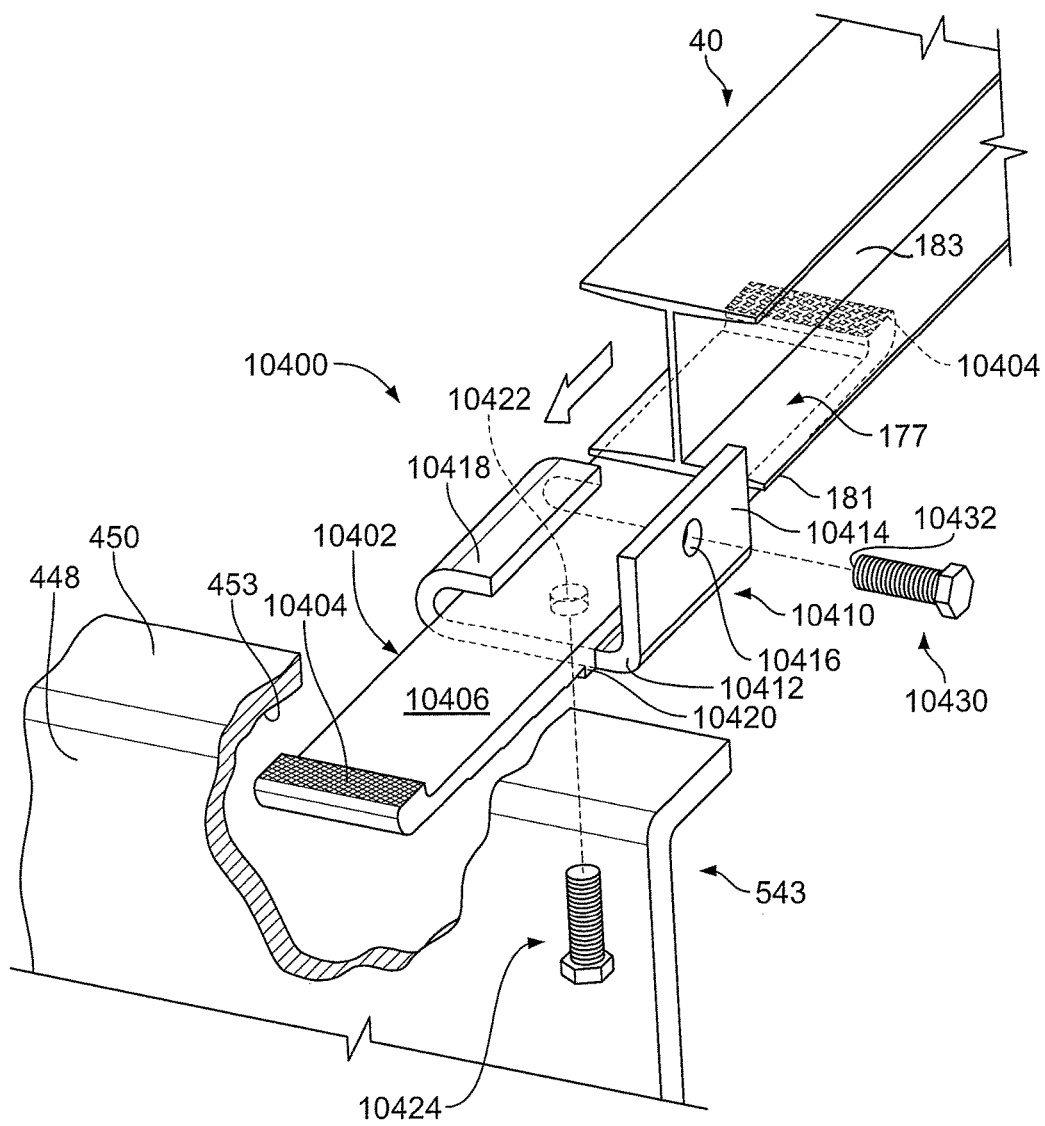
FIG. 36 is a perspective view another alternative mounting bracket assembly.

Looking now to FIG. 36, another mounting bracket assembly 10400 is provided. The mounting bracket assembly 10400 includes bottom, generally planar member 10402 having a raised lip 10404 at each of an outside and inside end thereof. The raised lip 10404 extends upwardly away from an upper surface 10406 of the planar member 10402 and is ridged or textured to provide added grip against the bottom surface 181 of the flange 177 of the cross-member 40 and against a lower surface 453 of the mounting flange 450 of the wall panel 543. A bracket 10410 of the assembly 10400 includes a base 10412, an upwardly-extending wall 10414 coupled to one end of the base 10412 and having an aperture 10416 formed therethrough, and a hook 10418 coupled to the opposite end of the base 10412, as shown in FIG. 36. The planar member 10402 is received through the hook 10418 and positioned between the hook 10408 and the wall 10414 of the bracket 10410. A downwardly-extending ridge 10420 of the planar member 10402 operates to prevent the bracket 10410 from moving outwardly relative to the planar member 10402 beyond the ridge 10420. The illustrative aperture 10416 is threaded and is configured to receive a locking bolt 10430 therethrough. In use, the lower flange 177 of the cross-member 40 is received within the hook 10418 of the bracket 10410 to be positioned atop the upper surface 10406 of the planar portion 10402, and the lock bolt 10430 is received through the threaded hole 10416 of the bracket 10410 until an end 10432 of the bolt 10430 is lockingly engaged with a side surface of the vertical portion 183 of the cross-member 40 in order to secure the bracket assembly 10400 to the cross-member 40. The base 10412 of the bracket 10410 includes an aperture 10422 configured to receive a fastener, such as the bolt 10424 therethrough. The bolt 10424 operates as a jack-bolt or pivot fulcrum allowing each ridged lip 10404 of the planar portion 10402 to contact the respective bottom surface 453 of the mounting flange 450 of the wall panel 543 and bottom surface 181 of the lower flange 177 of the cross-member 40 in order to couple the wall panel 543 to the cross-member 40.

Figure 37:
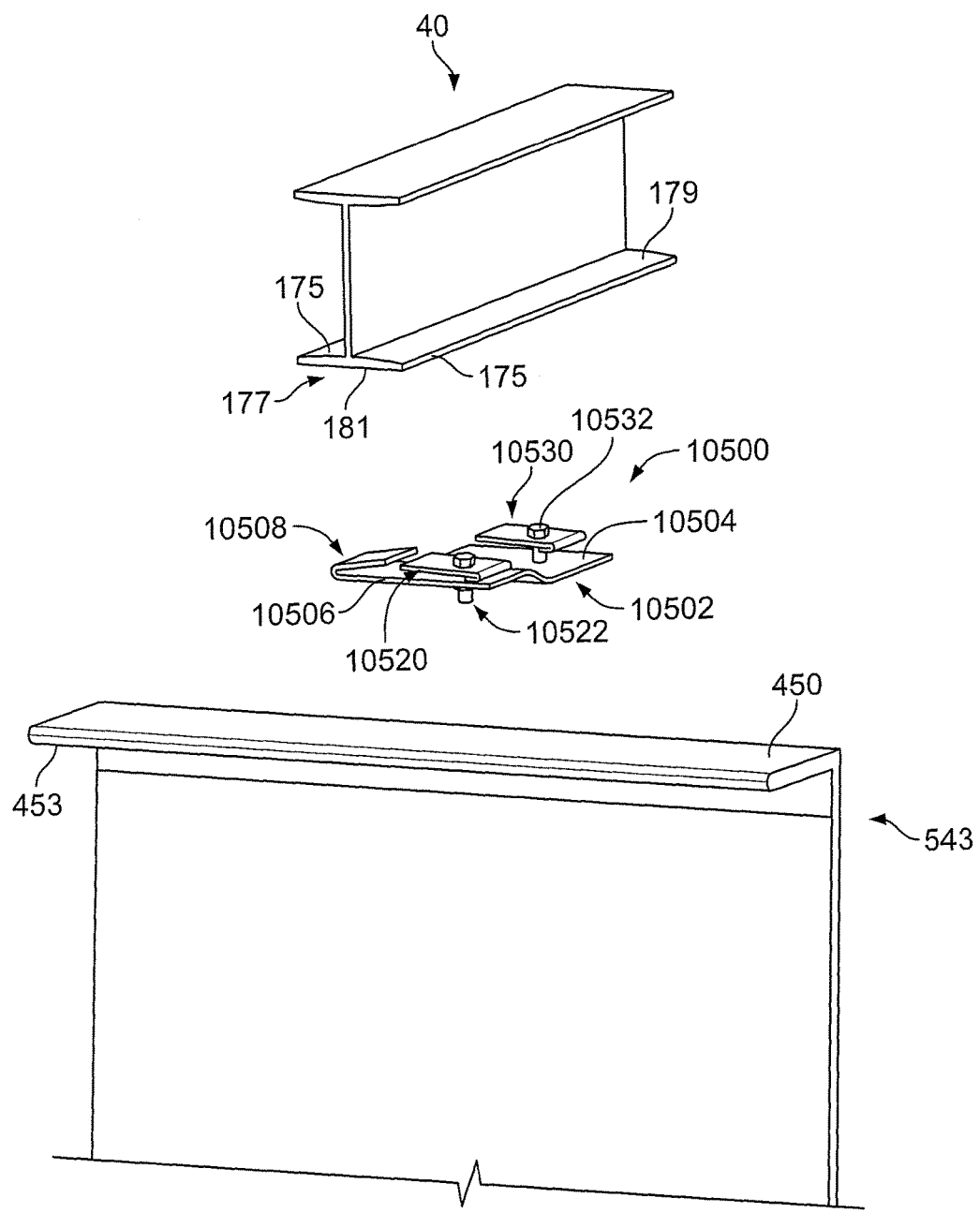
FIG. 37 is a perspective view of another alternative mounting bracket assembly coupling a wall panel having a mounting flange such as those shown in FIGS. 15-18, 20, and 34-36, to the floor assembly of the trailer.

Looking now to FIG. 37, yet another mounting bracket assembly 10500 is provided for use with the wall panel 543 including the upper mounting flange 450. The mounting bracket assembly 10500 includes a stepped plate 10502 including a lower plate 10504 and an upper plate 10506. A hook portion 10508 is coupled to the upper plate 10506. The hook portion 10508 is configured to receive one edge 175 of the bottom flange 177 of the cross-member 40 therein. The upper plate 10506 is configured to be positioned below and engaged with the bottom surface 181 of the bottom flange 177 of the cross-member 40. The lower plate 10504 is configured to be positioned below and engaged with the lower surface 453 of the mounting flange 450 of the wall panel 543. A first toe clamp 10520 is coupled to the upper plate 10506 with a bolt 10522 received through an aperture in the first toe clamp 10520 and an aperture through the upper plate 10506 aligned therewith. A second toe clamp 10530 is coupled to the lower plate 10504 with a bolt 10532 received through an aperture in the second toe clamp 10530 and an aperture through the lower plate 10504 aligned therewith. Each of the first and second toe clamps 10520, 10530 is configured to be positioned above and engaged with the upper surface 179 of the bottom flange 177 of the cross member 40. Tightening the bolts 10522, 10532 operates to clamp the bottom flange 177 of the cross-member and the mounting flange 450 of the wall panel 543 between the toe clamps 10420, 10530 and the plate 10502 of the mounting bracket assembly 10500.

Figure 38:
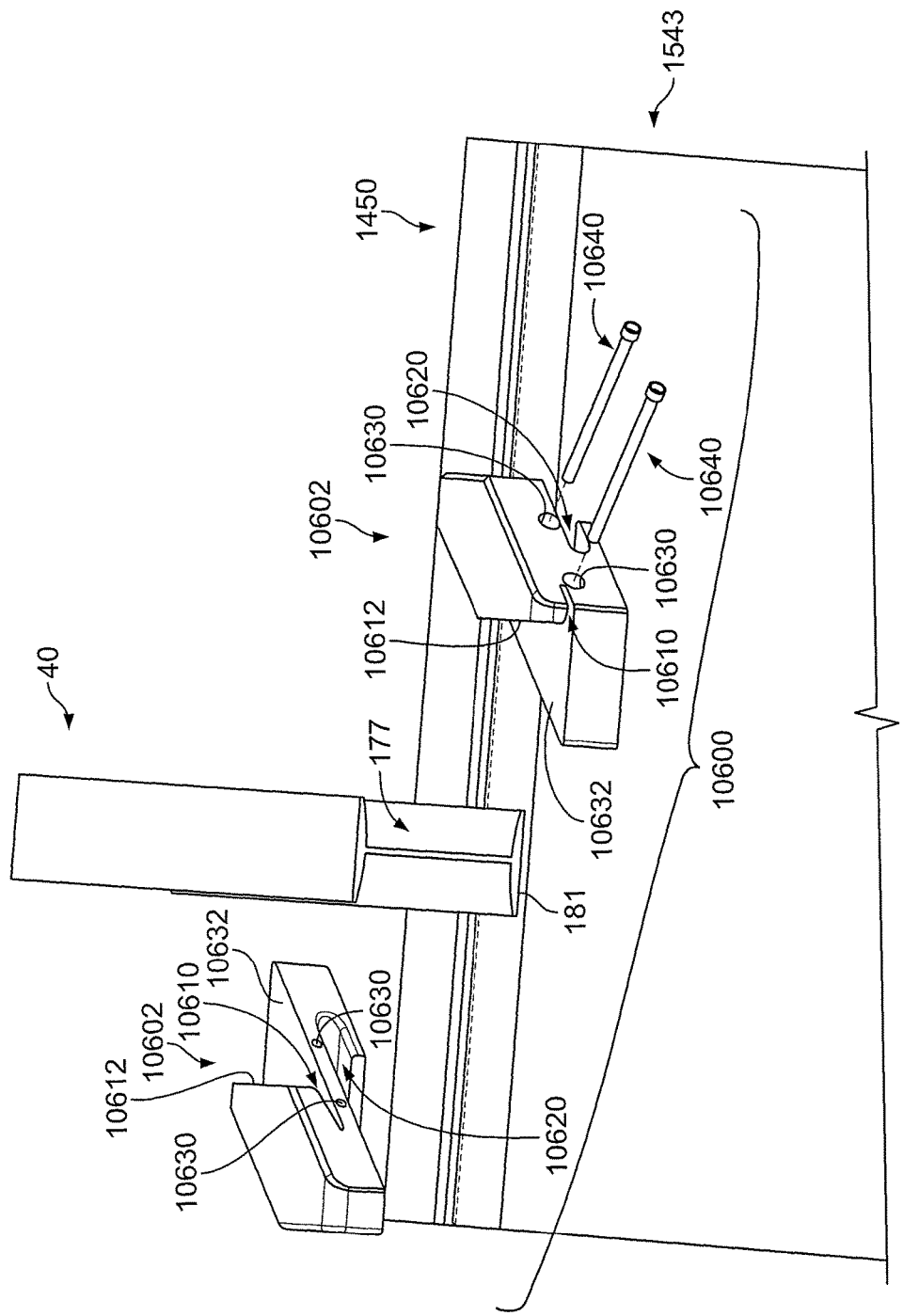
FIG. 38 is a perspective view of another alternative mounting bracket assembly coupling a wall panel having a mounting flange, such as those shown in FIGS. 15-18, 20, and 34-36, to the floor assembly of the trailer.

Looking now to FIG. 38, yet another mounting bracket assembly 10600 is provided for use with a wall panel 1543 having a generally T-shaped upper mounting flange 1450 the same as or similar to the mounting flange 2450 of the wall panel 543 shown in FIGS. 23A-D. The mounting bracket assembly 10600 includes first and second bracket portions 10602. The illustrative bracket portions 10602 may be made of injection molded plastic or cast and/or machined metal. Each bracket portion 10602 defines an upper slot 10610. Each upper slot 10610 is configured to receive an opposite side of the lower flange 177 of the cross-member 40 therein. An angled face 10612 of each bracket portion 10602 is configured to engage an opposite surface of the vertical web of the cross-member 40.

Each bracket portion 10602 further includes a lower slot 10620 configured to receive opposite flange portions of the T-shaped mounting flange 1450 therein. Apertures 10630 of each bracket portion 10620 are positioned above a planar ledge 10632 of each bracket portion 10620. The planar ledge 10632 is positioned below and engaged with the bottom surface 181 of the lower flange 177 of the cross-member 40. The apertures 10630 are configured to receive fasteners 10640 therethrough. The threaded fasteners 10640 pass between the upper surface of the mounting flange 1450 of the wall panel 543 and the lower surface 181 of the lower flange 177 of the cross-member 40 diagonally from the first bracket portion 10602 to the second bracket portion 10602.

Illustratively, when the fasteners 10640 are tightened, the two bracket portions 10602 operates as a clamp and are drawn together to engage and receive the flange portions of the T-shaped mounting flange 1450 as well as the lower flange 177 of the cross-member in order to secure the wall panel 1453 to the cross-member 40. Illustratively, the threaded fasteners 10640 may be press fit into one of the bracket portions 10602 in order to allow the bracket assembly 10600 to be installed and removed using a single tool.

While the invention has been illustrated and described in detail in the foregoing drawings and description, the same is to be considered as illustrative and not restrictive in character, it being understood that only illustrative embodiments thereof have been shown and described and that all changes and modifications that come within the spirit of the invention are desired to be protected.

What is claimed is:

1. A side skirt system for reducing drag on a trailer or other ground vehicle, comprising:
    a first portion including a forward-most wall panel configured to be coupled to one side of a floor assembly of the trailer to extend generally below a storage container of the trailer and at least partially along a length of the trailer, the entire length of the forward-most wall panel configured to be positioned forward of a landing gear leg of the trailer;
    a second portion including a plurality of wall panels configured to be coupled to the one side of the floor assembly of the trailer to extend generally below the storage container of the trailer at least partially along the length of the trailer, the entirety of each of the plurality of wall panels of the second portion configured to be positioned between the landing gear leg of the trailer and a rear wheel assembly of the trailer; and
    a third portion including a rearward-most wall panel configured to be coupled to the one side of the floor assembly of the trailer to extend generally below the storage container of the trailer and at least partially along the length of the trailer, the entire length of the rearward-most wall panel configured to be positioned rearward of the rear wheel assembly of the trailer,
    wherein the first, second, and third portions of the skirt system are horizontally-spaced-apart from each other, and
    wherein the entire length of each of the wall panels of the first and second portions are angled outwardly away from a longitudinal centerline of the trailer from a front edge to a rear edge thereof with respect to a sidewall of the trailer.

2. The side skirt system of claim 1, wherein none of the first, second, and third portions are configured to partially or entirely cover a wheel of the trailer.

3. The side skirt system of claim 1, wherein the forward edge of the second portion and the rearward edge of the first portion are each generally V-shaped to define a generally V-shaped gap between the first portion and the second portion.

4. The side skirt system of claim 3, wherein a front edge of the rearward-most wall panel is generally vertical and a rear edge of the rearward-most wall panel is V-shaped and oriented opposite that of the V-shaped forward and rearward edges of each of the forward-most wall panel and the plurality of wall panels of the second portion.

5. The side skirt system of claim 1, wherein the wall panels of each of the first portion and the second portion include an upper, middle, and lower horizontal rib each extending from the front edge to the rear edge thereof.

6. The side skirt system of claim 5, wherein the wall panel of the third portion includes an upper and a middle horizontal rib each extending from the front edge to the rear edge thereof, and wherein a lower portion of the wall panel of the third portion is planar.

7. The side skirt system of claim 5, wherein each of the wall panels of the first portion and the second portion include an upper planar portion positioned between the upper and middle horizontal ribs and a lower planar portion positioned between the middle and lower horizontal ribs.

8. The side skirt system of claim 1, wherein the rearward-most wall panel of the third portion is angled inwardly toward the longitudinal centerline of the trailer from the front edge to the rear edge thereof with respect to the sidewall of the trailer.

9. The side skirt system of claim 1, wherein the plurality of wall panels of the second portion are each horizontally spaced-apart from each other.

10. The side skirt system of claim 1, wherein (i) the wall panels of the first and second portions of the side skirt system each include a horizontally-extending top edge and a horizontally-extending bottom edge parallel to the top edge, and (ii) the rearward-most wall panel of the third portion includes a horizontally-extending top edge and an angled bottom edge, and wherein the angled bottom edge is angled upwardly from the front edge of the rearward-most wall panel to the rear edge of the rearward-most wall panel.

11. The side skirt system of claim 10, wherein the bottom edge of the rearward-most wall panel is configured to be generally parallel to an imaginary line extending between a bottom edge of a rear bumper of the trailer and a point where the rearward-most tire of the rear tire assembly of the trailer engages the ground.

12. The side skirt system of claim 1, wherein the forward-most wall panel defines a first length, any one of the plurality of wall panels of the second portion of the side skirt assembly defines a second length, and the rearward-most wall panel defines a third length, and wherein the first, second, and third lengths are different from one another.

13. The side skirt system of claim 1, wherein at least one of the wall panels is configured to be tiltably coupled to the floor assembly of the trailer in order to tilt laterally-inwardly and laterally-outwardly relative to the trailer.

14. A side skirt system for reducing drag on a trailer or other ground vehicle, comprising:
    a plurality of wall panels configured to be coupled to one side of a floor assembly of the trailer to extend generally below a storage container of the trailer at least partially along a length of the trailer,
    wherein the wall panels are horizontally spaced-apart from each other,
    wherein at least one of the wall panels is configured to be tiltably coupled to the floor assembly of the trailer in order to tilt laterally-inwardly and laterally-outwardly relative to the storage container,
    wherein at least one of the wall panels is configured to be rigidly coupled to the floor assembly of the trailer, and wherein the plurality of wall panels includes a forward-most wall panel configured to be coupled to the floor assembly of the trailer at a location that is entirely forward of a landing gear leg of the trailer.

15. The side skirt system of claim 14, wherein the plurality of wall panels further includes a plurality of middle wall panels configured to be coupled to the floor assembly of the trailer at a location that is entirely between the landing gear leg and a rear wheel assembly of the trailer, and a rearward-most wall panel configured to be coupled to the floor assembly of the trailer at a location that is entirely rearward of the rear wheel assembly of the trailer.

16. The side skirt system of claim 15, wherein the forward-most wall panel is configured to be rigidly coupled to the floor assembly, the rearward-most wall panel is configured to be rigidly coupled to the floor assembly, and the plurality of middle wall panels are each configured to be tiltably coupled to the floor assembly.

17. The side skirt system of claim 15, further comprising a spring-biased mounting bracket assembly coupled to each of the plurality of middle wall panels, and wherein each of the spring-biased mounting bracket assemblies (i) a channel mount coupled to one of the wall panels of the side skirt system, (ii) a bolt coupled to the channel mount and configured to be coupled to the floor assembly of the trailer, and (iii) a spring having a first end coupled to the bolt and a second end coupled to the channel mount, and wherein the channel mount is tiltable relative to the bolt.

18. A side skirt system for reducing drag on a trailer or other ground vehicle, comprising:
a plurality of wall panels configured to be coupled to one side of a floor assembly of the trailer to extend generally below a storage container of the trailer at least partially along a length of the trailer,
wherein the wall panels are horizontally spaced-apart from each other,
wherein at least one of the wall panels is configured to be tiltably coupled to the floor assembly of the trailer in order to tilt laterally-inwardly and laterally-outwardly relative to the storage container when the trailer is traveling down the highway, and
wherein at least one of the wall panels is configured to be rigidly coupled to the floor assembly of the trailer.

19. A side skirt system for reducing drag on a trailer or other ground vehicle, comprising:
a plurality of wall panels configured to be coupled to one side of a floor assembly of the trailer to extend generally below a storage container of the trailer at least partially along a length of the trailer,
wherein the wall panels are horizontally spaced-apart from each other, and
wherein the plurality of wall panels includes a forward-most wall panel configured to be coupled to the floor assembly of the trailer at a location that is entirely forward of a landing gear leg of the trailer.

* * * * *